US011342609B2

(12) United States Patent
Kenney et al.

(10) Patent No.: US 11,342,609 B2
(45) Date of Patent: May 24, 2022

(54) COUNTER-FLOW HEAT EXCHANGER FOR BATTERY THERMAL MANAGEMENT APPLICATIONS

(71) Applicant: Dana Canada Corporation, Oakville (CA)

(72) Inventors: Benjamin A. Kenney, Toronto (CA); Andrew J. M. Buckrell, London (CA); Colin A. Shore, Hamilton (CA); Doug Vanderwees, Mississauga (CA); Kenneth M. A. Abels, Oakville (CA)

(73) Assignee: Dana Canada Corporation, Oakville (CA)

( * ) Notice: Subject to any disclaimer, the term of this patent is extended or adjusted under 35 U.S.C. 154(b) by 589 days.

(21) Appl. No.: 16/295,224

(22) Filed: Mar. 7, 2019

(65) Prior Publication Data

US 2019/0207280 A1 Jul. 4, 2019

Related U.S. Application Data

(63) Continuation of application No. 14/972,463, filed on Dec. 17, 2015, now Pat. No. 10,263,301.

(Continued)

(51) Int. Cl.
*H01M 10/656* (2014.01)
*H01M 10/658* (2014.01)
(Continued)

(52) U.S. Cl.
CPC ......... *H01M 10/6556* (2015.04); *B23P 15/26* (2013.01); *F28F 1/022* (2013.01);
(Continued)

(58) Field of Classification Search
CPC ........... H01M 10/6556; H01M 10/613; H01M 10/617; H01M 10/6568; B23P 15/26;
(Continued)

(56) References Cited

U.S. PATENT DOCUMENTS 2,410,952 A 11/1946 Lighton
4,210,127 A 7/1980 Kleine
(Continued)

FOREIGN PATENT DOCUMENTS

CN 104051813 9/2014
CN 104051815 9/2014
(Continued)

OTHER PUBLICATIONS

China National Intellectual Property Administration, Office Action issued in Application No. CN201580072985.1, dated Feb. 26, 2019, 14 pages.
(Continued)

*Primary Examiner* — Alexander Usyatinsky
(74) *Attorney, Agent, or Firm* — McCoy Russell LLP

(57) ABSTRACT

A heat exchanger for thermal management of battery units made-up of plurality of battery cells or battery cell containers housing one or more battery cells is disclosed. The heat exchanger has a main body portion defining at least one primary heat transfer surface for surface-to-surface contact with a corresponding surface of at least one of the battery cells or containers. A plurality of alternating first and second fluid flow passages are formed within the main body portion each defining a flow direction, the flow direction through the first fluid flow passages being generally opposite to the flow direction through the second fluid flow passages providing a counter-flow heat exchanger.

20 Claims, 34 Drawing Sheets

Related U.S. Application Data

(60) Provisional application No. 62/101,527, filed on Jan. 9, 2015.

(51) Int. Cl.

| | | |
|---|---|---|
| *H01M 10/6556* | (2014.01) | |
| *H01M 10/6568* | (2014.01) | |
| *H01M 10/617* | (2014.01) | |
| *H01M 10/613* | (2014.01) | |
| *F28F 3/12* | (2006.01) | |
| *F28F 1/02* | (2006.01) | |
| *F28F 1/04* | (2006.01) | |
| *B23P 15/26* | (2006.01) | |
| *F28D 21/00* | (2006.01) | |
| *F28F 9/02* | (2006.01) | |

(52) U.S. Cl.
CPC ............... *F28F 1/045* (2013.01); *F28F 3/12* (2013.01); *H01M 10/613* (2015.04); *H01M 10/617* (2015.04); *H01M 10/6568* (2015.04); *F28D 2021/0043* (2013.01); *F28F 2009/0297* (2013.01)

(58) Field of Classification Search
CPC .... F28F 1/022; F28F 1/045; F28F 3/12; F28F 2009/0297; F28D 2021/0043
See application file for complete search history.

(56) References Cited

U.S. PATENT DOCUMENTS

| | | | |
|---|---|---|---|
| 4,478,277 A | 10/1984 | Friedman | |
| 5,005,640 A | 4/1991 | Lapinski | |
| 5,645,127 A | 7/1997 | Enderle | |
| 5,718,286 A | 2/1998 | Damsohn | |
| 5,836,383 A | 11/1998 | Zwittig | |
| 6,613,472 B1 | 9/2003 | Watanabe | |
| 8,182,661 B2 | 5/2012 | Tanase | |
| 8,297,343 B2 | 10/2012 | Yang | |
| 8,418,365 B2 | 4/2013 | German | |
| 8,622,116 B2 | 1/2014 | Yang | |
| 8,911,896 B2 | 12/2014 | Jin | |
| 8,997,840 B2 | 4/2015 | Yang | |
| 2005/0170241 A1* | 8/2005 | German | H01M 10/6567 429/120 |
| 2008/0090123 A1 | 4/2008 | Peng | |
| 2009/0239112 A1 | 9/2009 | Vanderwees | |
| 2009/0323286 A1* | 12/2009 | Han | G06F 1/20 361/702 |
| 2010/0132930 A1* | 6/2010 | Izenson | F28D 21/0015 165/168 |
| 2010/0175857 A1 | 7/2010 | Gerstler | |
| 2010/0261046 A1 | 10/2010 | German | |
| 2011/0262794 A1 | 10/2011 | Yoon | |
| 2011/0277967 A1 | 11/2011 | Fried | |
| 2011/0302928 A1 | 12/2011 | Mudawar | |
| 2012/0082880 A1 | 4/2012 | Koetting | |
| 2012/0181712 A1 | 7/2012 | Vanderwees | |
| 2012/0237805 A1 | 9/2012 | Abels | |
| 2013/0071720 A1 | 3/2013 | Zahn | |
| 2013/0126140 A1 | 5/2013 | Park | |
| 2013/0171493 A1 | 7/2013 | Wayne | |
| 2013/0244077 A1 | 9/2013 | Palanchon | |
| 2013/0273829 A1 | 10/2013 | Obasih | |
| 2013/0280596 A1 | 10/2013 | Lee | |
| 2013/0312939 A1 | 11/2013 | Uchida | |
| 2013/0330577 A1 | 12/2013 | Kristofek | |
| 2014/0147709 A1 | 5/2014 | Ketkar | |
| 2014/0272513 A1 | 9/2014 | Sun | |
| 2014/0272518 A1 | 9/2014 | Silk | |
| 2014/0299302 A1 | 10/2014 | Moreau | |
| 2015/0010801 A1 | 1/2015 | Arena | |
| 2015/0168078 A1 | 6/2015 | Yang | |
| 2015/0180059 A1 | 6/2015 | Vanderwees | |
| 2015/0200429 A1 | 7/2015 | Lee | |
| 2016/0036104 A1 | 2/2016 | Kenney | |
| 2016/0049705 A1 | 2/2016 | Mahe | |
| 2016/0097598 A1 | 4/2016 | Hirsch | |
| 2016/0204486 A1 | 7/2016 | Kenney | |

FOREIGN PATENT DOCUMENTS

| | | | |
|---|---|---|---|
| DE | 102012006122 | * | 9/2013 |
| DE | 102013217287 | | 3/2014 |
| GB | 2502977 | | 12/2013 |
| JP | 2003222477 | | 8/2003 |
| JP | 2014216298 | | 11/2014 |

OTHER PUBLICATIONS

European Patent Office, Supplementary European Search Report issued in Application No. EP15876413.4, dated Jan. 22, 2019, 8 pages, Munich Germany.
International Search Report and Written Opinion for application No. PCT/CA2015/051340, dated Feb. 23, 2016, issued by the Canadian Intellectual Property Office. 11 pgs.
International Search Report with Written Opinion for PCT/CA2016/050462 dated Jul. 6, 2016. 11 pgs.
English Machine Translation of DE 102012006122 A1. 14 pgs.

* cited by examiner

COUNTER-FLOW HEAT EXCHANGER FOR BATTERY THERMAL MANAGEMENT APPLICATIONS

CROSS-REFERENCE TO RELATED APPLICATION

This continuation application claims priority to and the benefit of U.S. patent application Ser. No. 14/972,463, filed on Dec. 17, 2015, which claims priority to and the benefit of U.S. Provisional patent application No. 62/101,527, filed Jan. 9, 2015 under the title COUNTER-FLOW HEAT EXCHANGER FOR BATTERY THERMAL MANAGEMENT APPLICATIONS. The content of the above patent application is hereby expressly incorporated by reference into the detailed description of the present application.

TECHNICAL FIELD

This disclosure relates to heat exchangers for battery thermal management applications. More specifically, the disclosure relates to a battery cell heat exchanger that can be arranged underneath a stack of a plurality of adjacent battery cells or battery cell containers or that can be arranged in between the adjacent battery cells or battery cell containers within a stack, the battery cell heat exchanger dissipating heat in rechargeable battery units.

BACKGROUND

Rechargeable batteries such as batteries made up of many lithium-ion cells can be used in many applications, including for example, electric propulsion vehicle ("EV") and hybrid electric vehicle ("HEV") applications. These applications often require advanced battery systems that have high energy storage capacity and can generate large amounts of heat that needs to be dissipated. Battery thermal management of these types of systems generally requires that the maximum temperature of the individual cells be below a predetermined, specified temperature.

Cold plate heat exchangers are heat exchangers upon which a stack of adjacent battery cells or battery cell containers housing one or more battery cells are arranged for cooling and/or regulating the temperature of a battery unit. The individual battery cells or battery cell containers are arranged in face-to-face contact with each other to form the stack, the stack of battery cells or battery cell containers being arranged on top of a cold plate heat exchanger such that an end face or end surface of each battery cell or battery cell container is in surface-to-surface contact with a surface of the heat exchanger.

Heat exchangers for cooling and/or regulating the temperature of a battery unit can also be arranged between the individual battery cells or individual battery cell containers that form the stack, the individual heat exchangers being interconnected by common inlet and outlet manifolds. Heat exchangers that are arranged or "sandwiched" between the adjacent battery cells or battery cell containers in the stack may sometimes be referred to as inter-cell elements (e.g. "ICE" plate heat exchangers) or cooling fins.

For both cold plate heat exchangers and inter-cell elements (or ICE plate heat exchangers), temperature uniformity across the surface of the heat exchanger is an important consideration in the thermal management of the overall battery unit as the temperature uniformity across the surface of the heat exchanger relates to ensuring that there is a minimum temperature differential between the individual battery cells in the battery unit.

During cooling mode, it is generally understood that the coolant travelling through the heat exchangers removes thermal energy from the battery cells that make up the battery units. Therefore the temperature of the coolant tends to increase along the length of the fluid channel. Given that the surface temperature of the cold plate or ICE plate heat exchanger will generally be proportional to the temperature of the coolant or fluid travelling through the heat exchanger, the temperature of the coolant will be cold (or cooler) at the inlet end of the heat exchanger and warmer (or hotter) near the outlet end of the heat exchanger resulting in an inherent temperature differential across the surface of the heat exchanger. As a result of the inherent temperature differential across the surface of the heat exchanger, battery cells arranged proximal to the inlet end of the heat exchanger will be subject to a lower coolant temperature than battery cells arranged proximal to the outlet end of the heat exchanger resulting in a potential temperature differential between the individual battery cells within the overall battery unit which, generally, is considered undesirable. Since temperature uniformity across the surface of the heat exchanger allows for more consistent cooling or thermal management of the overall battery unit, it is desirable to provide heat exchangers that offer improved temperature uniformity across the heat exchange surface of the heat exchanger in an effort to provide for more consistent cooling to the individual battery cells or battery cell containers that form the overall battery module across the entire surface of the heat exchanger plates. As well, given that the overall size of battery units can vary depending on the particular application, the ability to form heat exchangers of this type having various sizes without requiring costly tooling changes is also desirable.

SUMMARY OF THE PRESENT DISCLOSURE

In accordance with an example embodiment of the present disclosure there is provided a heat exchanger for thermal management of a battery unit having a plurality of battery cell containers each housing one or more battery cells, comprising a main body portion having opposed ends and defining at least one primary heat transfer surface for surface-to-surface contact with a corresponding surface of at least one of the battery cell containers; a plurality of first fluid flow passages formed within the main body portion, each of the first fluid flow passages having a first end for inletting a fluid into the first fluid flow passages and a second end for discharging the fluid from the first fluid flow passages, the first and second ends defining a flow direction through the first fluid flow passages; a plurality of second fluid flow passages formed within the main body portion, each of the second fluid flow passages having a first end for inletting the fluid into the second fluid flow passages and a second end for discharging the fluid from the second fluid flow passages, the first and second ends defining a flow direction through the second fluid flow passages; wherein the first and second fluid flow passages are arranged so as to alternate through the main body portion and wherein the flow direction of the first fluid flow passages is opposite to the flow direction of the second fluid flow passages.

In accordance with another example embodiment of the present disclosure there is provided a battery unit comprising a plurality of battery cell containers each housing one or more battery cells, said plurality of battery cell containers being arranged in a stack; and a heat exchanger comprising: a main body portion having opposed ends and defining at least one primary heat transfer surface for surface-to-surface contact with a corresponding surface of at least one of said battery cell containers; a plurality of first fluid flow passages formed within said main body portion, each of said first fluid flow passages having a first end for inletting a fluid into said first fluid flow passages and a second end for discharging said fluid from said first fluid flow passages, said first and second ends defining a flow direction through said first fluid flow passages; a plurality of second fluid flow passages formed within said main body portion, each of said second fluid flow passages having a first end for inletting said fluid into said second fluid flow passages and a second end for discharging said fluid from said second fluid flow passages, said first and second ends defining a flow direction through said second fluid flow passages; wherein said first and second fluid flow passages are arranged so as to alternate through said main body portion and wherein the flow direction of said first fluid flow passages is opposite to the flow direction of said second fluid flow passages; wherein said plurality of battery cell containers are arranged in a stack with each battery cell container being in surface-to-surface contact with the adjacent battery cell container, said stack of battery cell containers being arranged on top of and in thermal contact with said at least one primary heat transfer surface of said main body portion of said heat exchanger.

In accordance with a further example embodiment of the present disclosure there is provided a battery unit comprising a plurality of battery cell containers each housing one or more battery cells, said plurality of battery cell containers being arranged in a stack; and plurality of heat exchangers, wherein one heat exchanger is arranged in between adjacent battery cell containers, each heat exchanger comprising: a main body portion having opposed ends and defining at least one primary heat transfer surface for surface-to-surface contact with a corresponding surface of at least one of said battery cell containers; a plurality of first fluid flow passages formed within said main body portion, each of said first fluid flow passages having a first end for inletting a fluid into said first fluid flow passages and a second end for discharging said fluid from said first fluid flow passages, said first and second ends defining a flow direction through said first fluid flow passages; a plurality of second fluid flow passages formed within said main body portion, each of said second fluid flow passages having a first end for inletting said fluid into said second fluid flow passages and a second end for discharging said fluid from said second fluid flow passages, said first and second ends defining a flow direction through said second fluid flow passages; wherein said first and second fluid flow passages are arranged so as to alternate through said main body portion and wherein the flow direction of said first fluid flow passages is opposite to the flow direction of said second fluid flow passages; wherein said main body portion of said heat exchanger defines first and second primary heat transfer surfaces on opposed sides thereof; and wherein said plurality of heat exchangers are interconnected by a common inlet manifold and a common outlet manifold.

In accordance with yet another example embodiment of the present disclosure there is provided a method of making a heat exchanger for thermal management of battery units comprising the steps of providing a plurality of base plate portions, each base plate portion comprising a central, generally planar portion surrounded by a peripheral flange, a portion of said plurality of alternating first and second fluid flow passages being formed within the central generally planar portion of each of said base plate portions, said base plate portions being arranged adjacent to each other and fixed together to form said base plate; wherein said first and second fluid flow passages are formed by a plurality of U-shaped embossments formed in said central, generally planar portion of each of said base plate portions, said U-shaped embossments having two elongate branches that terminate at discrete ends wherein said first fluid flow passages are formed between adjacent U-shaped embossments and said second fluid flow passages being formed between the two elongate branches of each of said U-shaped embossments, the second ends of said first fluid flow passages and said first ends of said second fluid flow passages being interconnected by a common fluid collector channel that extends along the width of each of said base plate portions, the first ends of said first fluid flow passages being interconnected by a common inlet header region that extends along the width of each of said base plate portions; having the same structure; selecting a predetermined number of base plate portions for forming a heat exchanger having predetermined dimensions; arranging said predetermined number of base plate portions in side-by-side arrangement and joining said base plate portions together for forming a base plate; sealingly arranging a cover plate on top of said base plate for enclosing said first and second fluid flow passages, said cover plate comprising: a central, generally planar portion that defines a primary heat transfer surface for contacting at least one battery cell or battery cell container; one or more fluid routing slots formed in said cover plate, each fluid routing slot being in communication with said inlet header region formed in each of said base plate portions; a series of fluid openings formed in said cover plate inset from said fluid routing slots and extending along the width of the cover plate, each fluid opening being in communication with a corresponding second end of said second fluid flow passages formed in said base plate portions; and sealingly arranging a manifold cover on said cover plate enclosing said fluid routing slots and said series of fluid openings for forming respective inlet and outlet manifolds for inletting and discharging a heat exchange fluid into said heat exchanger.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
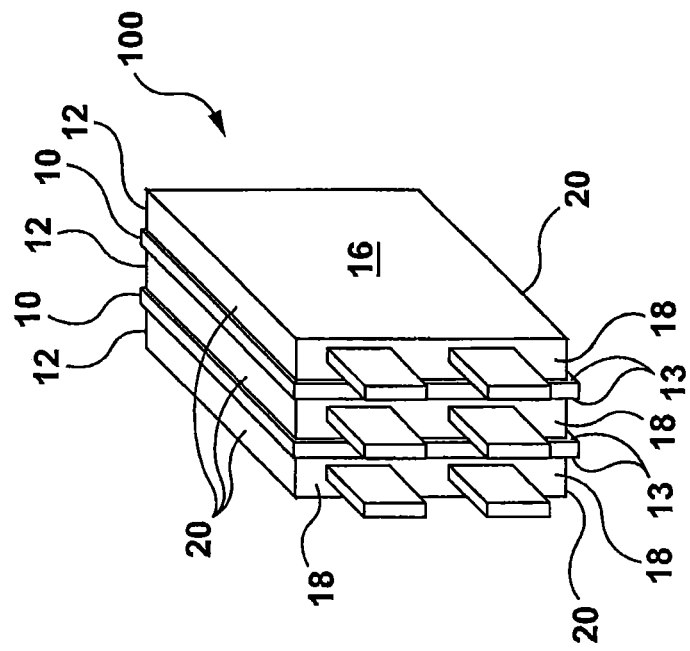
FIG. 1A is a schematic illustration of a battery unit incorporating battery cooling heat exchanger in the form of individual heat exchanger panels or ICE plate cooling plates.
Figure 1:
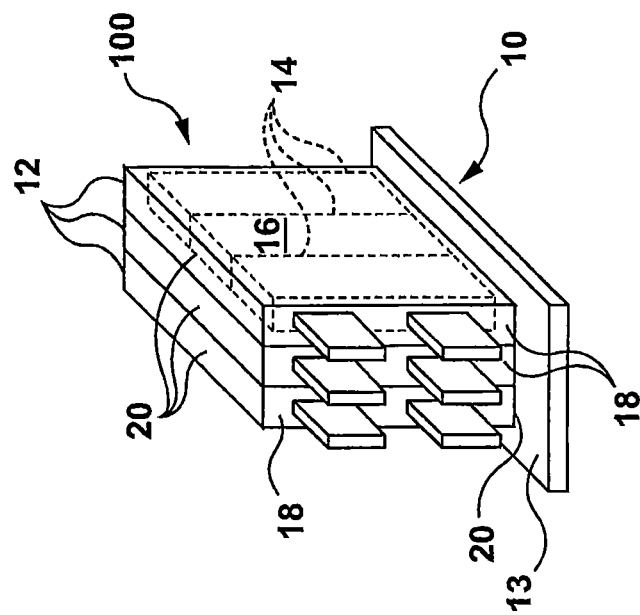
FIG. 1 is a schematic illustration of a battery unit incorporating a battery cooling heat exchanger in the form of a cold plate heat exchanger.

Referring now to FIG. 1, there is shown a schematic, illustrative example of a rechargeable battery unit 100 employing a battery cooling heat exchanger 10. The battery unit 100 is made up of a series of individual battery cell containers 12 that may each house one or more battery cells 14. While three individual battery cells 14 are schematically illustrated in FIG. 1, it will be understood that the number of battery cells 14 housed within the battery cell container 12 may vary depending upon the particular design and/or application of the battery unit 100 and that the present disclosure is not intended to be limited to battery units having three battery cell containers 12 with three battery cells 14 arranged therein.

The individual battery cell containers 12 that house the one or more battery cells 14 each define a pair of opposed long, side faces 16, a pair of opposed, short side faces 18 and a pair of end faces 20 arranged generally perpendicular to the side faces 16, 18. In the illustrative example shown in FIG. 1, the individual battery cell containers 12 are arranged so that the long side faces 16 of adjacent battery cell containers 12 are in face-to-face or surface-to-surface contact with each other as they are stacked together to form the battery unit 100, the plurality of battery cell containers 12 being stacked on top of the battery cooling heat exchanger 10. Accordingly, in the arrangement illustrated in FIG. 1, one of the end faces 20 of each battery cell container 12 is in surface-to-surface contact with a primary heat transfer surface 13 of the heat exchanger 10. In such an arrangement, the battery cooling heat exchanger 10 is often referred to as a cold plate or cold plate heat exchanger as the battery cell containers 12 are in contact with only one side of the heat exchanger 10. As a result of this arrangement, cold plate heat exchangers typically provide a large surface area for accommodating battery stacks made up of a plurality of battery cell containers 12, the large surface area functioning as the primary heat transfer surface 13 of the heat exchanger 10. Cold plate heat exchangers also tend to be more robust in structure as the heat exchanger must support the plurality of battery cell containers 12 stacked on top of the heat exchanger 10. In some embodiments, multiple battery units 100 that each comprise a series of adjacent battery cell containers 12 housing one or more battery cells 14 are arranged on a single battery cooling heat exchanger 10 or cold plate as shown, for instance, in FIG. 2.

Referring now to FIG. 1A there is shown an illustrative example of a battery cooling heat exchanger 10 in the form of an inter-cell element or ICE plate heat exchanger. As shown, the individual battery cell containers 12 are arranged so as to be sandwiched between individual battery cooling heat exchangers 10 (or heat exchanger panels or plates, sometimes referred to as cooling plates or fins). Although not illustrated in the drawings, battery cell heat exchangers 10 can also be arranged at either end of the battery unit 100 to ensure that each long side panel 16 of each battery cell container 12 is in contact with a battery cell heat exchanger 10. Accordingly, the primary difference between the arrangements shown in FIGS. 1 and 1A is that in FIG. 1, a single battery cell heat exchanger (or cold plate) 10 is provided that serves to cool the entire battery unit 100 with the heat exchanger or cold plate 10 being arranged so that the smaller end faces 20 of the one or more battery cells housed within the battery cell containers 12 are stacked on top of the heat exchanger or cold plate 10, the battery cell heat exchanger 10 therefore having a single primary heat transfer surface 13 for engaging with the battery cell containers 12. In FIG. 1A, a plurality of battery cell heat exchangers (or ICE plates) 10 are provided that each serve to cool the larger side faces 16 of the one or more battery cell containers 12, the battery cell heat exchangers 10 having a primary heat transfer surface 13 on either side thereof for contacting the adjacent battery cell container 12, the heat exchangers 10 and battery cell containers 12 therefore being interleaved or sandwiched between one another. Therefore, in the illustrative example shown in FIG. 1, it will be understood that only one side of the battery cooling heat exchanger 10 is in contact with the battery cells 14 and/or battery cell containers 12, while in the illustrative example shown in FIG. 1A both sides of the battery cooling heat exchangers or heat exchanger panels 10 are in contact with the battery cells 14 and/or battery cell containers 12 that form the battery unit 100.

Figure 3:
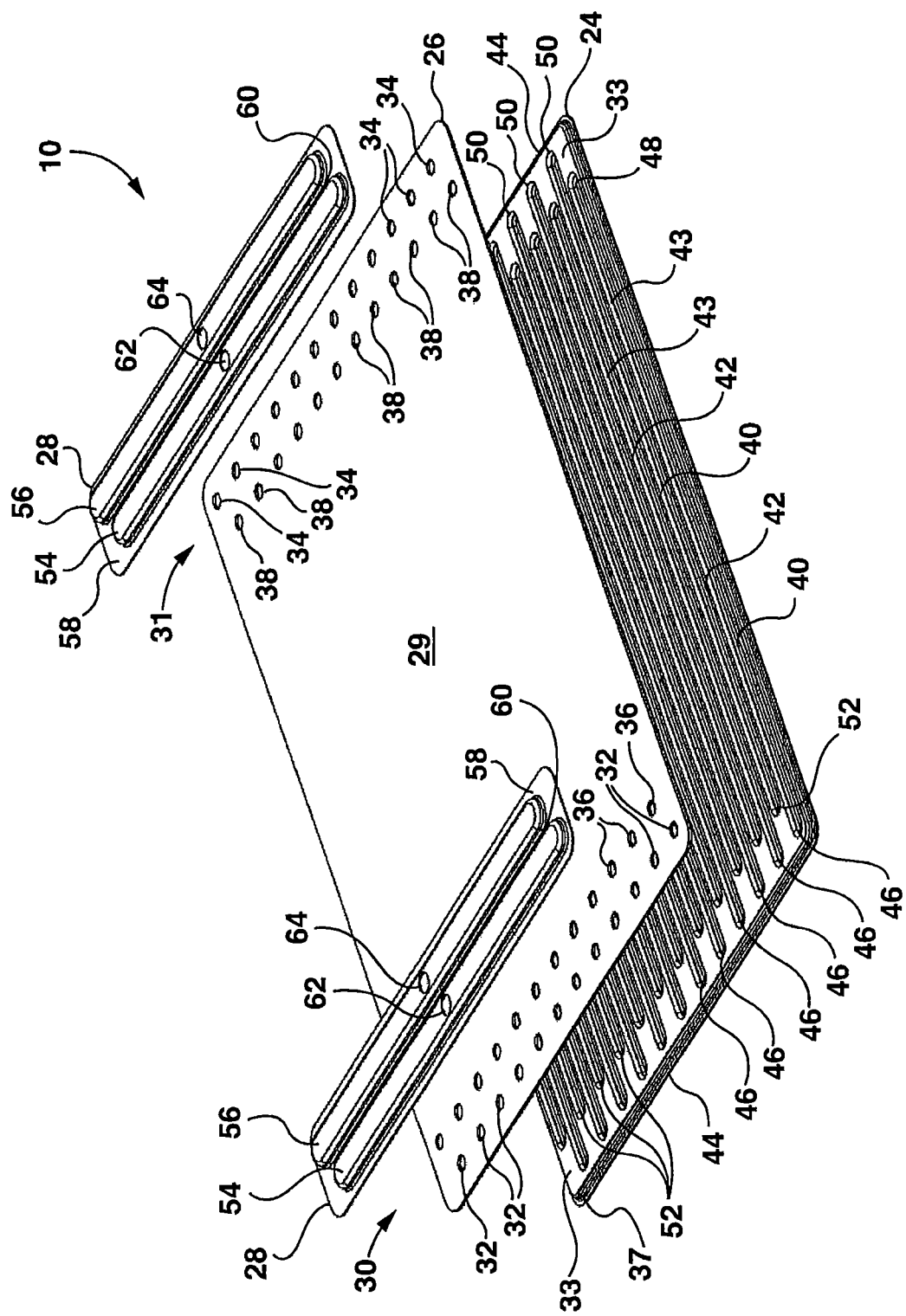
FIG. 3 is a perspective, exploded view of an example embodiment of a heat exchanger according to the present disclosure.

Referring now to FIG. 3, there is shown an example embodiment of a battery cooling heat exchanger 10 according to an example embodiment of the present disclosure wherein the battery cooling heat exchanger 10 is adapted for use as or is in the form of a cold plate heat exchanger. As shown, the battery cooling heat exchanger 10 is comprised of two main heat exchanger plates, more specifically a formed base plate 24 and a cover plate 26, and two manifold plates or manifold covers 28.

Figure 2:
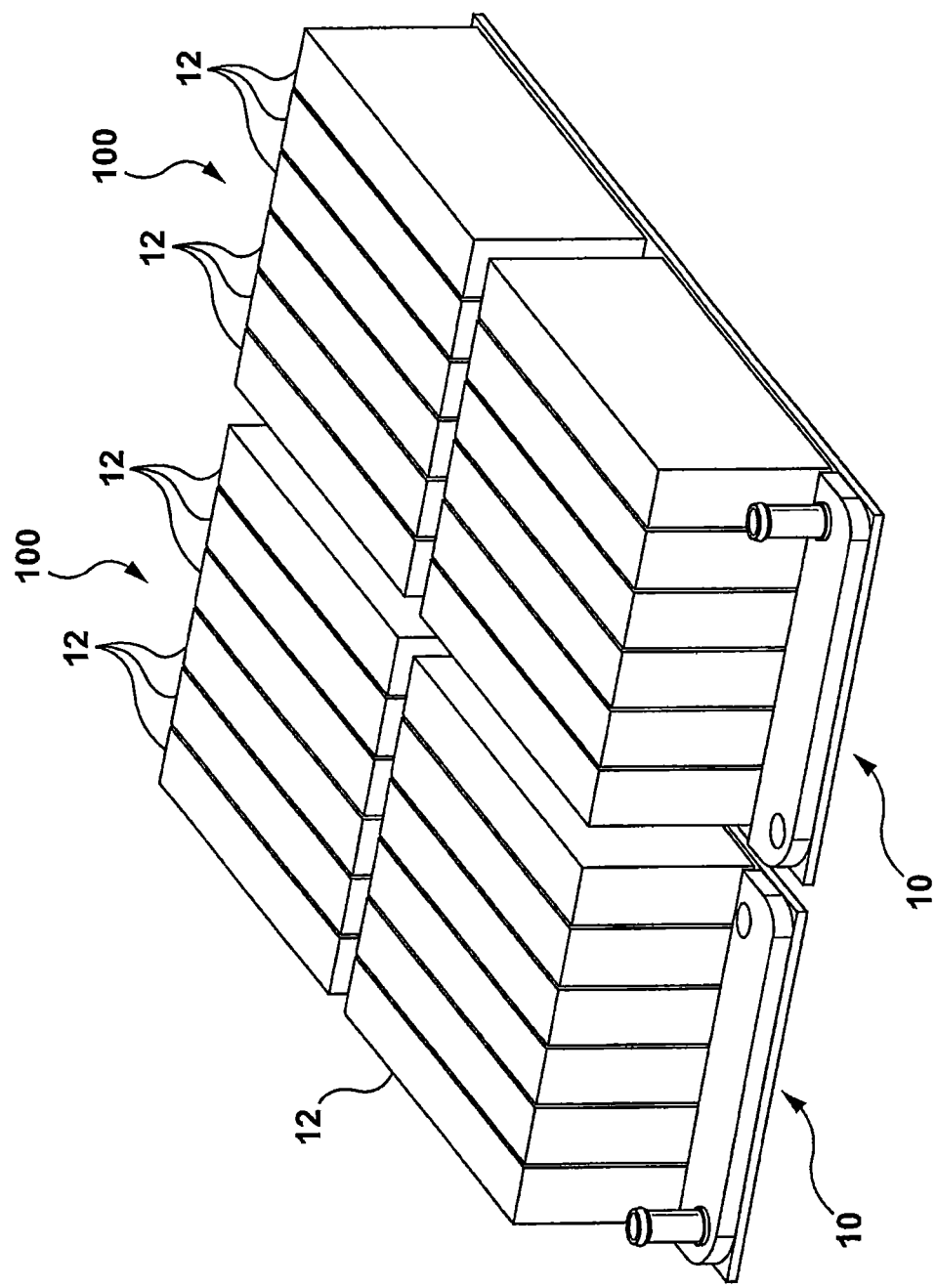
FIG. 2 is a schematic illustration of an alternate embodiment of a battery unit incorporating a battery cooling heat exchanger in the form of a cold plate heat exchanger.
Figure 4:
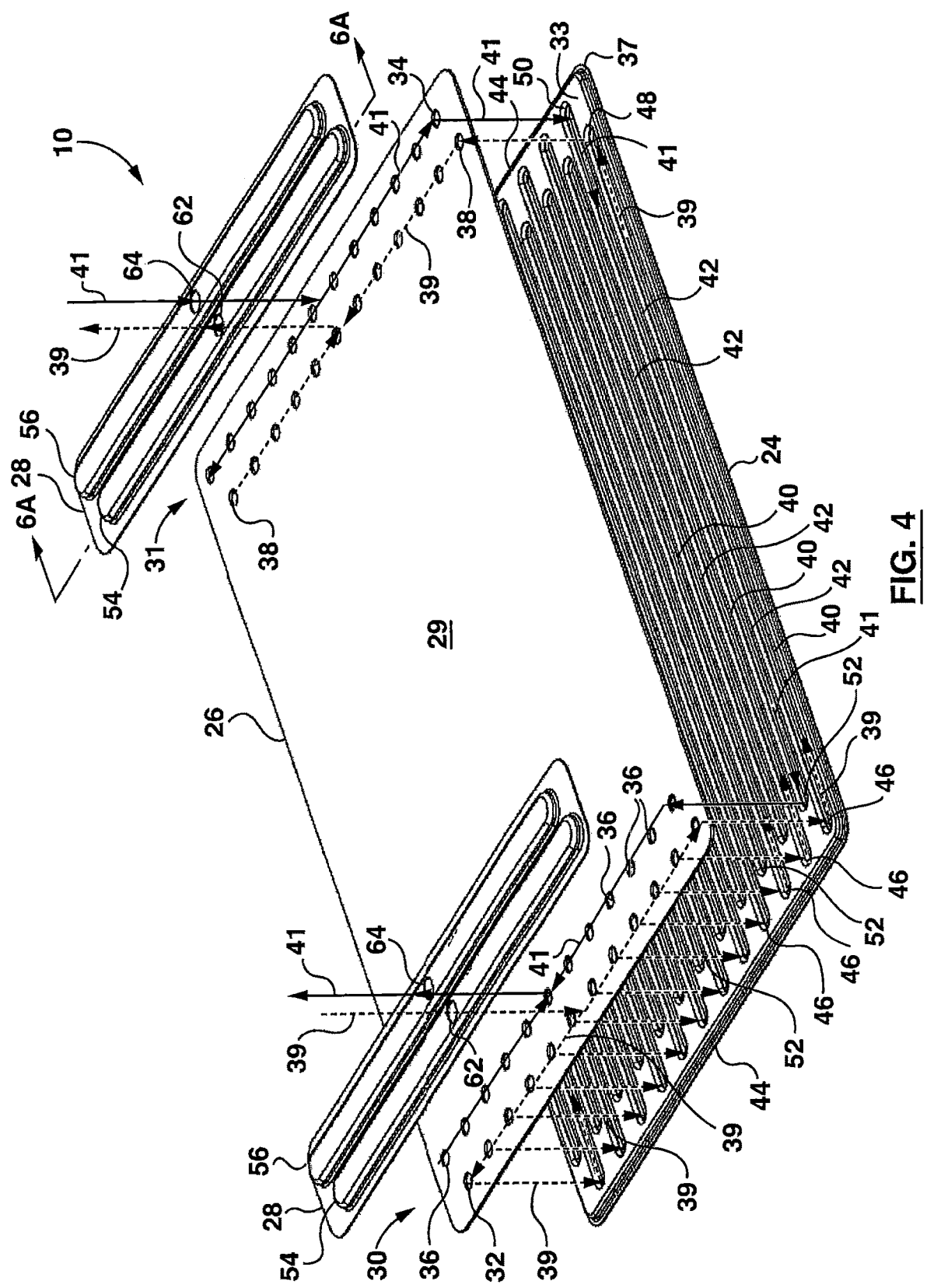
FIG. 4 is a perspective exploded view of the heat exchanger as shown in FIG. 3 illustrating the flow schematics through the heat exchanger.

Cover plate 26 has a central, generally planar region 29 upon which the individual battery cell containers 12 are stacked when the heat exchanger 10 is arranged together with the battery unit 100, as shown for instance in FIGS. 1 and 2. The central, generally planar region 29 of the cover plate 26, therefore defines the primary heat transfer surface 13 of the heat exchanger 10. Cover plate 26 also includes first and second manifold regions 30, 31 formed at opposed ends of the cover plate 26, the central, generally planar region 29 of the cover plate 26 therefore extending between the opposed first and second manifold regions 30, 31. First and second manifold regions 30, 31 each comprise a first, outermost row of fluid routing ports or fluid openings 32, 34 arranged at spaced apart intervals along the width of the cover plate 26 and a second or innermost row of fluid routing ports or fluid openings 36, 38 arranged at spaced apart intervals along the width of the cover plate 26. As illustrated in FIGS. 3 and 4, the fluid openings 32, 34 found in the respective first or outermost rows of the respective manifold regions 30, 31 are formed so as to be staggered or offset with respect to the fluid openings 36, 38 forming the respective second or inner rows of fluid routing ports 36, 38 within the respective manifold regions 30, 31. In essence, the fluid openings 36, 38 forming the second or innermost rows of fluid openings of each manifold region 30, 31 are arranged so as to generally be aligned with the spaces or spaced apart gaps provided between the fluid openings 32, 34 forming the first or outermost row of fluid openings 32, 34.

Figure 5:
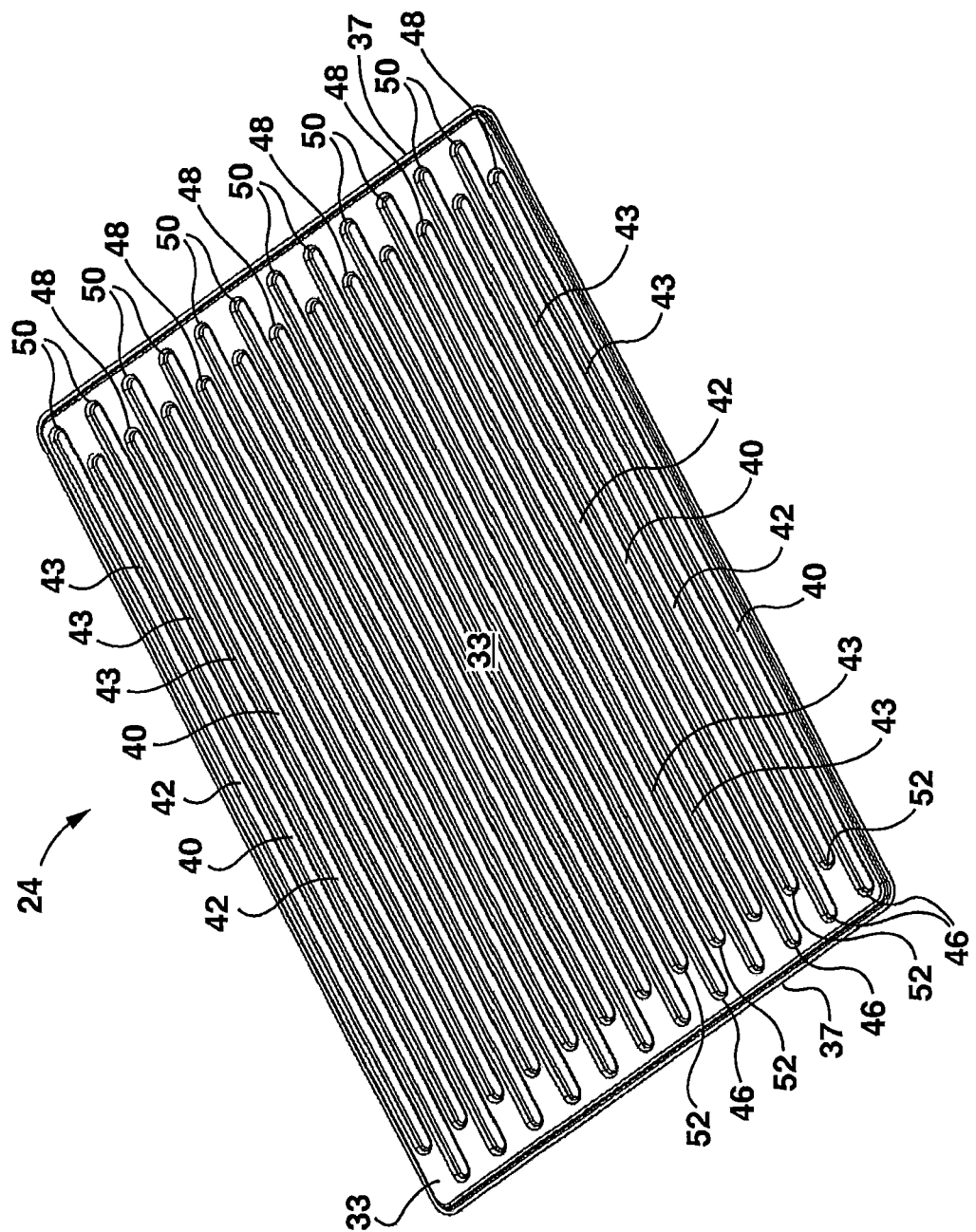
FIG. 5 is a top perspective view of the base plate of the heat exchanger as shown in FIG. 3.
Figure 6:
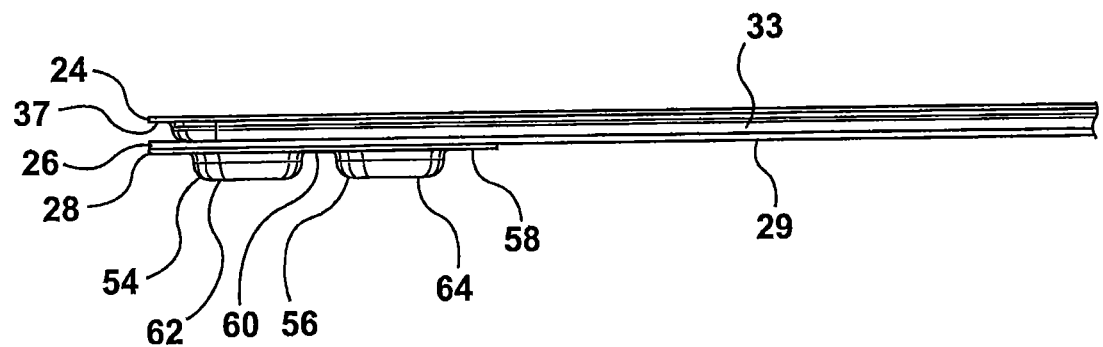
FIG. 6 is a partial, upside-down side plan view of the heat exchanger of FIGS. 3 and 4 in its assembled state.
Figure 6A:
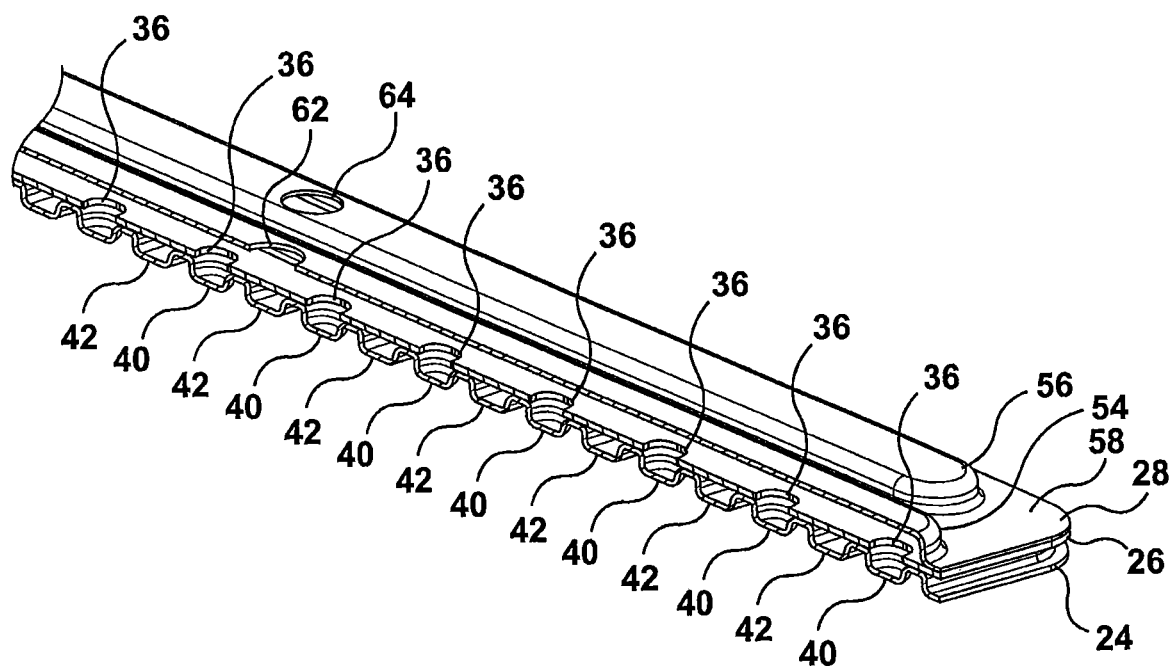
FIG. 6A is a perspective, sectional view taken along section line 6A-6A through one of the manifold regions of the heat exchanger of FIG. 4.

Base plate 24 is generally in the form of a upside-down, dished-plate having a central, generally planar portion 33 surrounded by a peripheral flange 37, the central generally planar portion 33 being raised out of or extending out of the plane of the peripheral flange 37. A plurality of alternating first and second fluid flow passages 40, 42 are formed in the central, generally planar portion 33 of the base plate 24, the first and second fluid flow passages 40, 42 extending generally between the opposed ends 44 of the base plate 24. The first and second fluid flow passages 40, 42 are slightly staggered or longitudinally offset with respect to one another in their alternating arrangement such that each of the first fluid flow passages 40 have a first end 46 generally aligned with the one of fluid openings 32 in the first manifold region 30 and a second end 48 generally aligned with one of the fluid openings 38 formed in the second row of the second manifold region 31 at the opposed end of the heat exchanger 10. Similarly, each of the second fluid flow passages 42 has a first end 50 generally aligned with one of the fluid openings 34 formed in the first row of second manifold region 31 and a second end 52 generally aligned with one of fluid openings 36 formed in the second row of the first manifold region 30. Accordingly, the second end 52 of the second fluid flow passages 42 is inwardly disposed from the corresponding end edge 44 of the plate 24 as compared to or with respect to the first end 46 of the first fluid flow passages 40 as shown more clearly in FIG. 5. Therefore, when the base plate 24 and cover plate 26 are arranged together in their face-to-face mating relationship, cover plate 26 effectively seals or encloses the individual fluid flow passages 40, 42 formed in base plate 24.

Base plate 24 is typically made from a thin sheet of metal material that is stamped to form the first and second sets of flow passages 40, 42, the first and second sets of flow passages 40, 42 being formed by elongate depressions or trough regions formed in the central, generally planar portion 33 of the base plate 24, the individual trough regions being spaced apart by lands or flow dividers 43. The lands or flow dividers 43 and any remaining areas of the central generally portion 33 provide contact surfaces or brazing surfaces for surface-to-surface contact with the corresponding side of cover plate 26 when the base plate and cover plate 24, 26 are brazed or otherwise sealed together.

Manifold plates or covers 28 are arranged over top of the respective first and second manifold regions 30, 31 on cover plate 26. Each manifold plate 28 has a pair of embossments 54, 56 raised out of the surface of the manifold plate 28 forming respective inlet and outlet manifolds. The first and second embossments 54, 56 are raised out of the surface of the manifold plate 28 and surrounded by a peripheral flange 58, the first and second embossments 54, 56 being separated or spaced apart from each other by planar, intermediate region 60 that extends between the pair of embossments 54, 56. A fluid opening 62, 64 is formed in each, respective embossment 54, 56 for providing fluid access to the inlet and outlet manifolds defined by the first and second embossments 54, 56 when the manifold plates 28 are arranged in mating relationship with cover plate 26 sealingly enclosing the first and second rows fluid openings 32, 36, 34, 38 formed in the respective manifold regions 30, 31 of cover plate 26. Fluid opening 62 in the first embossments 54 of each manifold cover 28 therefore, is in fluid communication with the fluid openings 32, 38. Similarly, fluid opening 64 formed in each of the second embossments 56 of each manifold cover 28 is in fluid communication with the fluid openings 36, 34 as illustrated for instance in FIG. 4 by way of the schematic flow lines included in the drawing.

In use, fluid entering the heat exchanger 10 through fluid opening 62 formed in embossment 54 in manifold region 30 is distributed to each of the first flow passages 40 through fluid openings 32 and travels through each of the individual flow passages 40 before exiting the heat exchanger 10 through fluid opening 62 formed in embossment 54 in manifold region 31 via fluid openings 38 in cover plate 26 as shown schematically by the flow directional arrows 39 in FIG. 4. Similarly, fluid entering the heat exchanger 10 through fluid opening 64 formed in embossment 56 in manifold region 31 is distributed to each of the second flow passages 42 through fluid openings 34 and travels through the individual flow passages 42 before exiting the heat exchanger 10 through fluid opening 64 formed in embossment 56 in manifold region 30 via fluid openings 36 in cover plate 26 as shown schematically by flow directional arrows 41 in FIG. 4. While the example embodiment illustrated in FIG. 4 shows the fluid entering the heat exchanger 10 through fluid openings 62, 64 formed in outermost embossments 54, 56 of the respective manifold covers 28 at opposed ends of the heat exchanger 10 and exiting the heat exchanger 10 through fluid openings 62, 64 in the innermost embossments 56, 54 of the respective manifold covers 28 at the opposed ends of the heat exchanger 10, it will be understood that the flow direction through the heat exchanger 10 is intended to be exemplary and should not be limited to the specific arrangement illustrated in FIG. 4 as the converse or reverse arrangement is also possible depending upon the particular application/design of the heat exchanger and the required arrangement of any corresponding fluid fittings/ports.

By providing respective inlet and outlet manifolds at opposed ends of the heat exchanger 10, liquid coolant can enter the heat exchanger 10 at each end thereof through the inlet manifolds or embossments 54, 56 and travel in counter-flow arrangement through respective fluid flow passages 40, 42 across the width of the heat exchanger before exiting the heat exchanger 10 at the opposed end through outlet manifolds or embossments 56, 54 as illustrated by the flow directional arrows included in FIG. 4. Therefore as liquid coolant travels through the heat exchanger 10 from one end thereof to the other and gradually increases in temperature as it draws heat away from the battery cells and/or battery cell containers 12 arranged in thermal contact with the cover plate 26 of the heat exchanger 10, the gradual increase in temperature from the inlet end to the outlet end of one of the set of fluid flow passages 40, 42 is counteracted by the cold or lower temperature coolant entering the heat exchanger 10 at the opposite end thereof. The counter-flow arrangement made possible by the longitudinally staggered fluid flow passages 40, 42 and the staggered first and second rows of fluid openings 32, 36, 34, 38 formed in the cover plate 26 and enclosed by manifold plates 28 helps to improve the overall temperature uniformity across the surface of the heat exchanger 10 which, in turn, may serve to improve the overall thermal management of the battery unit(s) 100 arranged in thermal contact with the heat exchanger 10.

Referring now to FIGS. 7-11 there is shown another example embodiment of the battery cooling heat exchanger 10(1) in accordance with the present disclosure wherein like reference numerals have been used to identify similar features. In this embodiment, rather than having first and second manifold regions 30, 31 arranged at opposed ends of the heat exchanger 10(1), only a single manifold region 30 is provided at one end of the heat exchanger 10, the counter-flow arrangement therefore being provided in the form of a two-pass or U-flow heat exchanger as will be described in further detail below.

Figure 7:
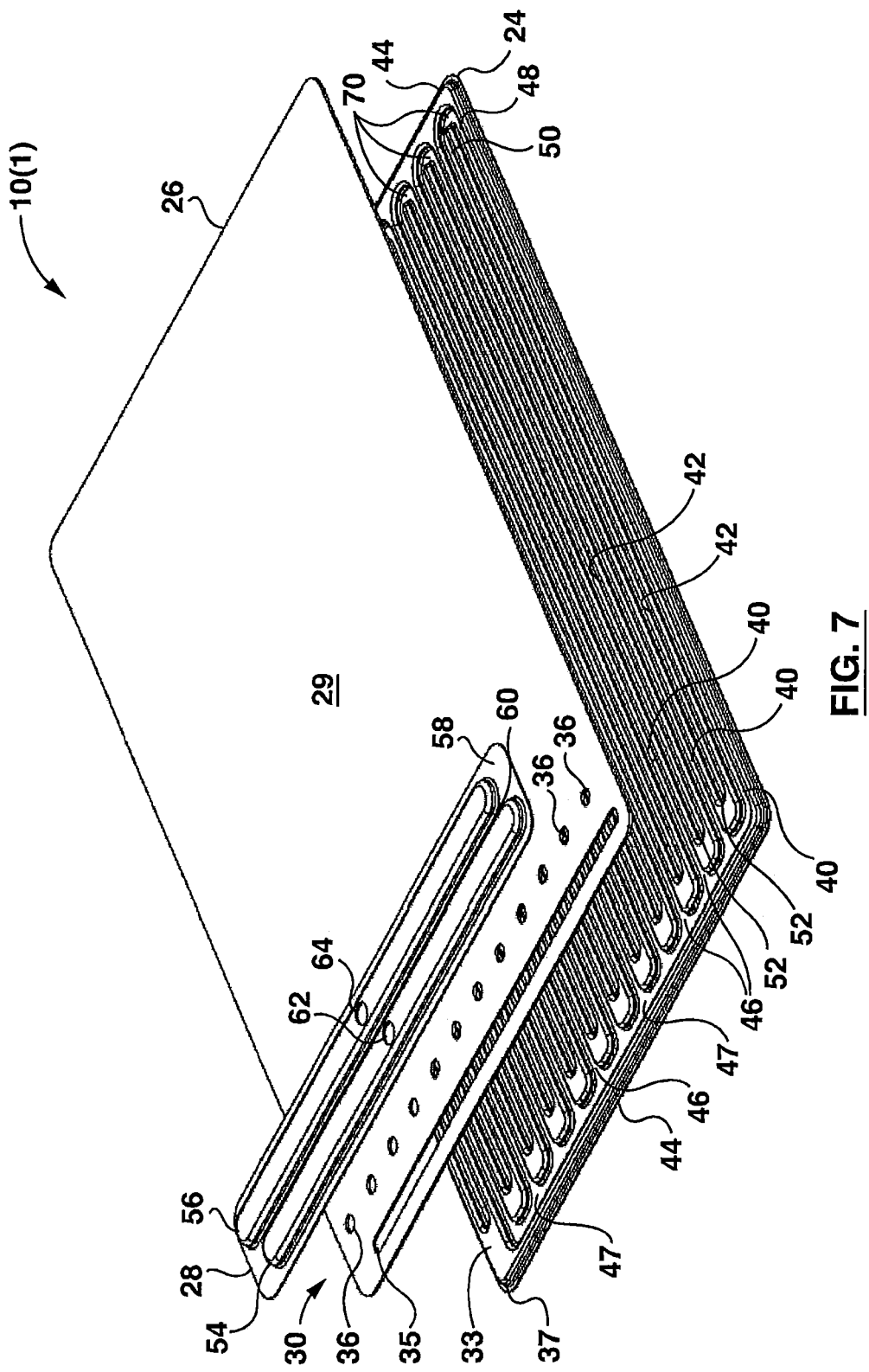
FIG. 7 is a perspective, exploded view of another example embodiment of a heat exchanger according to the present disclosure.

As shown in FIG. 7, heat exchanger 10(1) is comprised of a formed base plate 24 and a cover plate 26, and a single manifold plate or manifold cover 28 arranged at one of the ends of the heat exchanger 10(1). Cover plate 26 is similar in structure to the cover plate 26 described above in connection with FIGS. 3-6, except that only one manifold region 30 is provided at one end of the central, generally planar region 29, the manifold region 30 having a first, outermost row in the form of a fluid routing slot 35 that extends generally along the width of the cover plate 26 and a second innermost row comprising a plurality of spaced apart fluid openings 36, the series of spaced apart fluid openings 36 being slightly staggered or offset along with width of the cover plate 26 with respect to slot 35.

In the subject embodiment, base plate 24 is also in the form of an upside-down dished plate having a central, generally planar portion 33 surrounded by a peripheral flange 37, the central, generally planar portion extending or projecting out of the plane of the peripheral flange 37. A plurality of alternating first and second fluid flow passages 40, 42 are formed in the central, generally planar portion 33 of the base plate 24 that extend between the opposed ends 44 of the base plate 24. The first and second fluid flow passages 40, 42 are formed by a series of interconnected U-shaped depressions or trough regions 45 formed in the central, generally planar portion 33 of the base plate 24. First flow passages 40 each have a first end 46 at the manifold end 30 of the heat exchanger 10(1) and a second end 48 formed at the opposed end of the heat exchanger 10(1), the first ends 46 of the plurality of first fluid flow passages 40 being interconnected by an inlet header region 47 that interconnects the open, free ends 46 of the plurality of U-shaped depressions 45. The inlet header region 47, therefore is also in the form of a depression within the central generally planar portion 33 of the base plate 24 and is generally aligned with the fluid routing slot 35 formed in the manifold region 30 of cover plate 26. The second flow passages 42 also extend generally along the length of the base plate 24 and generally parallel to the first flow passages 40 and have a first end 50 generally adjacent to and in line with the second end 48 of the adjacent first flow passages 40, and a second end 52 at the opposed end of the base plate 24, the second end 52 of the second flow passages 42 being a closed, free end of the U-shaped depressions 45 and slightly offset or inwardly disposed from the corresponding end edge 44 of the base plate 24 by a greater distance than the first end 46 of the first flow passages 40.

Figure 8:
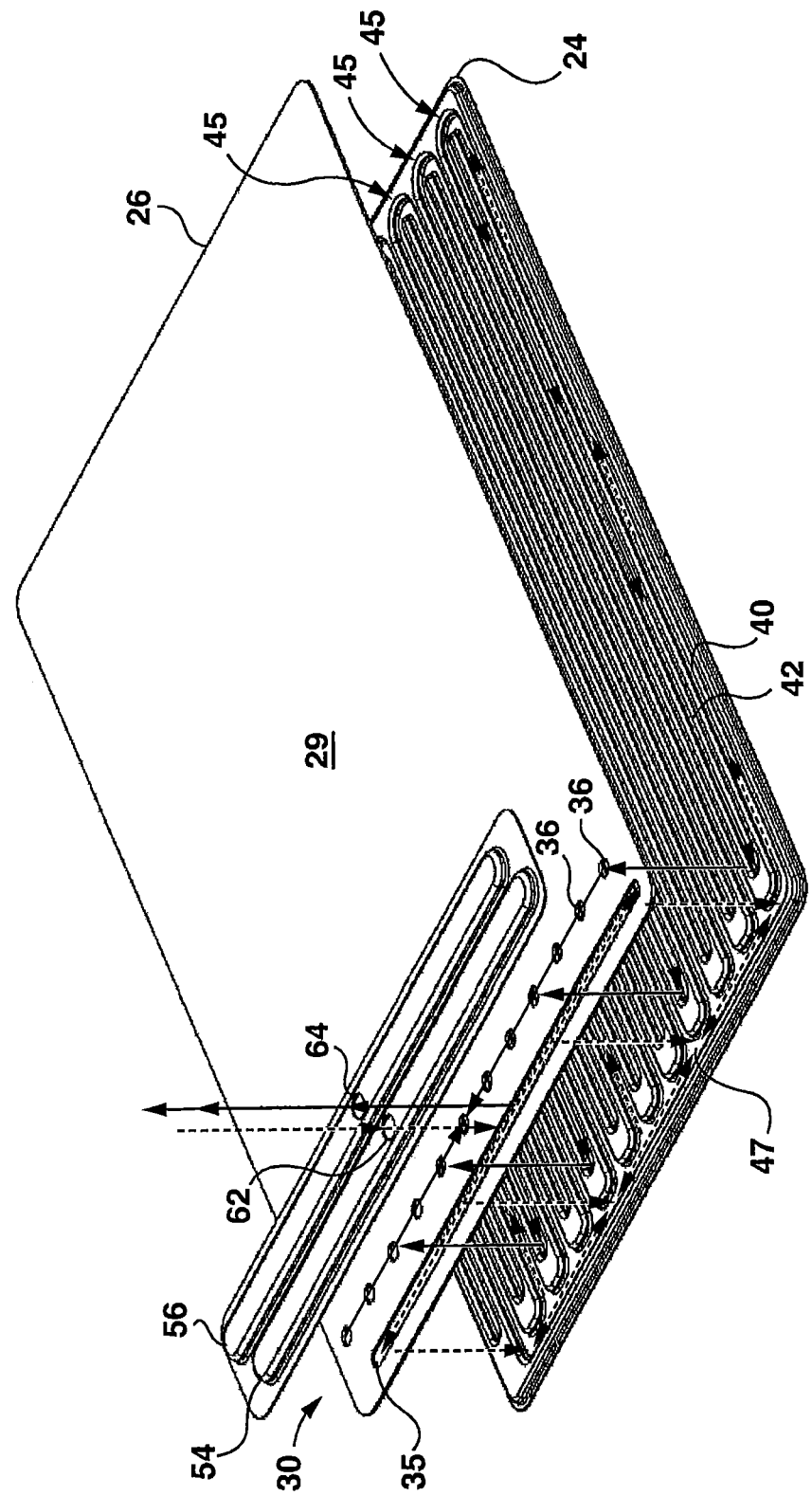
FIG. 8 is a perspective exploded view of the heat exchanger as shown in FIG. 7 illustrating the flow schematics through the heat exchanger.
Figure 9:
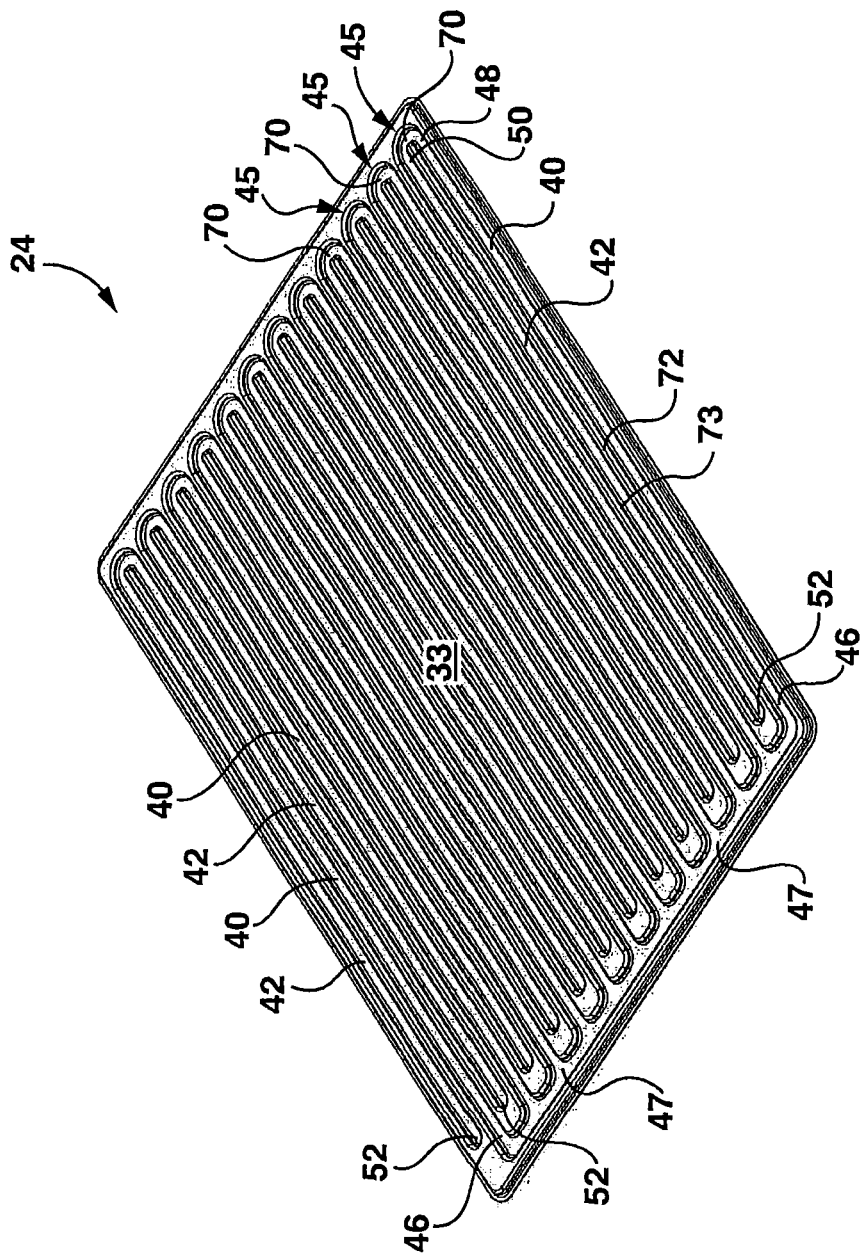
FIG. 9 is a top perspective view of the base plate of the heat exchanger as shown in FIG. 8.

As shown more clearly in FIG. 9, the second end 48 of the first flow passages 40 and the first ends 50 of the second flow passages 42 are interconnected by U-shaped turn portions 70, the first flow passages 40, turn portions 70 and second flow passages 42 together forming the plurality of U-shaped depressions 45 that extend across the width of the base plate 24. Accordingly, fluid travelling through the heat exchanger 10(1) is distributed to each of the first flow passages 40 through the inlet header region 47 and flows through the first flow passages 40 in a first direction from one end of the heat exchanger 10(1) to the other before being switch-backed through turn portions 70 and travelling back through the heat exchanger 10(1) through the second flow passages 42 in a second direction that is opposite the first direction, as shown schematically by the flow directional arrows included in FIG. 8.

As in the previous embodiment, base plate 24 is typically formed by stamping, the first and second sets of flow passages 40, 42, turn portions 70 and inlet header region 47 being formed by the series of interconnected U-shaped trough regions or U-shaped depressions 45 that are stamped or otherwise formed in the central generally planar portion 33 of the base plate 24. The U-shaped trough regions or depressions 45 form corresponding flow dividers 72 that separate the first flow passage 40 from the second flow passage 42 within one of the U-shaped depressions 45 allowing for the counter-flow or two-pass flow arrangement, the respective U-shaped trough regions or depressions 45 also being separated by lands or flow dividers 73 which space apart the adjacent U-shaped trough regions 45 thereby separating the second flow passage 42 of one U-shaped depression 45 from the first flow passage 40 of the adjacent U-shaped depression 45. The flow dividers 72, lands 73 and any remaining areas of the central generally portion 33 of the base plate 24 that surround the plurality of U-shaped trough regions or depressions 45 act as brazing surfaces for surface-to-surface contact with the corresponding side of cover plate 26 so that the two plates can be brazed or otherwise sealed together enclosing flow passages 40, 42 therebetween.

A single manifold cover plate 28, as shown in FIGS. 7 and 8, is provided and arranged on top of and in sealing contact with the cover plate 26 when the heat exchanger is assembled, the manifold cover 28 being in the same format as described above with first and second embossments 54, 56 being formed therein which are positioned, respectively, over fluid routing slot 35 and the second row of fluid openings 36 formed in the cover plate 26. Accordingly, in use, fluid entering the heat exchanger 10(1) enters through fluid opening 62 in embossment 54 where it is distributed to the inlet header region 47 through fluid slot 35 formed in cover plate 26 as shown for instance in the sectional views through the manifold area in FIGS. 10 and 11 and as illustrated by flow directional lines in FIG. 8. From the inlet header region 47, the fluid is distributed to each of the first fluid flow passages 40 and travels through fluid flow passages 40 from one end of the heat exchanger to the other where it is turned 180 degrees through the U-shaped turn portions 70 before travelling back to the other end of the heat exchanger through second flow passages 42. The fluid then exits the second set of flow passages 42 through fluid openings 36 before exiting the heat exchanger 10(1) through embossment or fluid outlet manifold 56. By creating a two-pass flow path for the liquid coolant flowing through the heat exchanger 10(1), the coolant travelling though the second set of flow passage 42 is warmer in temperature than the liquid coolant travelling through the first set of flow passages 40 as it has already completed a pass through the heat exchanger. In this two-pass arrangement, the warmer fluid travelling through the second set of flow passages 42 is brought into thermal contact with the cooler liquid coolant travelling through the first set of flow passages 40. Bringing the warmer liquid coolant in the second set of flow passages 42 into thermal contact or heat transfer relationship with the cooler liquid coolant flowing in the first set of flow passages 40 helps to counteract any temperature differential across the surface of the heat exchanger 10(1) due to the heat transfer that takes place between the adjacent flow passages 40, 42 which, in turn, helps to ensure appropriate thermal management of the battery cell containers 12 stacked on top of the cover plate 26 of the heat exchanger 10(1) is achieved.

Figure 8A:
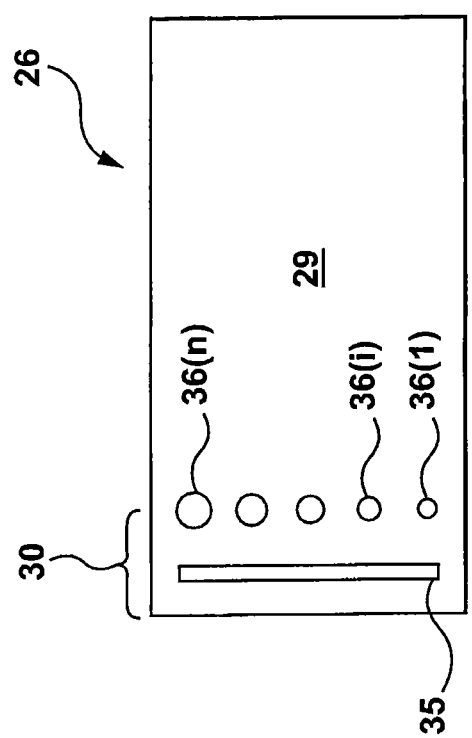
FIG. 8A is a schematic, top plan view of an alternate embodiment of a cover plate for the heat exchanger of FIG. 8.

FIG. 8A illustrates a variation of the cover plate 26 shown in FIGS. 7 and 8 wherein the manifold region 30 is made up of fluid routing slot 35 that provides fluid communication with the inlet header region 47 of the base plate 24 and the adjacent row of fluid openings 36 that serve as fluid outlets from the second ends 52 of the second fluid flow passages 42 formed in the base plate 24 to the outlet manifold formed by embossment 56 of the manifold cover plate 28. However, in this embodiment, the size or diameter of each of the fluid openings 36 slightly increases for each opening 36 formed across the width of the cover plate 26. Accordingly, the first fluid opening 36(1) is of a first size or has a first diameter with each subsequent fluid opening 36(i) having an increased diameter as compared to the previous fluid opening until reaching the final fluid opening 36(n) having the largest diameter of all of the fluid openings 36. The graded hole size or gradually increasing diameter of the fluid openings 36 across the width of the cover plate 26 can be used to customize the flow distribution to/from each of the fluid flow passages. For instance, it will be understood that fluid openings 36 having a larger diameter will result in lower pressure drop and increased flow as compared to a similar fluid opening 36 having a smaller diameter.

While FIG. 8A illustrates the graded fluid openings in connection with the row of fluid openings associated with the outlet or second ends 52 of the second fluid flow passages 42, it will be understood that the graded fluid openings could also be incorporated into embodiments where fluid openings are also used in connection with the inlet manifold, as opposed to a fluid routing slot 35. Accordingly, it will be understood that graded fluid openings could be incorporated into any of the embodiments disclosed herein in order to further customize the flow through the heat exchanger.

Figure 9A:
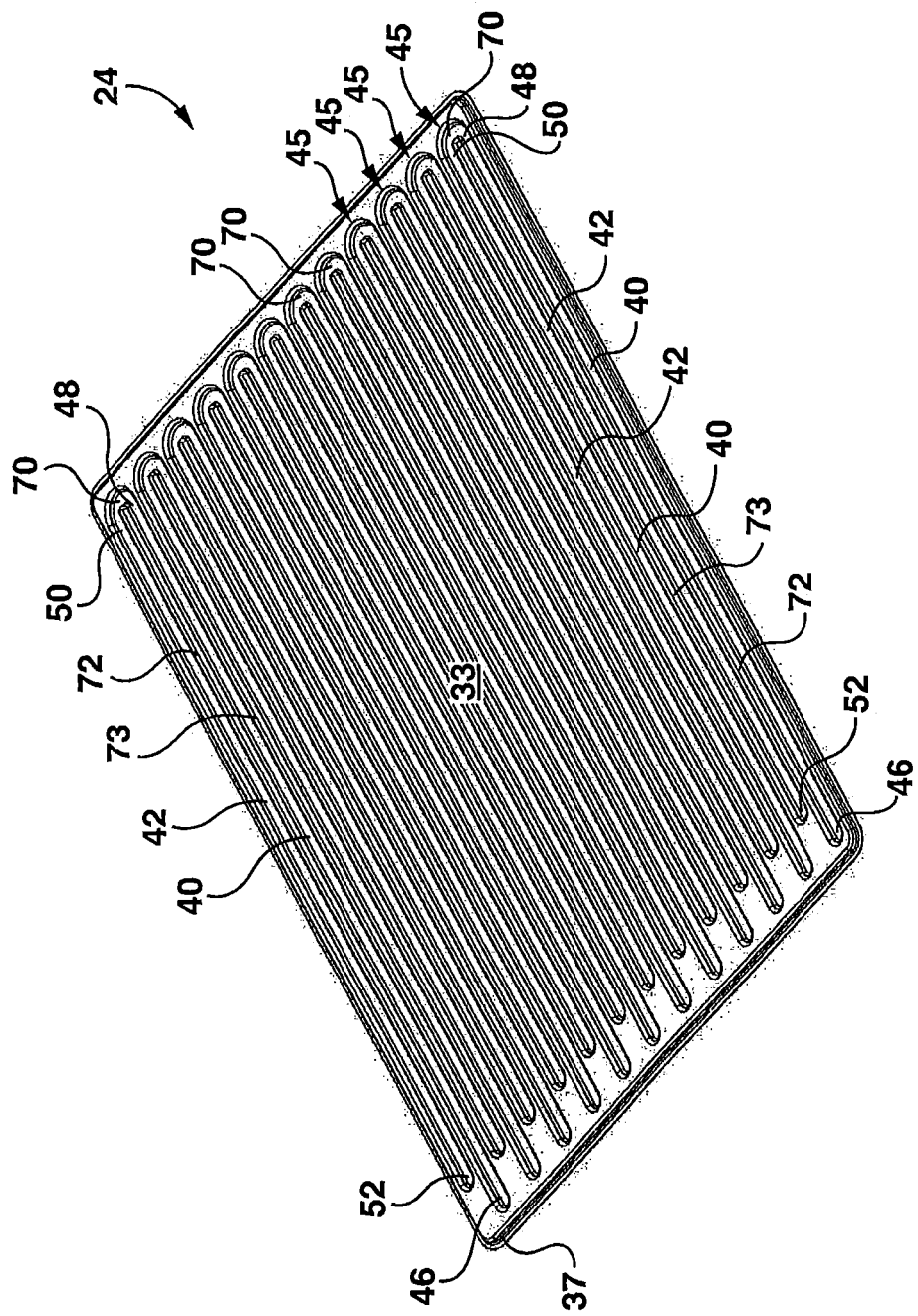
FIG. 9A is a top perspective view of an alternate embodiment of the base plate of FIG. 9.

Referring now to FIG. 9A there is shown an alternate embodiment of the base plate 24 for forming the two-pass or U-flow heat exchanger 10(1) described above in connection with FIGS. 7-9, 10 and 11. In this embodiment, rather than having the open, free ends 46 of the U-shaped depressions 45 or the first ends 46 of the first fluid flow passages 40 formed by the U-shaped depressions 45 interconnected by an open, inlet header region 47, the U-shaped depressions 45 terminate at two discrete ends, namely the first ends 46 of the first fluid flow passages 40 and the second ends of the second fluid flow passages 42. As shown in FIG. 9A, the second ends 52 of the second fluid flow passages 42 are longitudinally staggered or offset with respect to the first ends 46 of the adjacent first fluid flow passages 40 such that the second ends 52 of the second fluid flow passages 42 are inwardly disposed from the end edge of the base plate 24 with respect to the first ends 46 of the first flow passages 40. When the U-shaped depressions 45 are formed with discrete, closed ends 46, 52 as illustrated in FIG. 9A, the manifold region 30 of cover plate 26 may be in the same format as described above in connection with the single-pass heat exchanger 10 shown in FIG. 4 with the fluid routing slot 35 being replaced with a row of a plurality of spaced apart fluid openings 32 that are offset with respect to the fluid openings 36 in the second row of fluid routing ports in manifold region 30.

Figure 9B:
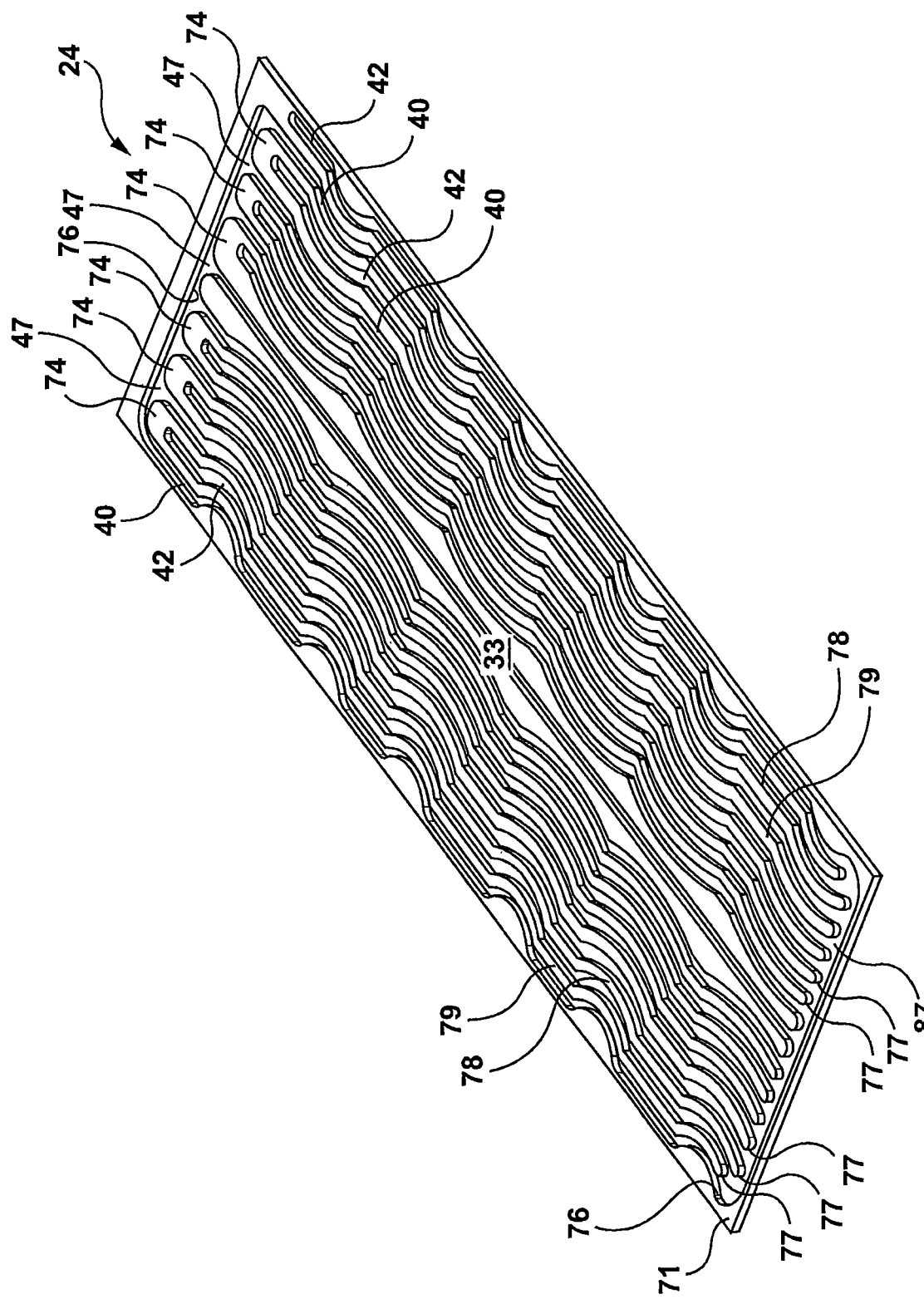
FIG. 9B is a top, perspective view of a portion of an alternate embodiment of the base plate of the heat exchanger as shown in FIG. 9.

Referring now to FIG. 9B there is shown a further alternate embodiment of the base plate 24 for forming the two-pass or U-flow heat exchanger 10(1). In this embodiment, the base plate 24 is in the form of a dished plate where the first and second fluid flow passages 40, 42 are formed by a series of generally U-shaped embossments 74 formed in the central, generally planar portion 33 of the base plate 24, the series of U-shaped embossments 74 being surrounded by a peripheral wall 76 and peripheral flange 71. The U-shaped embossments 74 that are raised out of the plane of the central generally planar region of the dished plate form corresponding or complimentary depressions or trough regions that form the plurality of alternating first and second fluid flow passages 40, 42. As shown, the U-shaped embossments 74 have two longitudinally extending flow dividers 78, 79 that serve to separate the first fluid flow passages 40 from the adjacent second fluid flow passages 42, the first fluid flow passages 40 being interconnected by a common inlet header region 47 that is formed between and extends from the peripheral wall 76 at the manifold end of the base plate 24 and the U-shaped ends of the U-shaped embossments 74, the common inlet header region 47 feeding the individual first flow passages 40. In the particular embodiment illustrated in FIG. 9B, the two longitudinally extending flow dividers 78, 79 of the U-shaped embossments 74 are wavy in structure thereby forming corresponding wavy first and second fluid flow passages 40, 42. The wavy structure of the first and second fluid flow passages 40, 42 helps to introduce turbulence into the fluid flowing through the first and second fluid flow passages 40, 42 which, in turn, may serve to improve overall heat transfer performance of the heat exchanger 10(1). At the opposite end of the base plate 24, the flow dividers 78, 79 terminate at discrete ends 77 that are spaced away from the corresponding end edge 76 of the plate 24, the second ends 48 of the first fluid flow passages 40 and the first ends of the adjacent second fluid flow passages 42 thereby being fluidly connected by way of a common fluid collecting channel 87. Therefore, fluid travelling through the first fluid flow passages 40 is switch-backed through the collecting channel 87 where it enters the second fluid flow passages 42.

Figure 9C:
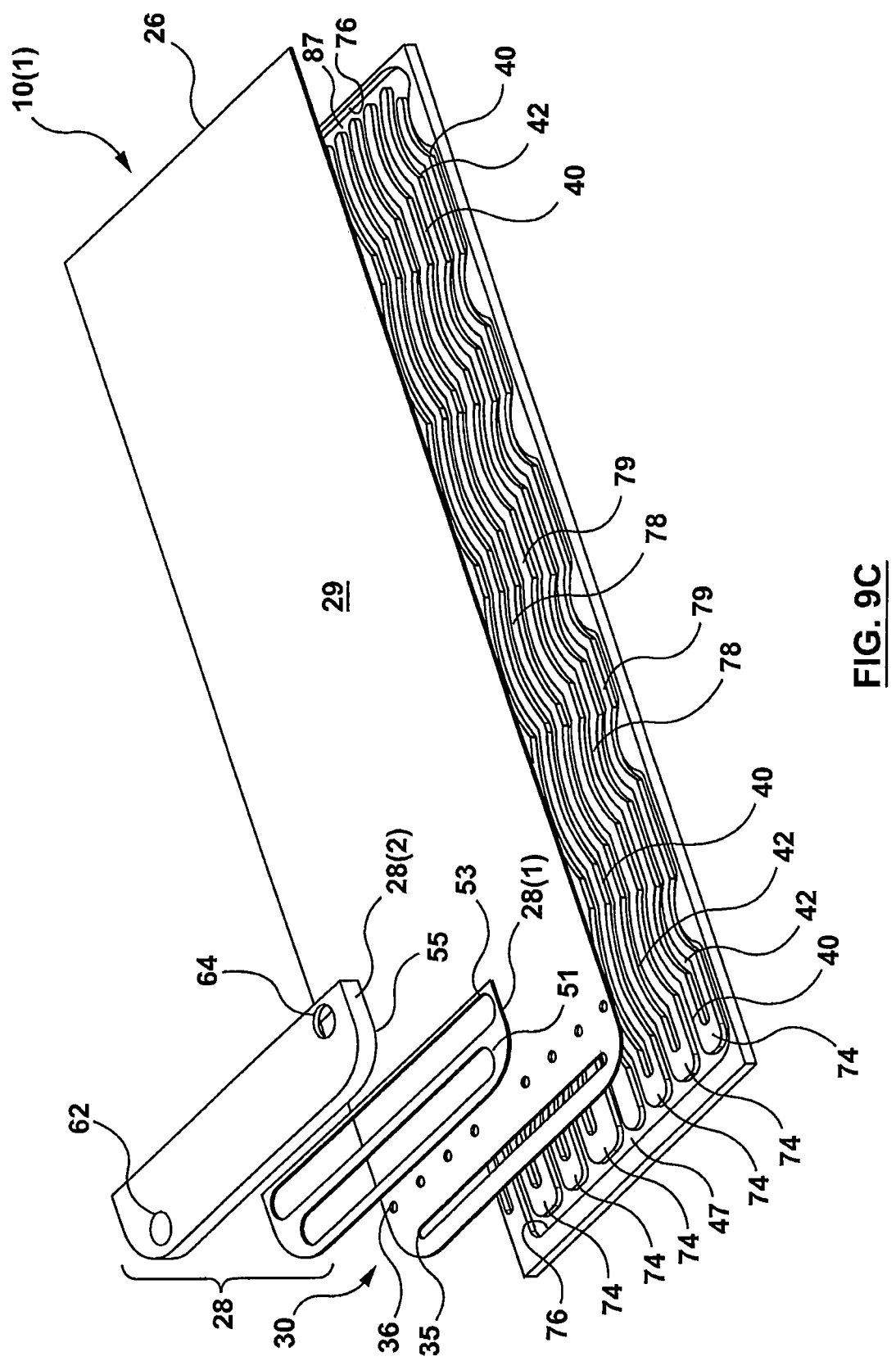
FIG. 9C is a perspective, exploded view of a heat exchanger similar to that shown in FIG. 7 incorporating the base plate of FIG. 9B and illustrating an alternate manifold structure.

Referring now to FIG. 9C there is shown a heat exchanger 10(1) incorporating base plate 24 as shown in FIG. 9B. However, in this embodiment, the manifold plate 28 is formed as a two-piece structure comprising a manifold base plate 28(1) and a manifold cover 28(2). As shown, manifold base plate 28(1) is a generally flat plate having two fluid slots 51, 53 formed therein. Fluid slots 51, 53 are arranged so as to be positioned over top of fluid slot 35 and the row of fluid openings 36 formed in cover plate 26 when the manifold base plate 28(1) is placed on top of the cover plate 26. Manifold cover 28(2) is in the form of a solid block or body of material and has two channels or trough regions (not shown) formed in the bottom surface 55 thereof and that extend into the body of the manifold cover. The channels or trough regions generally correspond to and align with the fluid channels 51, 53 formed in the manifold base plate 28(1) when the two components 28(1), 28(2) are arranged together. As in the previous embodiments, fluid openings 62, 64 are formed in the upper surface 57 of the manifold cover 28(2) each of which is in fluid communication with one of the fluid channels or trough regions formed therein. Accordingly, fluid enters the heat exchanger 10(1) through one of fluid openings 62, 64 formed in the manifold cover 28(2) where it is distributed through the corresponding channel or trough region and transmitted through the corresponding fluid slot 51, 53 formed in the manifold base plate 28(1) through either fluid slot 35 or fluid openings 36 to the corresponding first or second fluid channels 40, 42. Therefore, it will be understood that the two-piece manifold plate 28 functions in the same manner as the unitary manifold plate 28 structure described in connection with the previous embodiments. It will be understood that the two-piece structure for manifold plate 28 may be advantageous in instances where less complex tooling and manufacturing practices are desirable. It will also be understood that while fluid openings 62, 64 in the previously described embodiments have been shown as being generally centrally located in each of embossments 54, 56, fluid openings 62, 64 may also be positioned towards respective ends of the embossments 54, 56 or upper surface 57 of the manifold cover plate 28(2) as shown in FIG. 9C and that the exact positioning will depend on the required and/or desired location for the corresponding fluid fittings.

As in the previously described embodiments, a cover plate 26 is arranged on top of base plate 24 enclosing the first and second fluid flow passages 40, 42 therebetween. However, in the embodiment shown in FIG. 9B, the manifold end of the cover plate 26 is formed at the opposite end of the cover plate 26 to what is shown in FIGS. 7 and 8, the cover plate 26 thereby being formed with manifold region 31 (as opposed to manifold region 30) comprising a first row in the form of a slot 35 for providing fluid access to the inlet header region 47 and a second row of spaced apart fluid openings 38 that are arranged so as to be in fluid communication with the second ends 52 of the second fluid flow passages 42. A manifold cover 28 is arranged over top of cover plate 26 enclosing manifold region 31, as in the previously described embodiments. Accordingly, fluid entering the heat exchanger 10(1) enters through fluid opening 62 and is distributed to the inlet header region 47 via slot 35 formed in the cover plate 26. From the inlet header region 47 the fluid is distributed to each of the first fluid flow openings 40 where it travels through the heat exchanger 10(1) before being switch-backed 180 degrees through turn portions 70 before travelling back through the second fluid flow passages 42 before exiting the heat exchanger 10(1) through the fluid opening 64 in the outlet header 56 via the row of fluid openings 38 formed in cover plate 26.

Figure 9D:
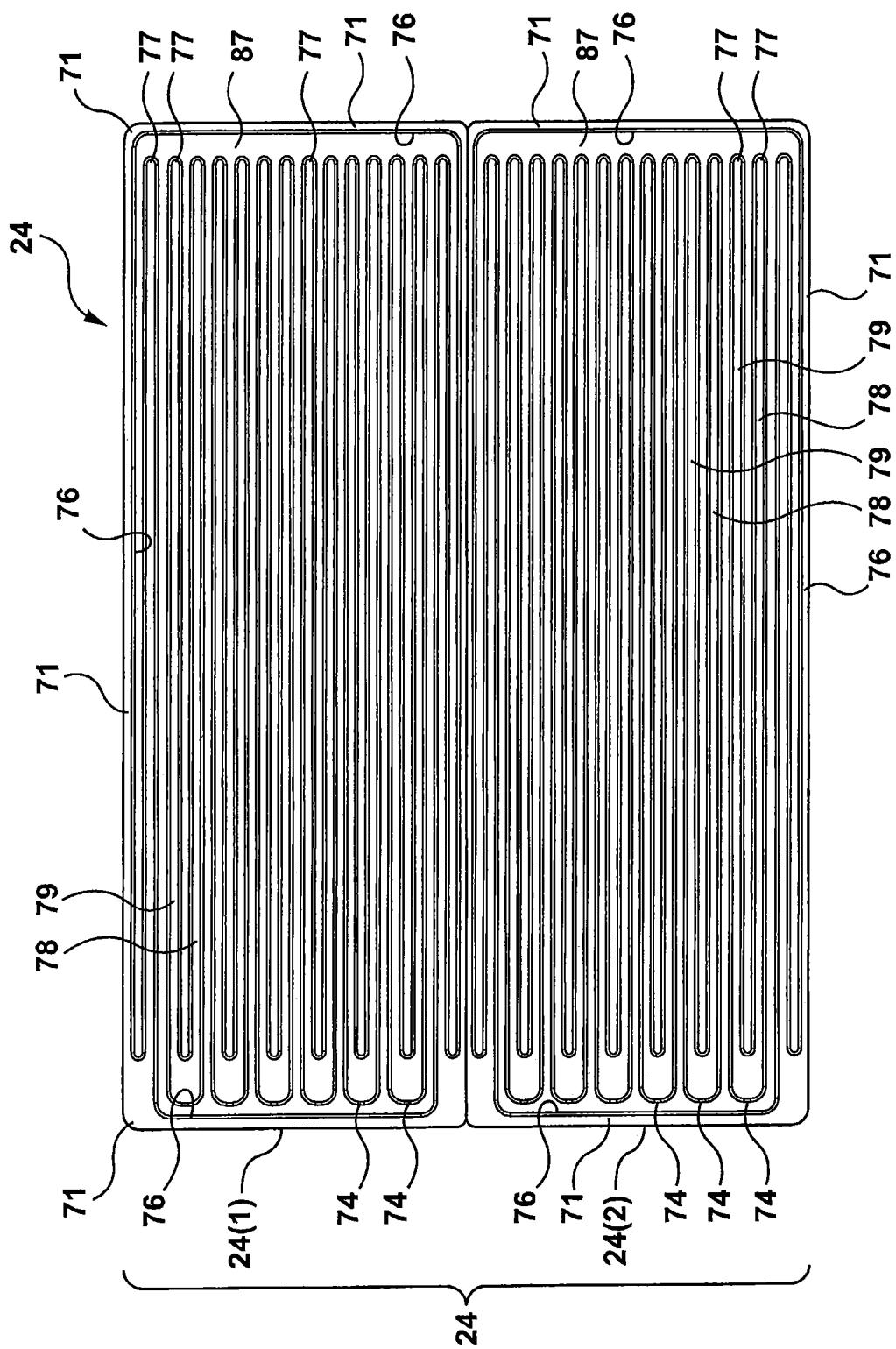
FIG. 9D is a top plan view of an alternate embodiment of a base plate for a heat exchanger according to an example embodiment of the present disclosure.

Referring now to FIG. 9D, there is shown a further variation of the base plate embodiment illustrated in FIG. 9B. In the subject embodiment, the base plate 24 is formed by one or more base plate portions or modules that are arranged adjacent to each other to form a base plate 24 having the desired, overall size for a particular application. In the illustrated embodiment, the base plate 24 is formed by two adjacent base plate portions or modules 24(1), 24(2) but it will be understood that the base plate 24 is not intended to necessarily be limited to being formed by only two portions and therefore, the number of base plate portions could be identified to generally with reference integer "i" as base plate portions 24(i). In the subject embodiment, each of the base plate portions 24(1), 24(2) is once again in the form of a dished plate where the first and second fluid flow passages 40, 42 are formed by a series of generally U-shaped embossments 74 that are formed in the central, generally planar portion 33 of the base plate 24. The series of U-shaped embossments 74 are surrounded by a peripheral wall 76 and by a peripheral flange 71 that surrounds the plate and extends generally in the same plane as the U-shaped embossments 74. The U-shaped embossments 74 and the surrounding peripheral flange 71 provide contact or sealing surfaces against which the corresponding side of the cover plate 26 can rest when the two plates 24, 26 are arranged and otherwise sealed together (by brazing or any suitable means) in their mating relationship to form the heat exchanger 10(1). The U-shaped embossments 74 that are raised out of the plane of the central generally planar region of the dished plate form corresponding or complimentary depressions or trough regions that form the plurality of alternating first and second flow passages 40, 42. However, in the subject embodiment, the longitudinally extending flow dividers 78, 79 that serve to separate the first fluid flow passages 40 from the second fluid flow passages are not wavy, but extend generally linearly across the plate and terminate at respective free ends 77 that are arranged so as to be generally adjacent or in-line with one another as illustrated in FIG. 9D. The free ends 77 of the U-shaped embossments 74 are spaced away from the portion of the peripheral wall 76 that forms the opposed end of the base plate 24, forming a fluid collecting channel 87 that serves to interconnect each of the first fluid flow passages 40 to the adjacent second fluid flow passages 42. Accordingly, the fluid collecting channel 87 functions in the same manner as the U-shaped turn portions 70 employed in the embodiment of FIG. 9A and serves to route the fluid from the first fluid flow passages 40 through about a 180 degree turn to the adjacent second fluid flow passages 42.

Figure 9E:
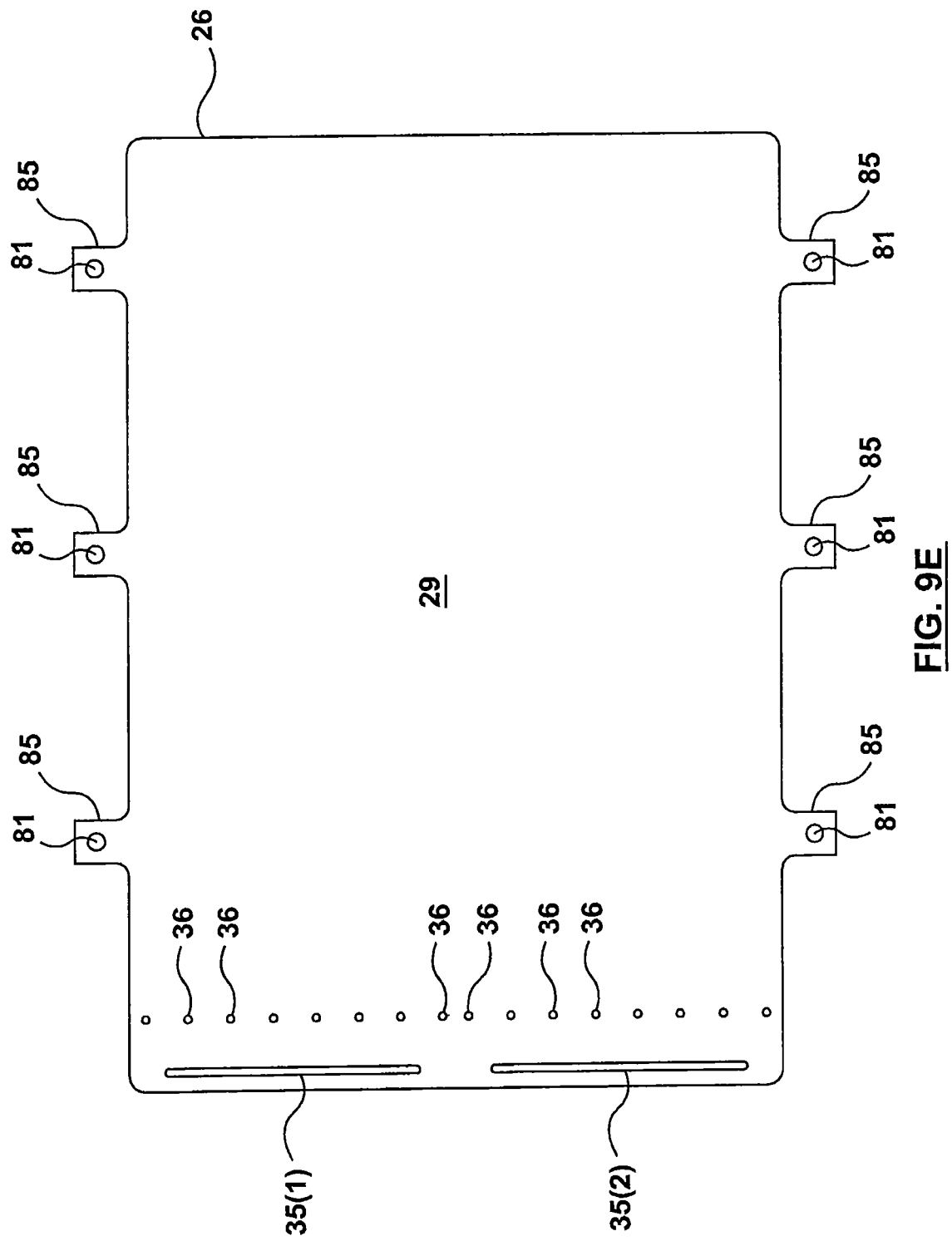
FIG. 9E is a top plan view of the cover plate arranged on the base plate of FIG. 9D.

Referring now to FIG. 9E, there is shown the base plate 24 described above in connection with FIG. 9D with the cover plate 26 arranged over top thereof. The cover plate 26 is typically formed by a single sheet of material cut to the appropriate size to effectively cover and seal the upper surface of the overall base plate 24. At the manifold end 30 of the heat exchanger two separate fluid inlet slots 35(1), 35(2) are formed in-line with and slightly spaced apart from each other along the width of the plate 26 at the outermost end of the cover plate 26. The positioning of the fluid inlet slots 35(1), 35(2) generally corresponds to the location of the inlet header regions 47 of each of the base plate portions 24(1), 24(2). Inset from the fluid inlet slots 35(1), 35(2) is a line of fluid outlet ports or openings 36 that generally correspond to the location of the closed second ends of the second fluid flow passages 42.

Figure 9F:
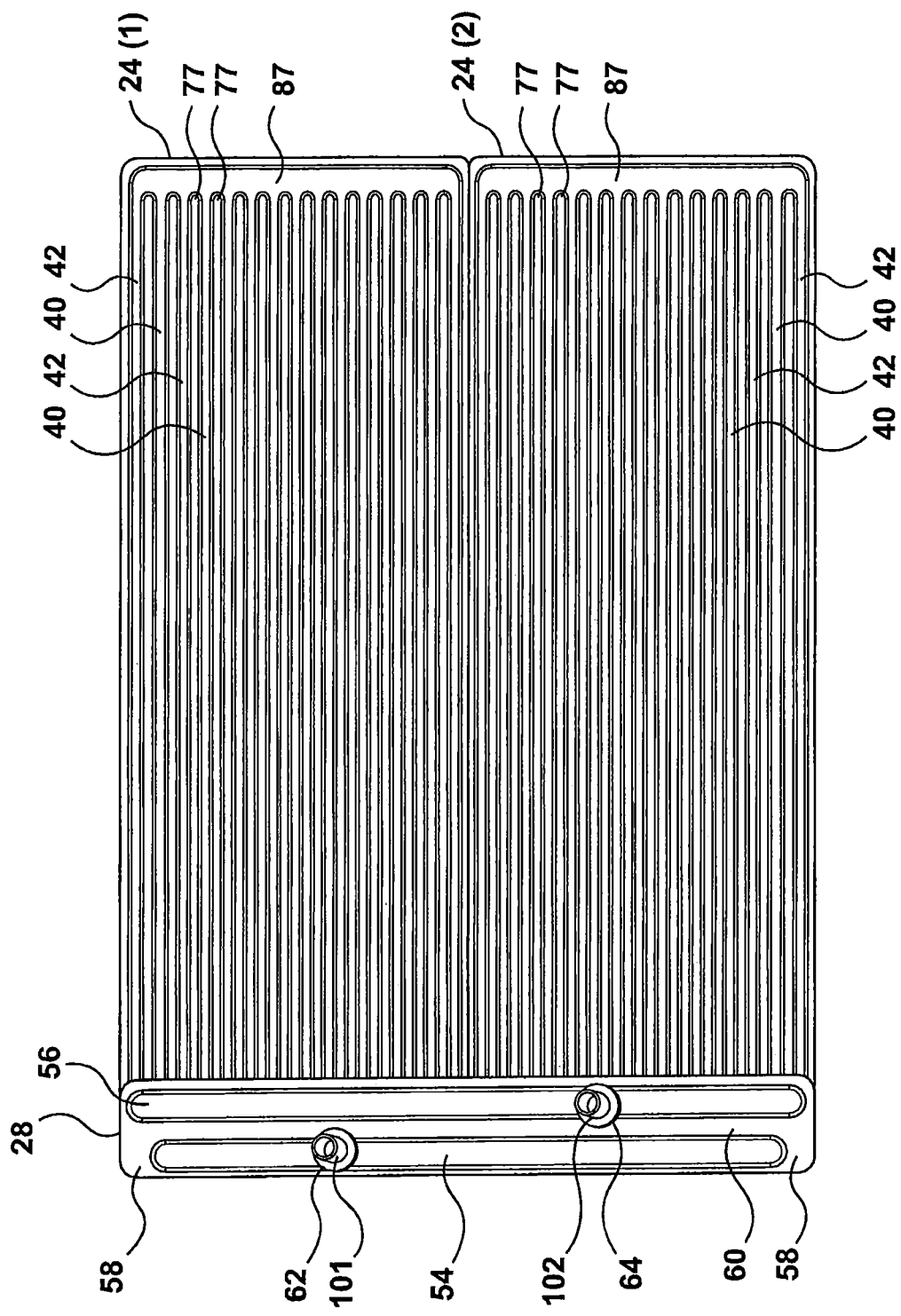
FIG. 9F is a top plan view of the heat exchanger formed with the components of FIGS. 9D and 9E with the cover plate removed for illustration purposes only.
Figure 9G:
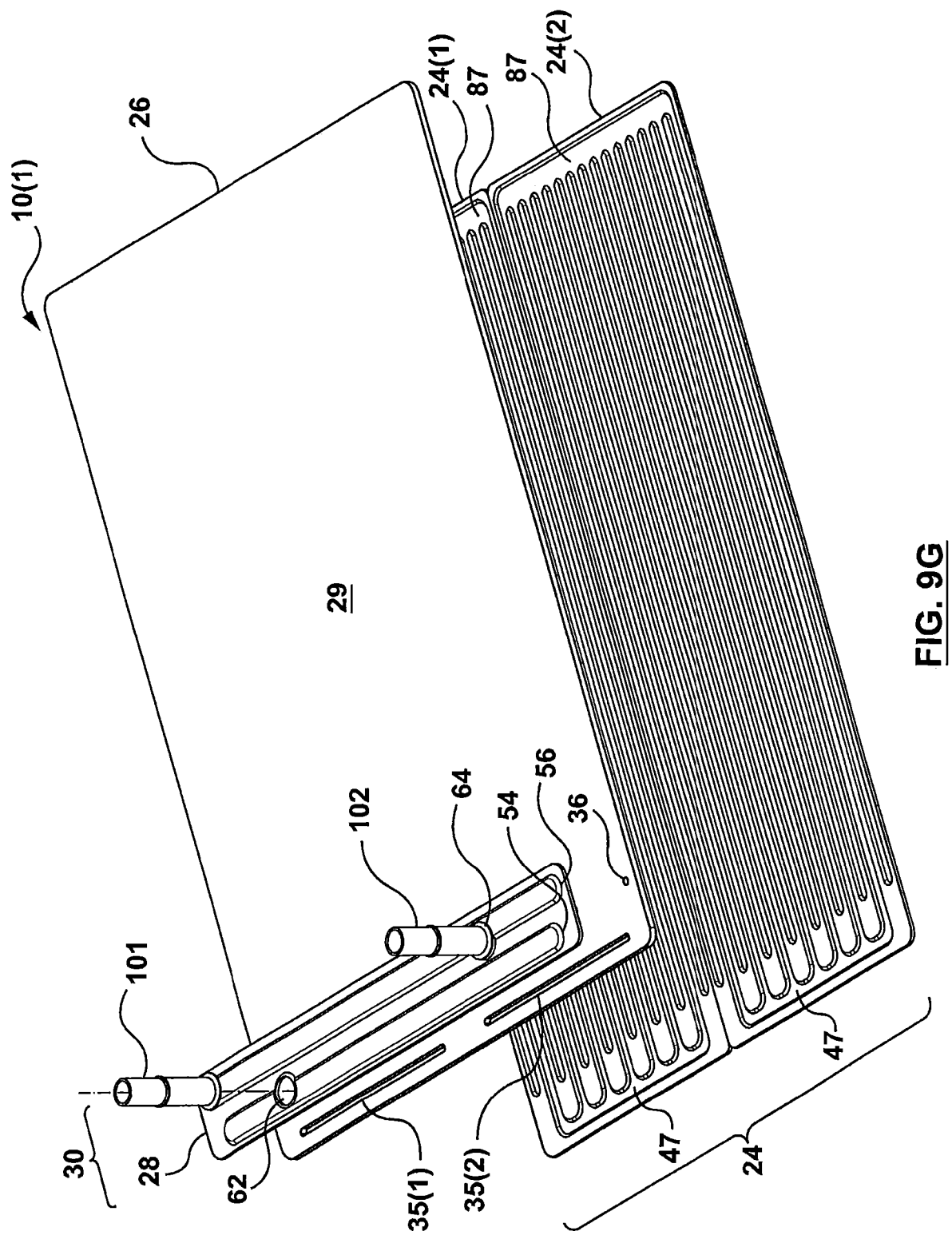
FIG. 9G is a perspective exploded view of the heat exchanger of FIGS. 9D-9F.
Figure 10:
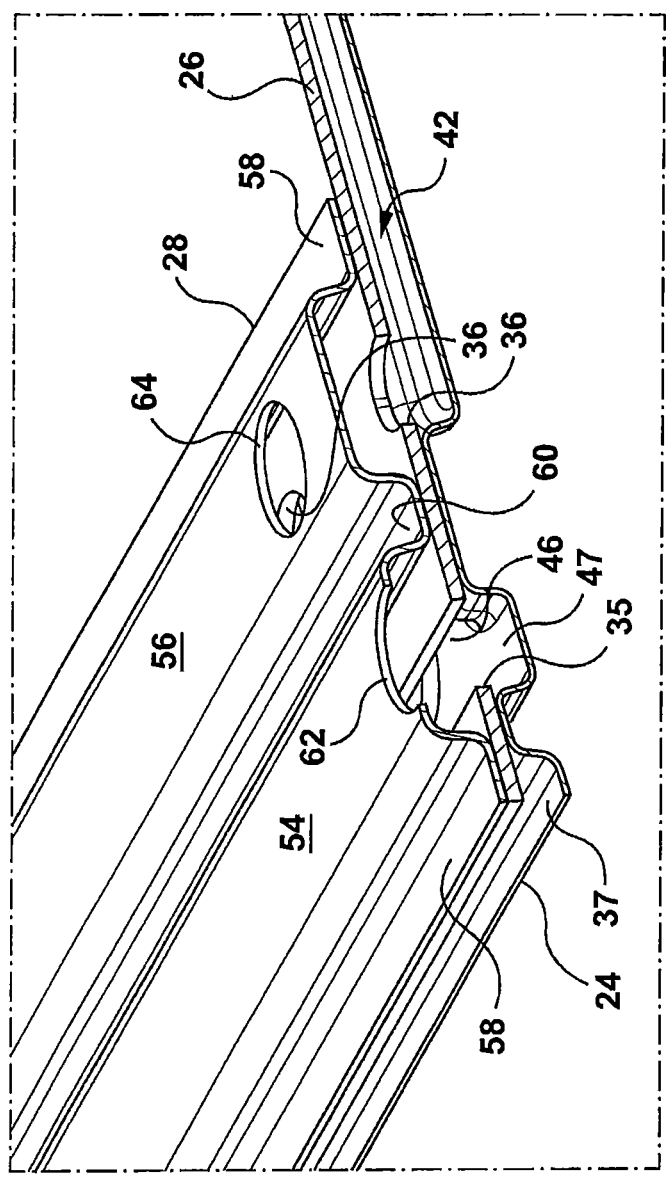
FIG. 10 is a detail, perspective, sectional view of the manifold region of the heat exchanger of FIG. 7 in its assembled state taken along an axis generally parallel to the flow direction through the heat exchanger through the fluid inlet opening of the inlet manifold.
Figure 11:
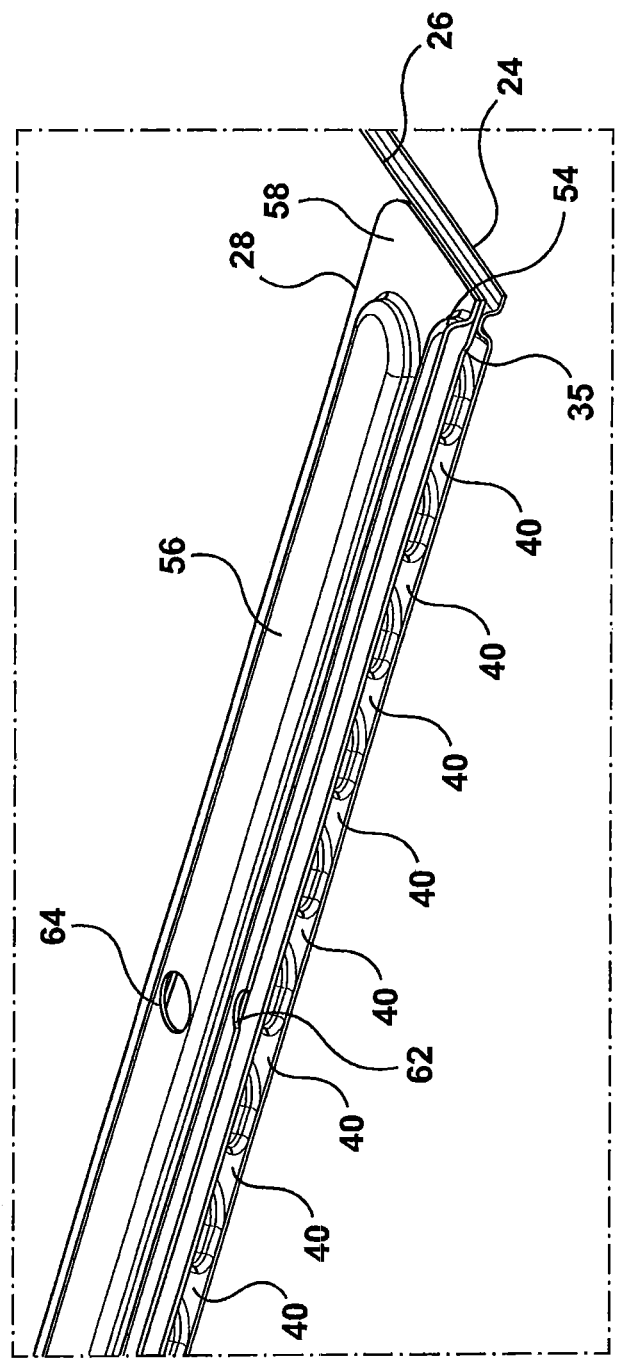
FIG. 11 is a partial, perspective, sectional view taken along an axis generally perpendicular to the flow direction through the heat exchanger lengthwise through the inlet manifold of the heat exchanger of FIG. 7, in its assembled state.

A manifold cover or manifold plate 28 similar in structure to those shown in FIGS. 3-6 and 7-8 is provided and arranged on top of and in sealing contact with the upper surface of cover plate 26 so as to enclose fluid inlet slots 35(1), 35(2) and fluid outlet ports 36, as shown for instance in FIGS. 9F and 9G. Accordingly, as described above in connection with the previously described embodiments, the manifold plate 28 has a pair of embossments 54, 56 raised out of the surface of the manifold plate 28 forming respective inlet and outlet manifolds. Each embossment 54, 56 has a fluid opening 62, 64 formed therein for receiving an appropriate fluid inlet and outlet fitting 101, 102, respectively, for inletting and discharging the heat exchange fluid into and out of the heat exchanger 10(1). As shown in FIG. 9E, the cover plate 26 can also be formed with mounting holes 81 formed in mounting tabs 85 that extend outwardly away from the cover plate 26 at various locations around the perimeter thereof to assist with the mounting of the heat exchanger 10(1) in the overall battery unit structure.

In use, the main central portion 29 of the cover plate 26 provides a generally large surface area free of interruptions that allows for adequate space upon which the battery cells or battery cell containers can be arranged with suitable surface-to-surface contact therebetween. The heat exchange fluid enters the heat exchanger 10(1) through the fluid inlet fitting where it is transmitted to each of the first fluid flow passages 41 by way of the inlet header region 47 via the inlet embossment 54 and fluid inlet slots 35(1), 35(2) formed in the cover plate 26. The heat exchange fluid travels along the first fluid flow passages 41 drawing heat away from the battery cells or battery cell containers stacked on top of the heat exchanger before the fluid is switch-backed or turned about 180 degrees in the common fluid collector area or channel 87 where it enters the second fluid flow passages 42. As the fluid travels along the second fluid flow passages 42 it continues to draw heat away from the battery cells and/or battery cell containers stacked on top of the heat exchanger 10(1) and also allows for heat transfer between the second fluid flow passages and adjacent first fluid flow passages 41 to ensure a more even surface temperature across the surface of the cover plate 26 or primary heat transfer surface 13 of the heat exchanger 10(1).

By providing a base plate 24 that can be formed by a series of identical base plate portions or modules 24(i) that are arranged side by side and joined together by any suitable means (e.g. brazing, etc.), a heat exchanger 10 of any size can easily be manufactured without going to the added cost of re-tooling or forming a specifically sized base plate 24. Accordingly, a modular construction method for a heat exchanger for battery thermal management applications can be used to provide heat exchangers of varying size with reduced overall manufacturing costs since, for example, a stock of standard sized base plate components 24(i) can be formed and stored as inventory (if needed) with the ability to form the specific base plate required for a particular heat exchanger application by attaching the required number of base plate portions 24(i) together. Since the cover plate 26 generally is a simple sheet of material free of surface interruptions, a basic sheet of material can be easily cut to size based on the specific size of the modular base plate that is used. Accordingly, by providing a generally uniform, construction for the base plate portions 24(i), a modular heat exchanger construction is achieved which allows for the heat exchanger to be easily modified to different sizes to suit particular customer requirements and/or suit a particular application.

Figure 12:
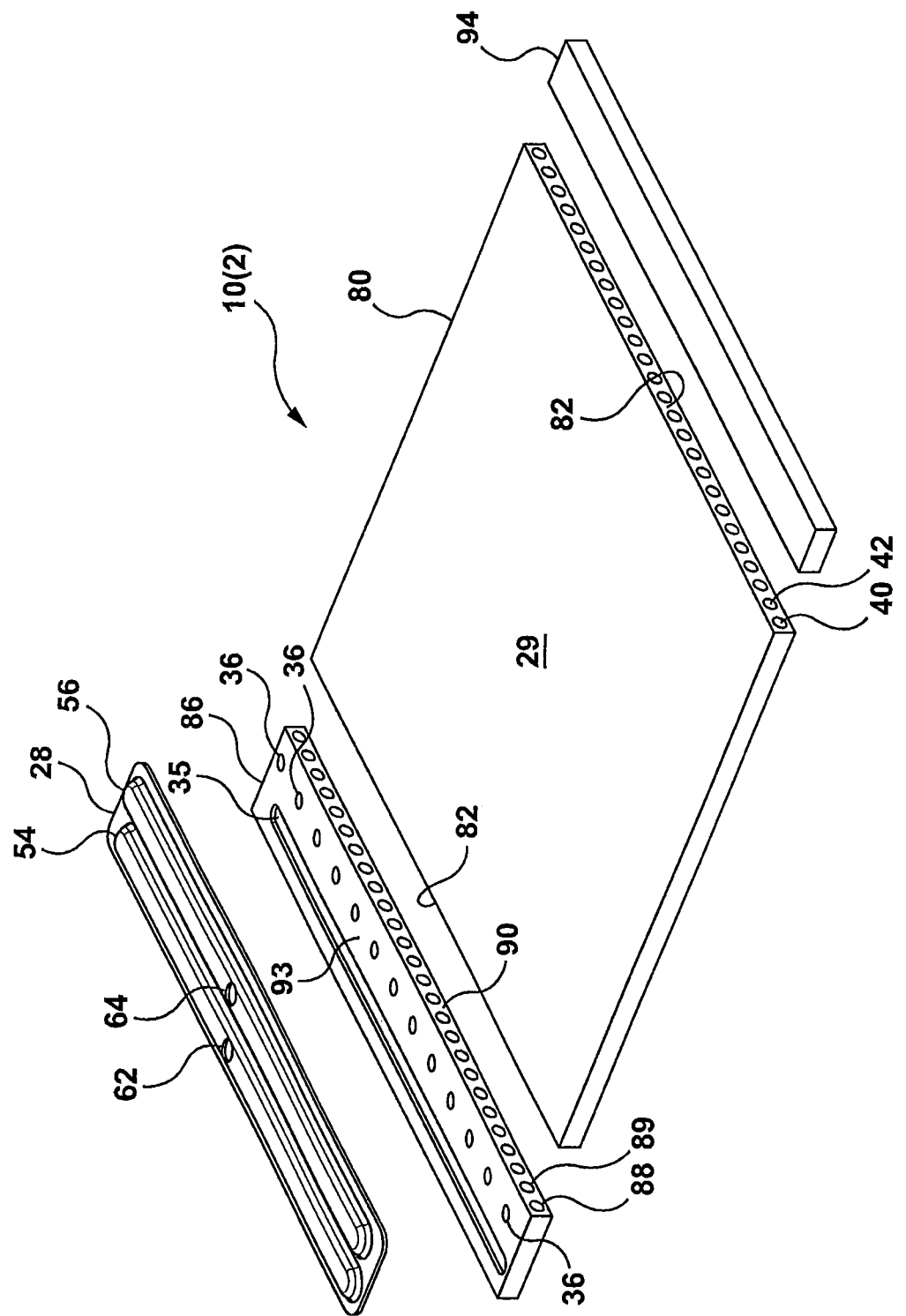
FIG. 12 is a perspective, exploded view of another example embodiment of a heat exchanger according to the present disclosure.
Figure 13:
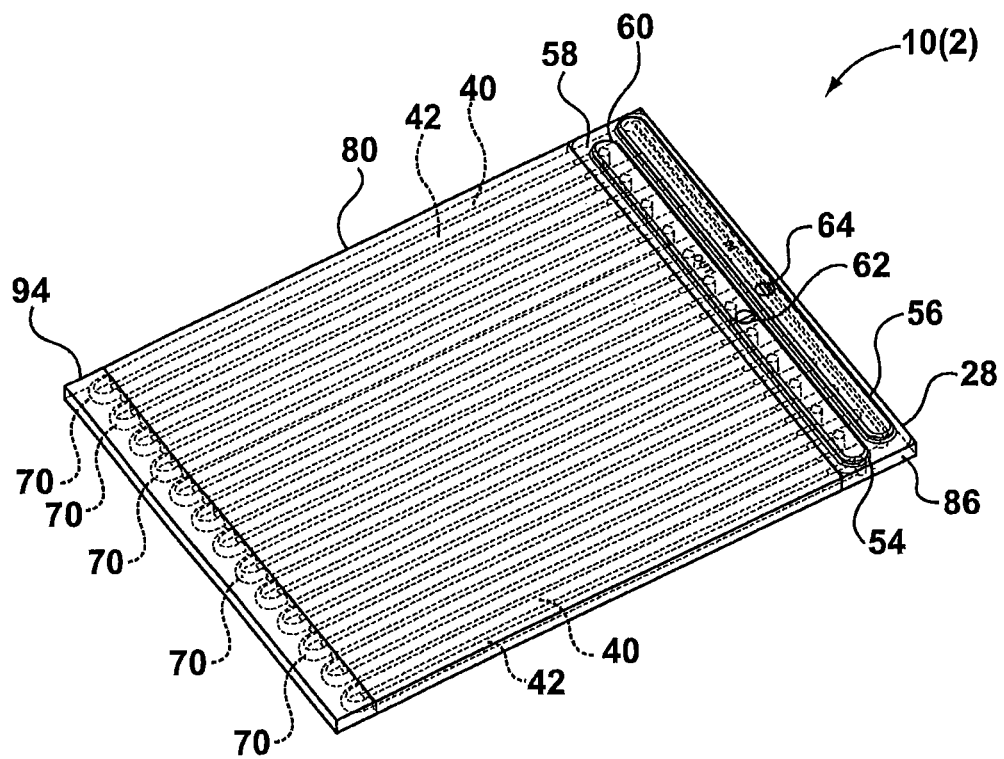
FIG. 13 is a top perspective view of the heat exchanger of FIG. 12 in its assembled state.
Figure 14:
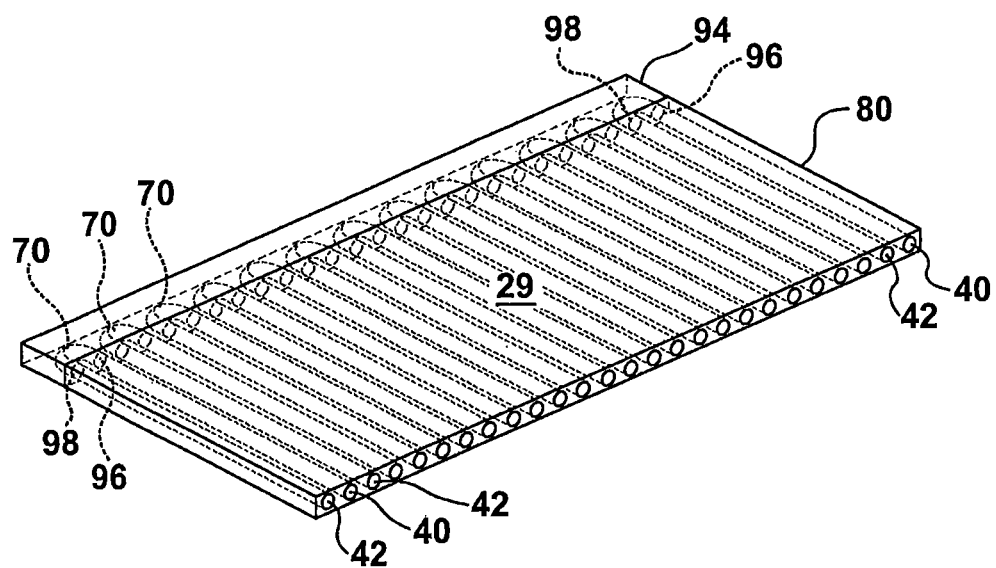
FIG. 14 is a perspective, sectional view taken along an axis generally perpendicular to the flow direction through the assembled heat exchanger body of FIG. 13.

Referring now to FIGS. 12-14 there is shown another embodiment of the heat exchanger 10(2) according to the present disclosure. In this embodiment, rather than being formed by stacking a base plate and cover plate together with one or more manifold covers, the heat exchanger 10(2) is formed by a series of extruded tube sheets or tube sections that are arranged in mating relationship to form the heat exchanger 10(2). More specifically, heat exchanger 10(2) comprises a central tube section 80 generally in the form of a solid, square or rectangular section of material having a series of alternating tubular first and second fluid flow passages 40, 42 extending therethrough from one end face 82 to the opposite end face 82 of the tube section 80, the central tube section 80 having generally planar upper and lower surfaces 83, 84. When used as a cold plate, the plurality of battery cell containers 12 are stacked on top of one of the upper and lower surfaces of the central tube section 80 of the heat exchanger 10(2).

A manifold section or manifold end cap 86 is arranged at one end of the central tube section 80, the manifold section 86 having a plurality of alternating inlet and outlet flow passages 88, 89 that extend from an end face 90 of the manifold section into the main body portion of the manifold section 86. In the subject embodiment, the inlet flow passages 88 extend farther into the main body portion of the manifold section 86 than the outlet flow passages 89, although it will be understood that in other embodiments, the inlet and outlet flow passages may be reversed with the outlet flow passages extending farther into the manifold section 86 than the inlet flow passages 88. A slot 35 is formed in the upper surface 93 of the manifold section 86 and extends into the main body portion of the manifold section 86 so that the slot 35 is in fluid communication with the inlet flow passages 88. A plurality of spaced apart fluid openings 36 are formed in a row that is spaced apart from and generally parallel to slot 35, the plurality of fluid openings 36 extending through the manifold section 86 from the upper surface thereof 93 through to the outlet flow passages 89 formed in the manifold section 86. In use, the manifold section 86 is arranged so that the end face 90 is in face-to-face contact with the corresponding end face 82 of the central tube section 80 such that the first flow passages 40 are aligned with and in fluid communication with the inlet flow passages 88 while the second fluid flow passages 42 are aligned with and in fluid communication with the outlet flow passages 89, the manifold section 86 and central tube section 80 being brazed or otherwise sealingly joined together.

A U-flow end section or end cap 94 is arranged at the opposed end of the central tube section 80. A plurality of U-shaped flow channels or turn portions 70 are formed in the end section 94 at spaced apart intervals along the end section 94, as shown more clearly in FIGS. 13 and 14. The turn portions 70 each extend between a first inlet end 96 formed in the end face 95 of the U-flow end section 94 to a second outlet end 98 formed in the end face 95, the first inlet ends 96 of the spaced apart turn portions 70 being in fluid communication with the corresponding outlet or second end 48 of the first flow passages 40 with the second outlet ends 98 of the turn portions 70 being in fluid communication with the first or inlet end 50 of the second fluid flow passages 42.

A manifold cover 28 is arranged on the upper surface 93 of the manifold section 86, the manifold cover 28 being in the same format as in the previously described embodiments with the first and second embossments 54, 56 arranged over top and sealing enclosing, respectively, the manifold slot 35 and the series of fluid openings 38. Accordingly, fluid enters the heat exchanger 10(2) through fluid opening 62 formed in the first or inlet embossment 54 of the manifold cover 28 and is distributed to the first flow passages 40 through slot 35 and the inlet flow passages 88 formed in the manifold section 86. The fluid then travels through the first flow passages 40 and enters the U-flow end section 94 through the first inlet ends 96 of the turn portions 70, the fluid being switch-backed 180 degrees through the turn portions 70 before exiting the end section 94 through the second outlet ends 98 of the end section 94 and entering the section fluid flow passages 42. The fluid travels back through the central tube section 80, heat exchanger 10(2) through the second fluid flow passages 42 and through the corresponding outlet flow passage 89 formed in the manifold section 86 before exiting the heat exchanger 10(2) through fluid opening 64 in the second or outlet embossment 56 via fluid openings 38.

Figure 15:
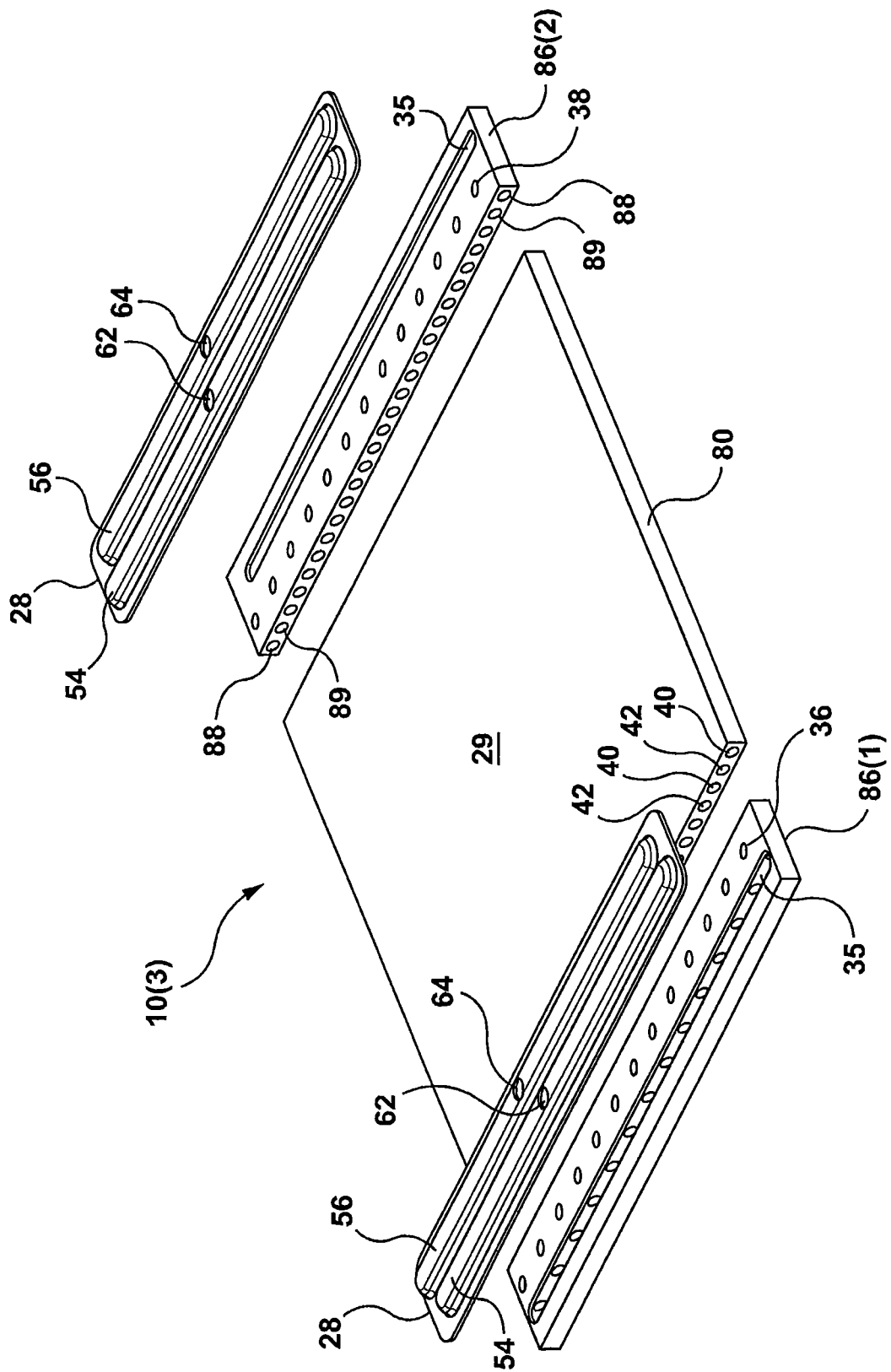
FIG. 15 is a perspective, exploded view of another example embodiment of a heat exchanger according to the present disclosure.
Figure 16:
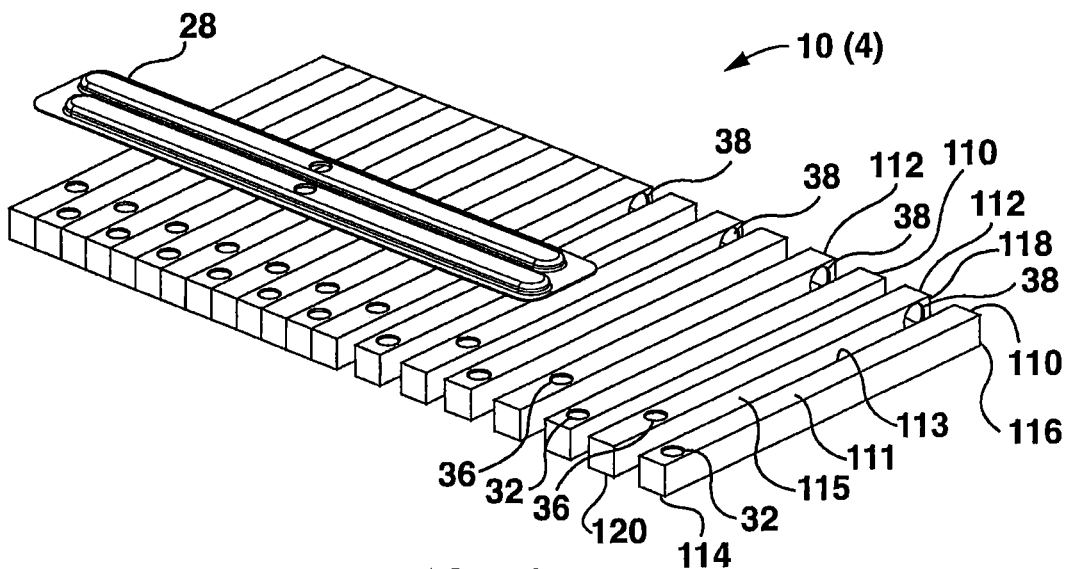
FIG. 16 is a perspective, exploded view of another example embodiment of a heat exchanger according to the present disclosure.
Figure 17:
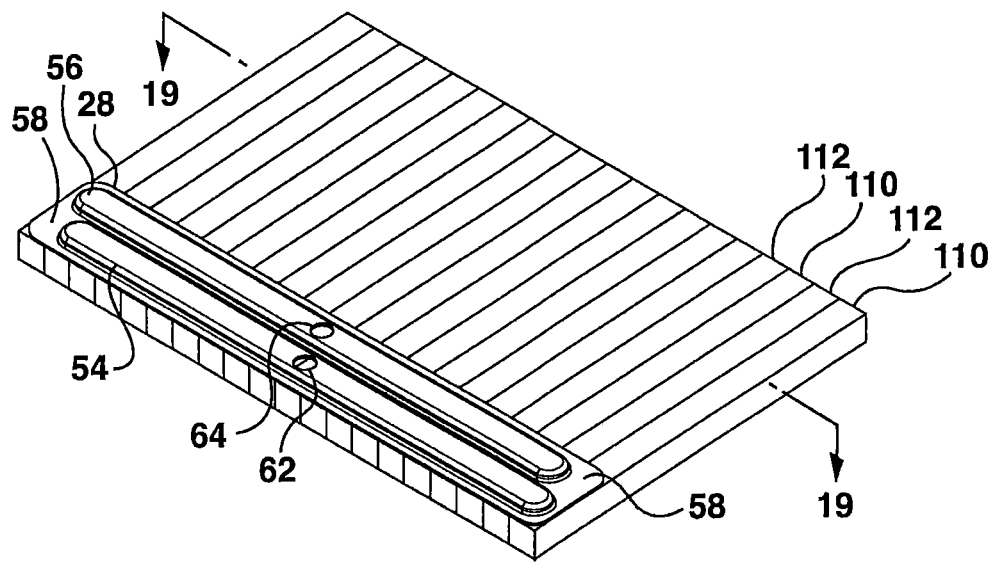
FIG. 17 is top, perspective view of the heat exchanger of FIG. 16 in its assembled state.

While the above-described embodiment relates to a two-pass or U-flow heat exchanger, heat exchanger 10(2) can be modified into a single-pass counter-flow heat exchanger 10(3) by replacing the U-flow end section 94 found at one of the opposed ends of the central tube section 80 with a second manifold section 86(2) that is identical to the first manifold end section 86(1) except for having been rotated so that the end face 90 of the second manifold section 86(2) is arranged for face-to-face contact with the corresponding end face 82 of the central tube section 80. A second manifold cover 28 is arranged over the upper surface 93 of the second manifold section 86(2) in the same manner as described for the first manifold section 86(1), as shown in FIG. 15. Accordingly, fluid enters the heat exchanger 10(3) at respective ends thereof through fluid openings 62 in the first embossments 54 and is distributed to the first and second fluid flow passages 40, 42, respectively, via the corresponding slots 35 and corresponding inlet flow passages 88 formed in the corresponding manifold sections 86. The fluid then travels through the central tube section 80 through the first and second flow passages 40, 42 and exits the heat exchanger 10(3) through fluid openings 64 in the second or outlet embossment 56 at the corresponding opposite end of the heat exchanger 10(3) via the outlet flow passages 89 and fluid openings 36, 38 formed in the corresponding manifold section 86(1), 86(2). Accordingly, both a two-pass or U-flow heat exchanger and a single-pass counter-flow heat exchanger can be formed using extruded tube sections as shown in FIGS. 12-15 as well as using various stacked plate arrangements as shown in FIGS. 3-11.

Referring now to FIGS. 16-19 there is shown yet another embodiment of a cold plate heat exchanger in accordance with an example embodiment of the present disclosure. In the subject embodiment, heat exchanger 10(4) is formed by a series of alternating first and second tubular members 110, 112 that are arranged adjacent to each other such that a side surface 113 of one first tubular member 110 is in face-to-face contact with the corresponding side surface 115 of the adjacent second tubular member 112 forming the main body portion of the heat exchanger 10(4). The first and second tubular members 110, 112 are generally in the form of rectangular, elongate hollow tubular members that extend between respective first and second ends 114, 116, 118, 120 forming first and second flow channels 40, 42 therein. A fluid opening 32 is formed in the upper surface of 111 of each of the first tubular members 110 in fluid communication with the first flow passage 40 that extends through the interior thereof. A second fluid opening 34 is formed on the side surface 113 at the opposite or second end 116 of the first tubular members 110 which is aligned with and in fluid communication with a corresponding fluid opening 38 formed in the corresponding side surface 115 of the adjacent second tubular member 112 for transmitting fluid from the first flow passages 40 in the first tubular members 110 to the second fluid flow passages 42 in the second tubular members 112. A second fluid opening 36 is formed in the upper surface of the second end 120 of the second tubular members 112 in fluid communication with the second fluid flow passage 42 formed therein. Accordingly, fluid enters the first fluid flow passages 40 through fluid openings 32 formed in the first ends 114 of the first tubular members 110 and flows through the first fluid flow passages 40 to the opposite or second end 116 of the first tubular member 110 where it exits the first fluid flow passages 40 and enters the second fluid flow passages 42 formed in the second tubular members 112 through corresponding fluid openings 34, 38 where it travels back along the length of the heat exchanger 10(4) through the second fluid flow passages 42 before exiting in the second tubular members 112 through fluid openings 36. Fluid openings 36 in the second tubular members 112 are staggered or longitudinally offset with respect to the fluid openings 32 formed in the adjacent first tubular members 110 such that fluid openings 36 are more inwardly disposed from the corresponding ends 114, 120 of the tubular members 110, 112 as compared to fluid openings 32. The fluid flow through the heat exchanger 10(4) is shown schematically by the flow directional arrows shown in FIG. 19. Accordingly, it will be understood that each adjacent pair of tubular members 110, 112 together, form a U-shaped flow passage. A manifold cover 28 is arranged over top the series of fluid openings 32, 36, as in the previously described embodiments, thereby forming corresponding inlet and outlet manifolds 54, 56.

Figure 18:
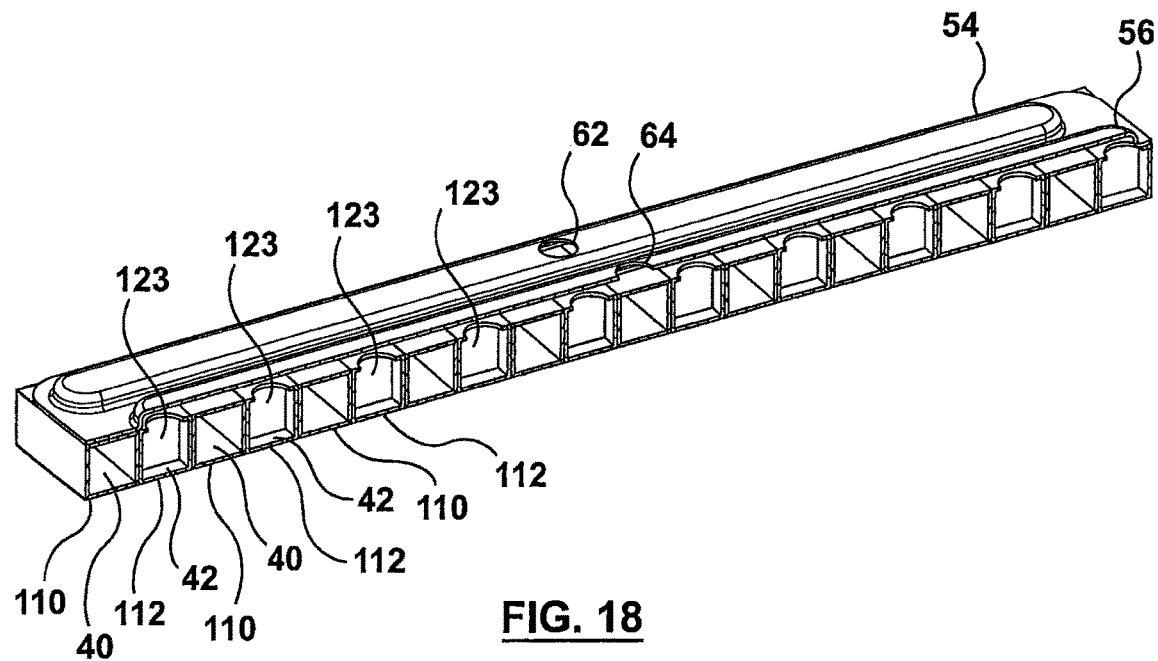
FIG. 18 is a perspective, sectional view taken along an axis generally perpendicular to the flow direction through the heat exchanger through the outlet manifold of the assembled heat exchanger of FIG. 17.
Figure 19:
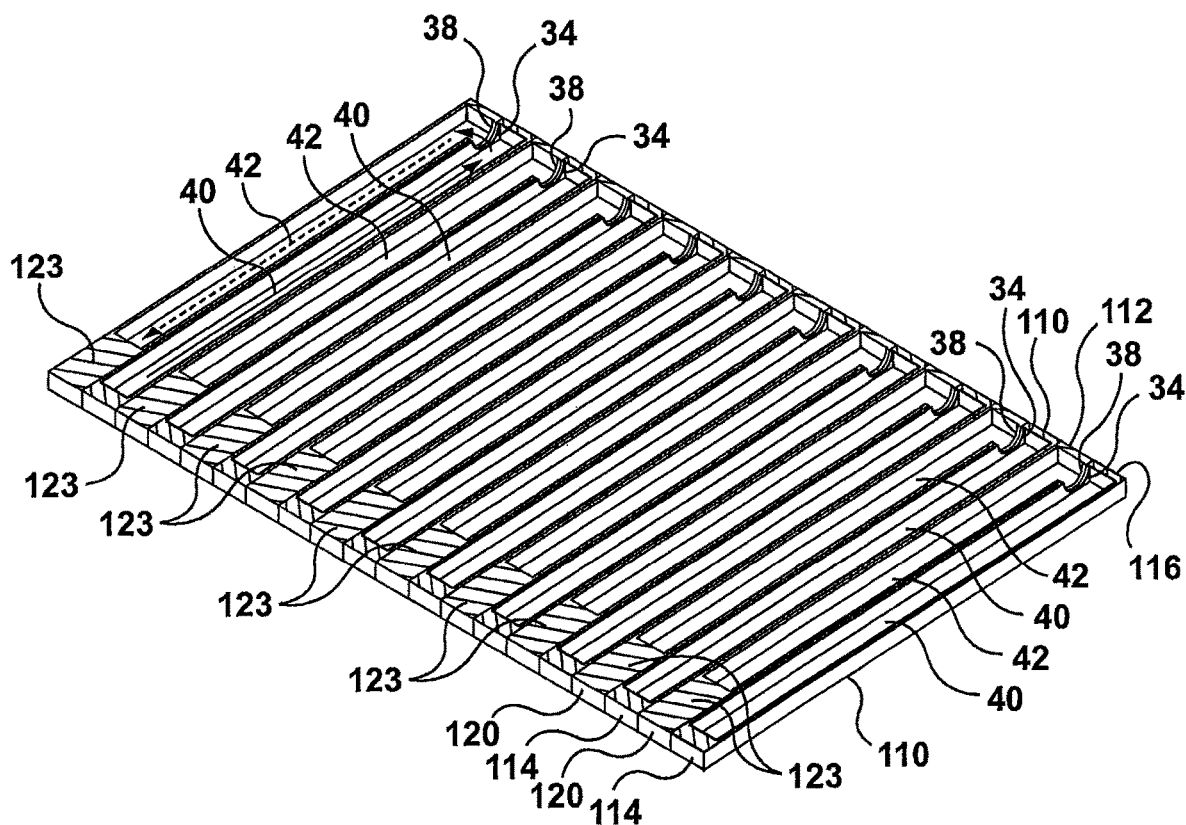
FIG. 19 is a top, perspective, sectional view taken along section line 19-19 in FIG. 17 illustrating the flow schematics through the heat exchanger.

In order to ensure that all of the fluid flowing through the second fluid flow passages 42 exits the second tubular members 112 through fluid openings 36 that are inwardly disposed from the corresponding end 120 of the second tubular members 112, end plugs 123 are inserted or positioned within the second end 120 of the second tubular members 112 to prevent the formation of dead space between fluid openings 36 and the end 120 of the second tubular member 112 as shown more clearly in FIGS. 18 and 19. In some embodiments the end plugs 123 may be integrally formed as part of the second tubular members 112.

While the above described embodiment relates to a two-pass, U-flow heat exchanger, it will be understood that individual stacked tubular members may also be used to form a single-pass, counter-flow heat exchanger by simply providing a series of first and second tubular members 110, 112 wherein the first and second fluid openings 32, 34, 36, 38 of each tubular member 110, 112 are both formed on the upper surface of the tubular members 110, 112, there being no fluid communication between adjacent tubular members. In such an embodiment, two manifold covers 28 are provided, one at each end of the main body portion of the heat exchanger sealingly enclosing respective inlet and outlet manifold regions 30, 31 at respective ends of the heat exchanger 10(4).

Accordingly, it will be understood that various forms of counter-flow cold plate heat exchangers, whether they be single-pass, counter-flow heat exchangers or two-pass, U-flow counter-flow heat exchangers, may be provided in an effort to provide improved thermal management of battery units by providing a heat exchanger surface having a more uniform temperature distribution across the surface of the heat exchanger.

Figure 20:
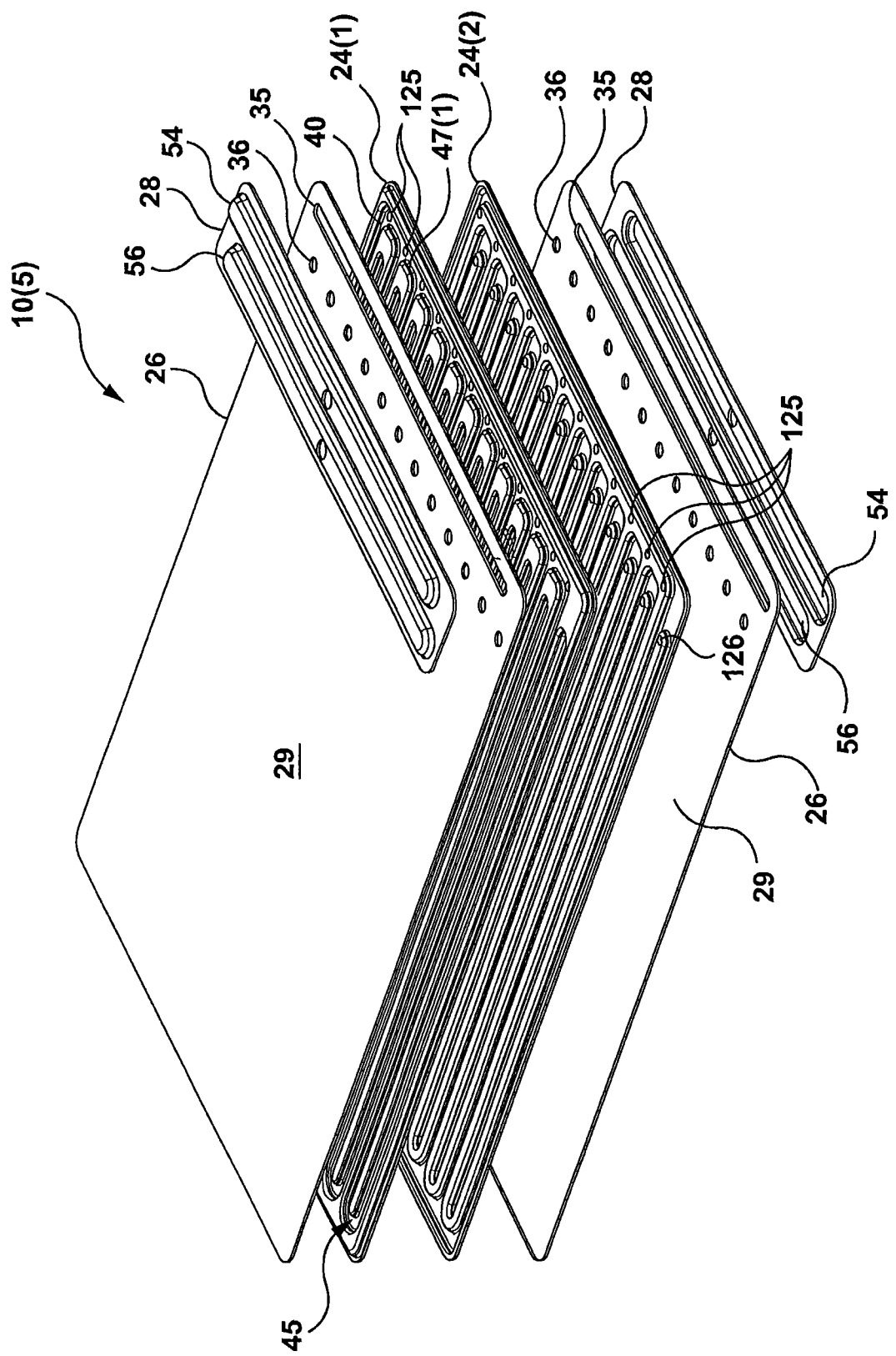
FIG. 20 is a perspective, exploded view of another example embodiment of a heat exchanger according to the present disclosure.
Figure 21:
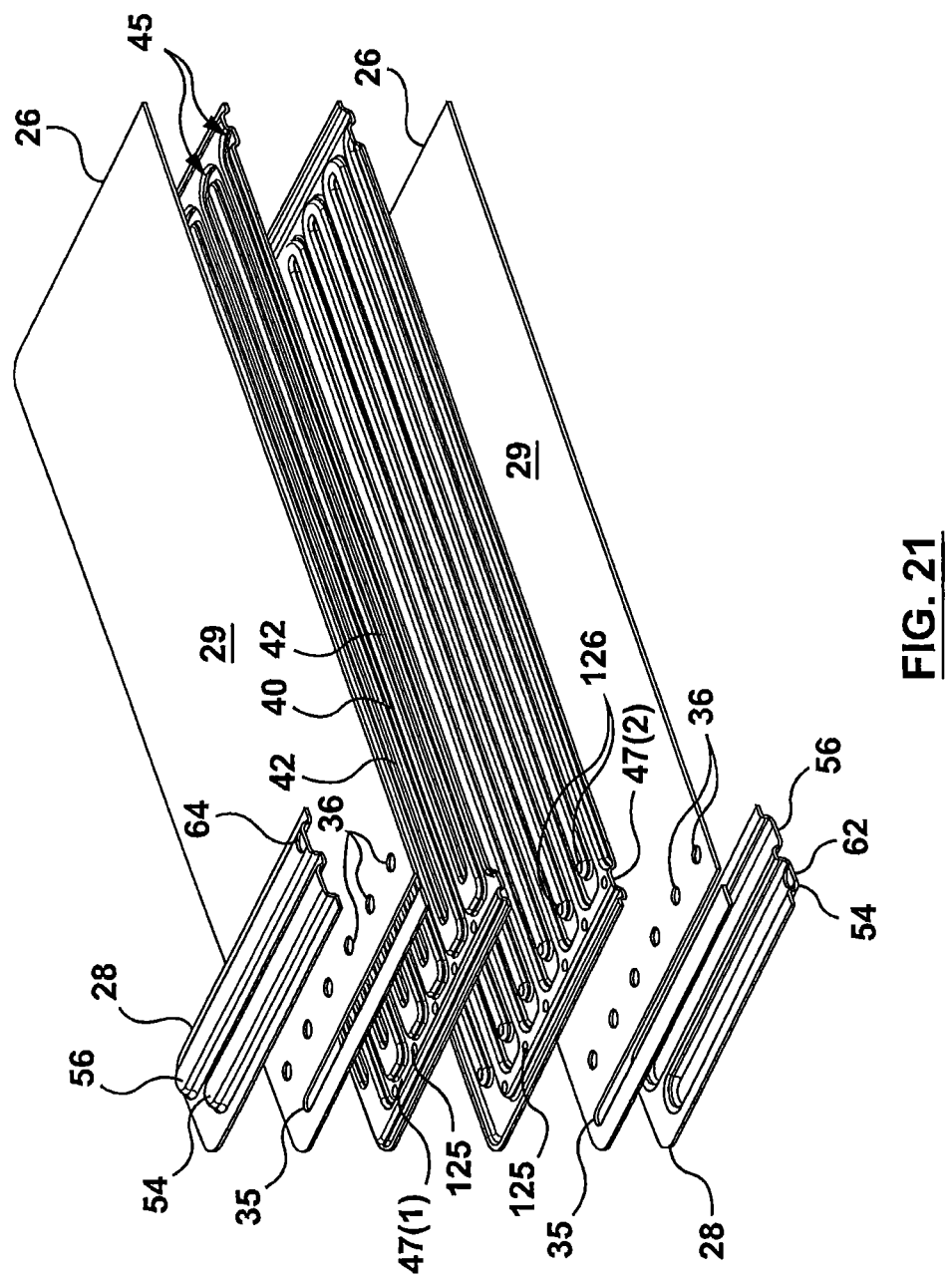
FIG. 21 is a sectional view of the heat exchanger of FIG. 20 taken along the longitudinal axis of the heat exchanger.
Figure 22:
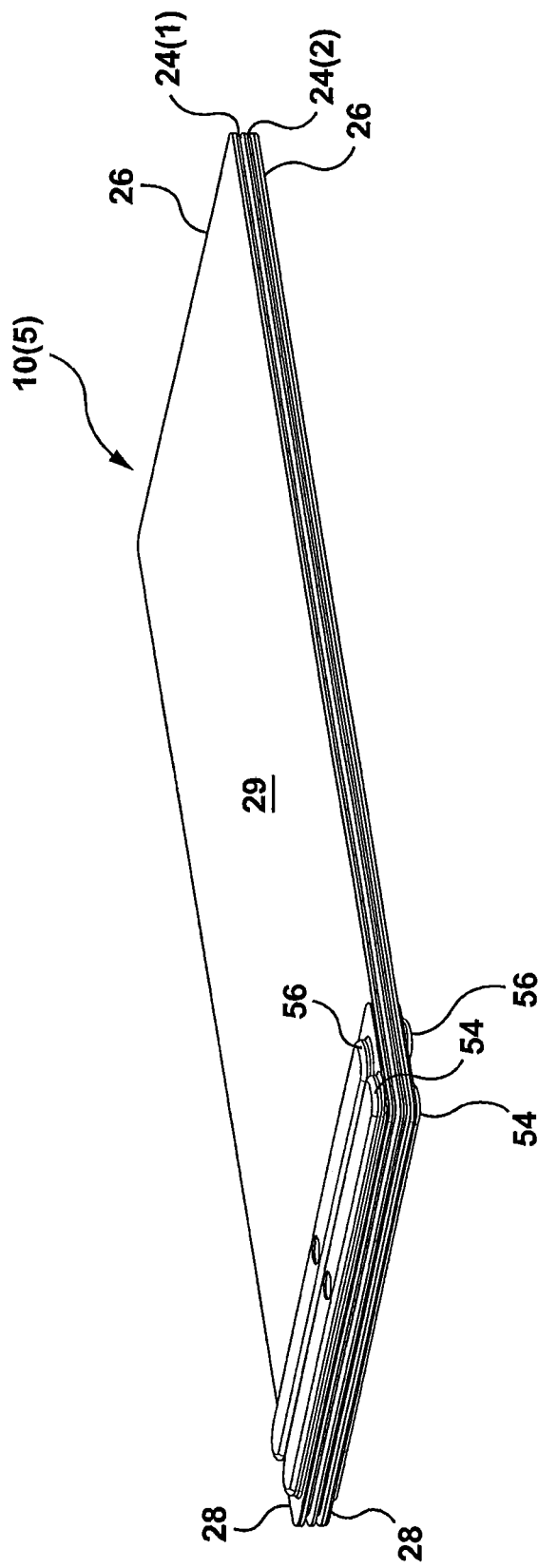
FIG. 22 is a perspective view of the heat exchanger of FIG. 20 in its assembled state.

Referring now to FIGS. 20-22 there is shown a heat exchanger 10(5) according to another example embodiment of the present disclosure. Heat exchanger 10(5) is intended for use as a heat exchange element that is sandwiched between adjacent battery cells or battery cell containers 12 that form the battery unit 100 as shown schematically in FIG. 1A, e.g. an inter-cell element or ICE plate heat exchanger.

Heat exchanger 10(5) is comprised of a pair of mating, formed base plates 24(1), 24(2) that are sandwiched between a pair of cover plates 26. In the subject embodiment, base plates 24(1), 24(2) generally have the same format as described above in connection with FIG. 9, each having a central generally planar portion 33 surrounded by a peripheral flange 37, the central generally planar portion having a series of U-shaped depressions 45 formed therein that are interconnected by an inlet manifold region 47. However, in the subject embodiment, a series of spaced apart fluid openings 125 are formed in the inlet header region 47 of the plates 24(1), 24(2), so as to provide fluid communication between the first inlet header region 47(1) formed between the first base plate 24(1) and the corresponding cover plate and the second inlet header region 47(2) formed between the second base plate 24(2) and the corresponding cover plate 26. Similarly, fluid openings 126 are formed in the second end 52 of each of the second fluid flow passages 42 for providing fluid communication between the second fluid flow passages 42 formed between the first base plate 24(1) and the corresponding cover plate 26 and the second fluid flow passages 42 formed between the second base plate 24(2) and the corresponding cover plate 26. The first and second base plates 24(1), 24(2) are identical to each other and arranged so that the second base plate 24(2) is inverted or rotated 180 degrees about the longitudinal axis of the heat exchanger 10(5) with respect to the first base plate 24(1). Due to the inverted arrangement of the first and second base plates 24(1), 24(2), liquid coolant is able to flow between each of the base plates 24(1), 24(2) and the corresponding cover plate 26 providing heat transfer surfaces on either side of the heat exchanger 10(5) as is required for ICE plate heat exchangers due to their arrangement between adjacent battery cell cases 12. It will be understood that there is no fluid flow between base plates 24(1), 24(2).

Cover plates 26 are in the same format as described above in connection with FIGS. 7 and 8, the cover plates 26 each being formed with a slot 35 for providing fluid access the inlet header region 47 of each of plates 24(1), 24(2) and a row of spaced apart fluid openings 36 that are aligned with the second ends 52 of the second fluid flow passages 42 and the fluid openings 126 formed therein. Manifold cover plates 28 are arranged over top of each of the manifold regions formed on in each of cover plates 26 thereby forming respective inlet and outlet manifolds.

Figure 23:
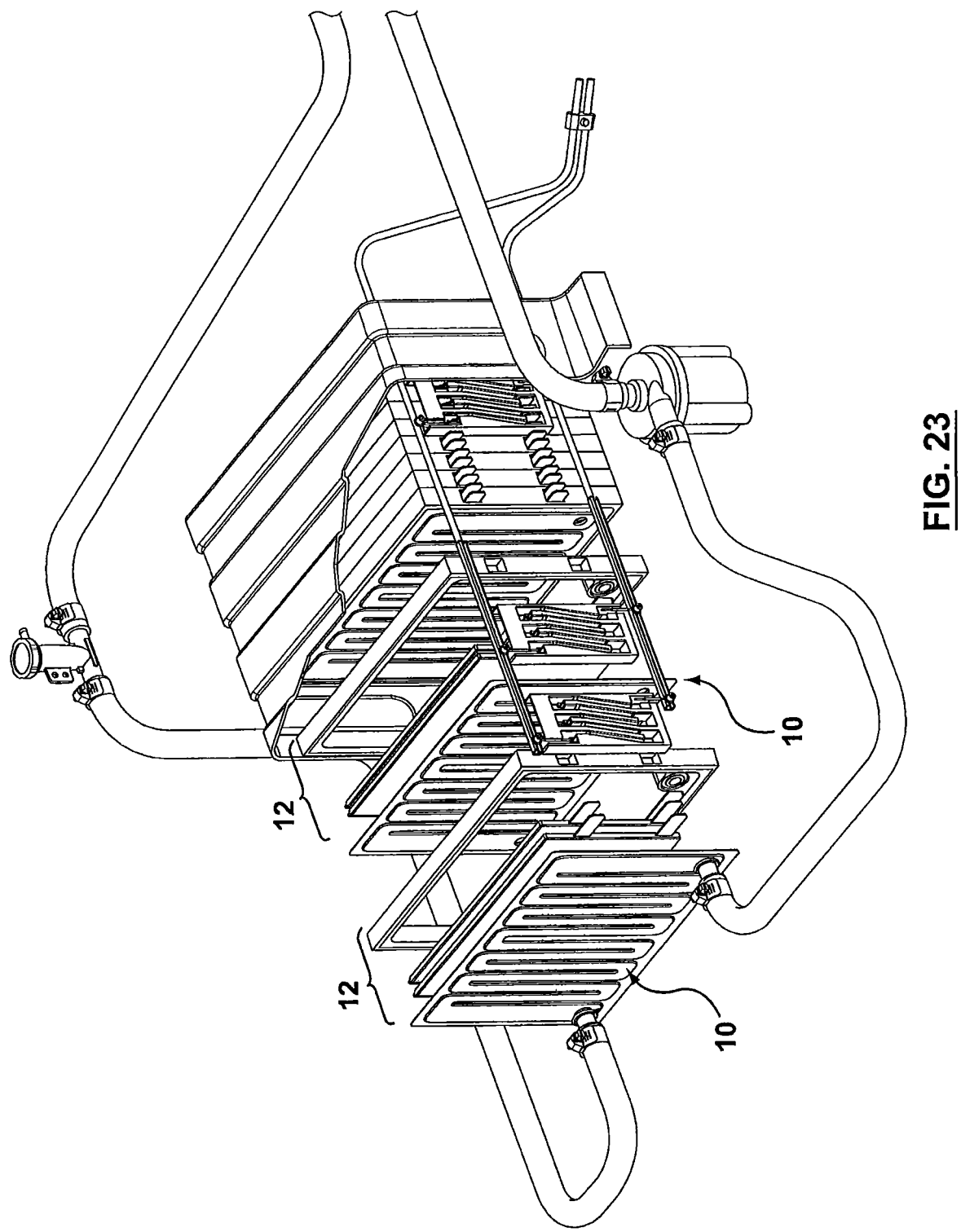
FIG. 23 is a perspective view of a prior art battery unit incorporating individual inter-cell elements or heat exchangers that are sandwiched between adjacent battery cells or battery cell containers that form the overall battery unit.

In use, a plurality of heat exchangers 10(5) are provided and arranged in alternating relationship with a plurality of battery cell containers 12 that together form the battery unit 100, the heat exchangers 10(5) therefore being arranged in between adjacent battery cell cases or containers 12 with the respective inlet and outlet manifolds 54, 56 of each of the heat exchangers 10(5) being interconnected, in accordance with principles known in the art. Accordingly, fluid enters the first heat exchanger 10(5) arranged within the stack through fluid opening 62 formed in embossment 54 in the manifold cover 28 and is distributed to the first fluid flow passages 40 formed between the first base plate 24(1) and the corresponding cover plate 26 through slot 35, and is also distributed to the first fluid flow passages 40 formed between the second base plate 24(2) and the corresponding cover plate 26 through fluid openings 125 formed in the inlet header regions 47. Fluid entering the second inlet header region 47(2) formed in the second base plate 24(2) is also transmitted to the subsequent heat exchanger 10(5) arranged in the stack through fluid opening 62 formed in embossment 54 of the corresponding manifold cover 28 via fluid openings 125 and fluid slot 35 in base plate 24(2) and the corresponding cover plate 26. Accordingly, the inlet manifolds 54 of adjacent heat exchangers 10(5) are interconnected to ensure fluid communication between the plurality of individual heat exchangers 10(5) used for thermal management of the battery unit 100. FIG. 23 provides a general illustration of a battery unit 100 incorporating known heat exchange elements or ICE plate heat exchangers wherein the respective inlet and outlet manifolds are interconnected by a common coolant supply and exit source.

Within each heat exchanger 10(5), once fluid enters the first fluid flow passages 40 formed by base plates 24(1), 24(2) on either side of the heat exchanger 10(5), the fluid travels through the first fluid flow passages 40 from one end of the heat exchanger 10(5) to the opposed end before being switched-back through turn portions 70 formed by the U-shaped depressions 45 where it travels back through the heat exchanger 10(5) through second fluid flow passages 42 formed by base plates 24(1), 24(2) on both sides of the heat exchanger 10(5) where it then exits the heat exchanger 10(5) through fluid openings 127 formed in the second ends 52 of the second fluid flow passages 42 and openings 38 formed in the cover plate 26 to fluid opening 64 formed in embossment 56. As well, fluid exiting one of heat exchangers 10(5) is transmitted to the adjacent heat exchanger 10(5) by the interconnected fluid outlet manifolds 56 as illustrated for example in FIG. 23 with respect to a known heat exchange element or ICE plate heat exchanger. Accordingly, by arranging a pair of single-sided heat exchangers (see for instance FIG. 7 or FIG. 9C) in opposed, inverted relationship and establishing fluid communication between the first and second sets of fluid flow passages 40, 42 formed therein (e.g. fluid openings 125, 126), a two-sided heat exchanger 10(5) suitable for use as an ICE plate heat exchanger is provided, wherein the counter-flow arrangement through each side of heat exchanger 10(5) helps to provide for more uniform temperature distribution across the outer surfaces of the heat exchanger 10(5).

Figure 24:
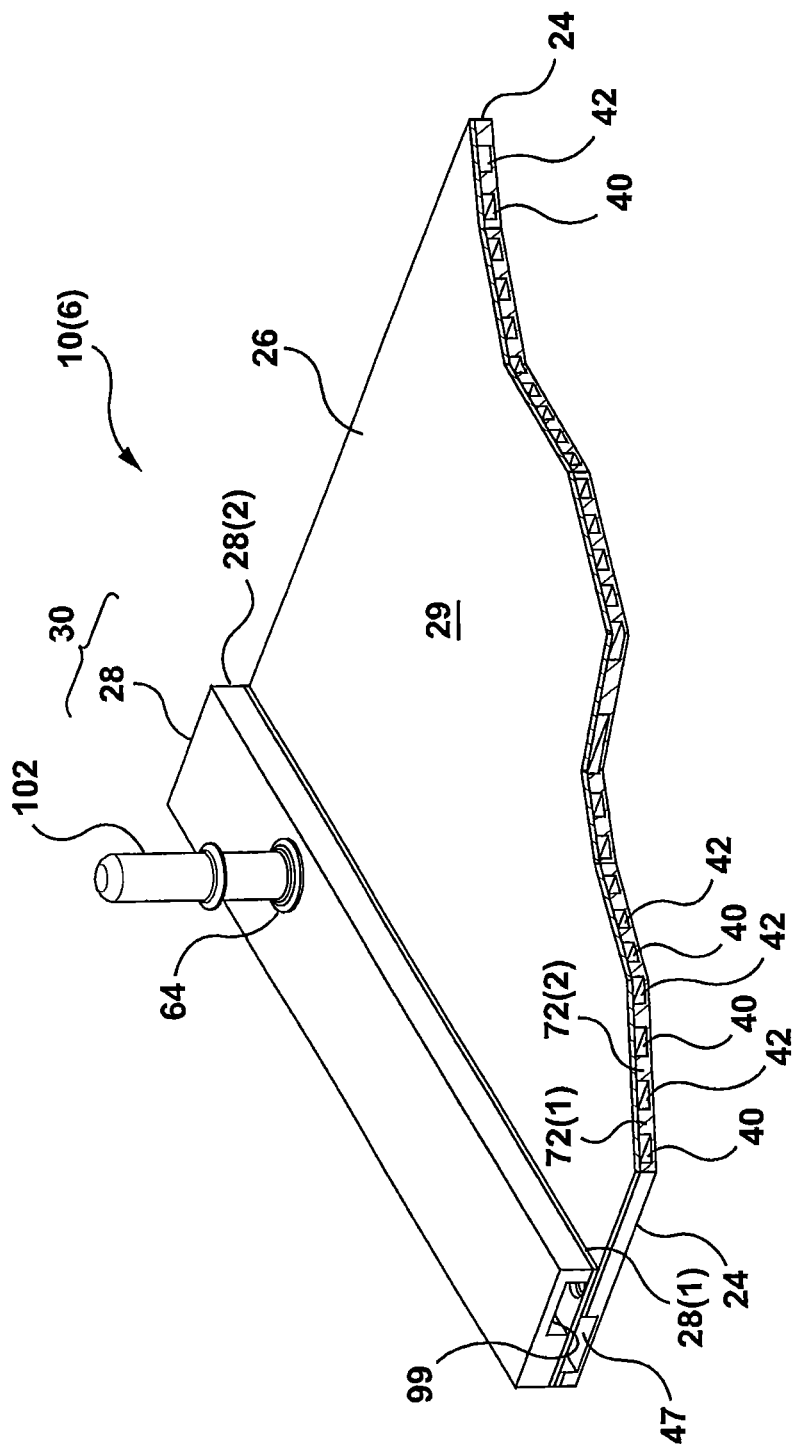
FIG. 24 is a cutaway, perspective view of another example embodiment of a heat exchanger according to the present disclosure.
Figure 25:
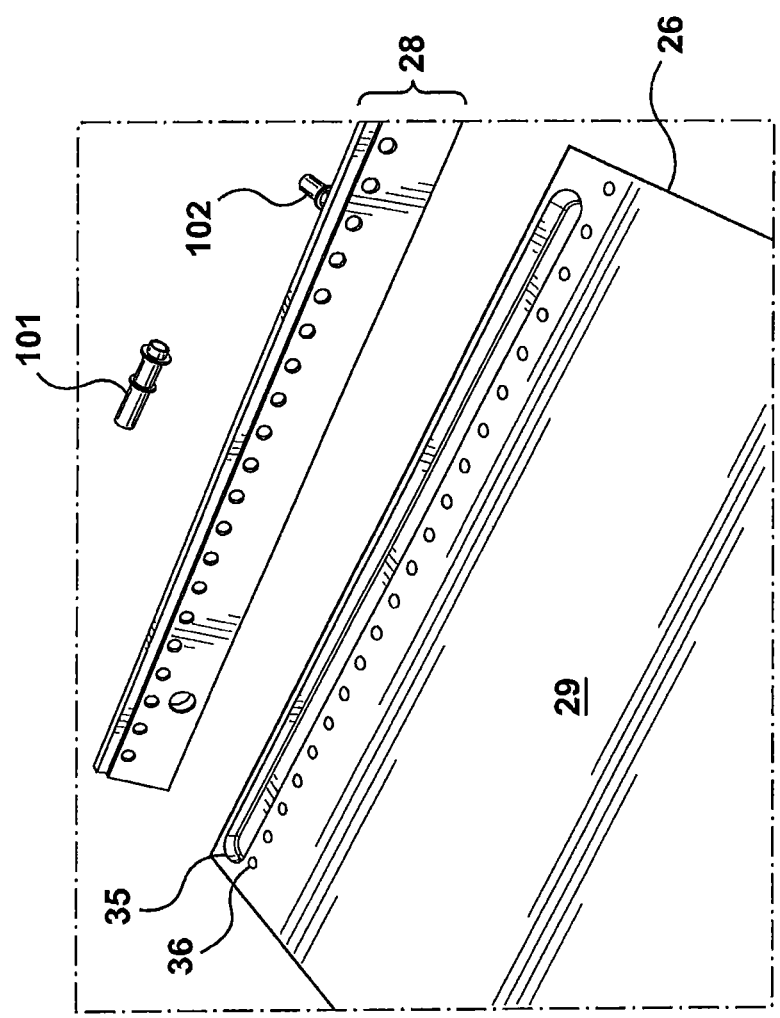
FIG. 25 is a top, perspective, partially disassembled view of the heat exchanger of FIG. 24.

Referring now to FIG. 24 there is shown another embodiment of the battery cooling heat exchanger 10(16) according to the present disclosure wherein like reference numerals will be used to identify similar features of the heat exchanger as found in previously described embodiments. In this embodiment, the heat exchanger 10(6) is comprised of two main heat exchanger plates, namely a formed base plate 24 and a cover plate 26 with a single manifold cover 28 as will be described in further detail below.

As in the previously described embodiments, cover plate 26 has a central generally planar region 29 which serves as the primary heat transfer surface 13 of the heat exchanger 10. Accordingly, the central, generally planar region 29 is adapted to receive the individual battery cell containers 12 stacked thereon as shown in FIGS. 1 and 2. In the subject embodiment, cover plate 26 is formed with a single manifold region 30 at one end thereof, similar to the embodiments described in relation to FIGS. 7-10. Manifold region 30 therefore comprises a fluid routing slot 35 at the outermost end of the cover plate 26 and a second or innermost row of fluid routing ports or fluid openings 36 that is arranged slightly inset from fluid routing slot 35. The fluid routing slot 35 and the row of fluid routing ports 36 provide fluid access to the first and second sets of flow channels 40, 42 formed in the base plate 24.

Figure 26:
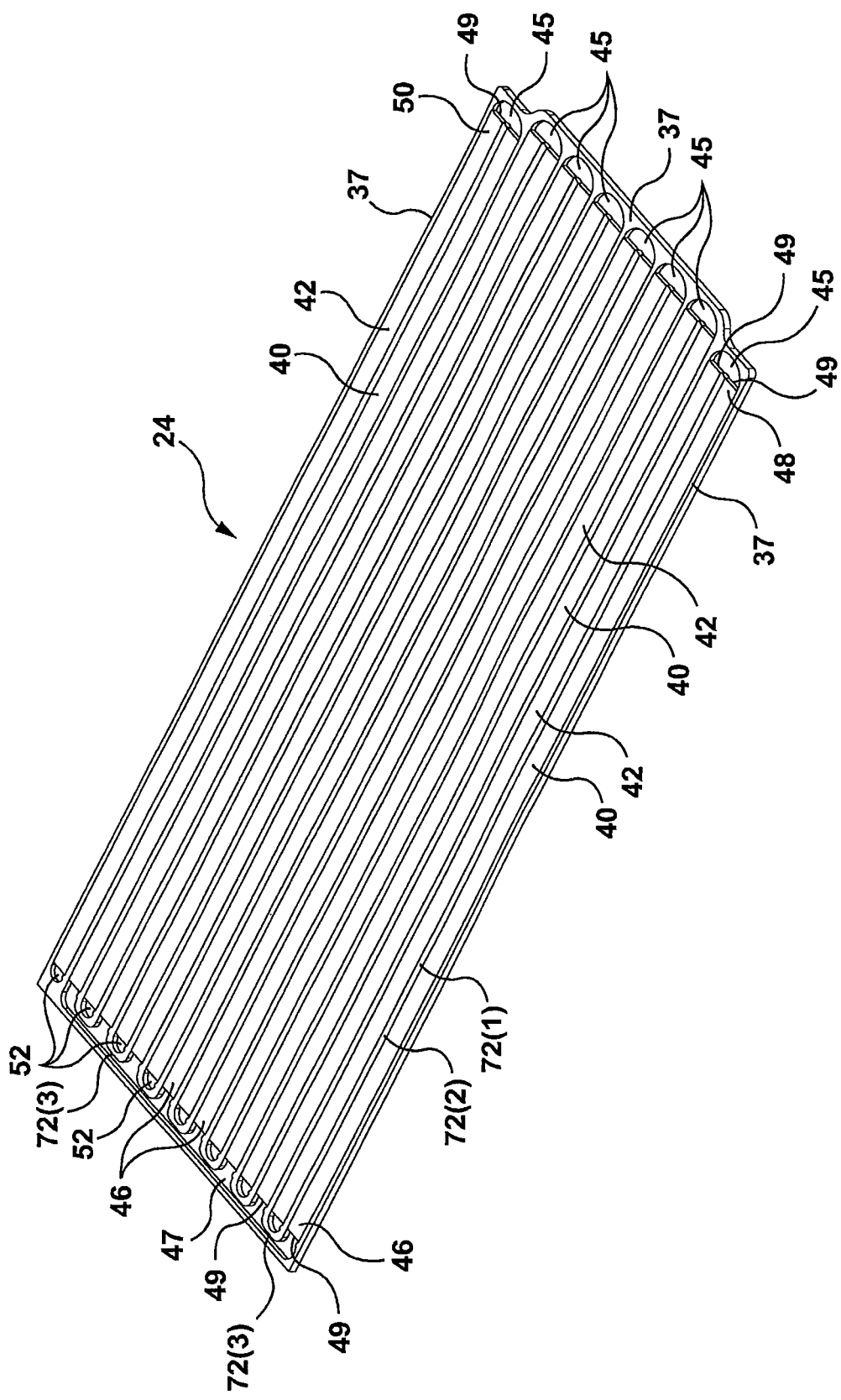
FIG. 26 is a top, perspective, view of the base plate forming the heat exchanger of FIG. 24.

As shown more clearly in FIG. 26, base plate 24 is provided with a plurality of alternating first and second fluid flow passages 40, 42 that are formed across the central, generally planar portion 33 of the base plate 24 and extend generally from one end of the plate 24 to the other. The first and second fluid flow passages 40, 42 are formed by a series of interconnected U-shaped depressions or trough regions 45 that are formed in the central generally planar portion 33 of the plate 24. The first fluid flow passages 40 each have a first end 46 that is fed by an inlet header region 47 and a second end 48 at the opposed end of the plate 24 that feeds into the U-shaped depressions 45. The inlet header region 47 of manifold end 30 of the base plate 24 interconnects the free, first ends 46 of the plurality of first fluid flow, passages 40. The inlet header region 47 is therefore also in the form of a depression with respect to the corresponding upper surface of the base plate 24, the inlet header region 47 having a depth that is greater than the depth of the first and second fluid flow passages 40, 42. The inlet header region 47 is therefore connected to each of the first fluid flow passages 40 by a ramp or transitional area 49. Similarly, the second ends 48 of the first fluid flow passages are also connected to the corresponding U-shaped depression 45 by a ramp or transitional area 49.

The second fluid flow passages 42 also extend generally along the length of the base plate 24 parallel to the first fluid flow passages 40 and have a first end 50 generally adjacent to and in line with the second end 48 of the adjacent first flow passages 40. The second fluid flow passages 42 have a second end 52 at the opposed end thereof that is generally adjacent to and in line with the first end 46 of the adjacent first fluid flow passages 40. The second end 48 of the first fluid flow passages 40 and the first end 50 of the second fluid flow passages 42 are interconnected by the U-shaped depressions or turn portions 45 that are somewhat U-shaped or in the form of a semi circle, the first end 50 of the second fluid flow passages 42 therefore also being interconnected to the U-shaped depressions or turn portions 45 by similar ramp portions 49, the U-shaped depressions or turn portions 45 therefore having a depth that is greater than the depth of the first and second fluid flow passages 40, 42.

The first and second fluid flow passages 40, 42 are separated from each other by flow dividers 72 in a form of a generally U-shaped rib having a first longitudinal branch 72(1) that divides the first flow passage 40 from the adjacent second flow passage and a second longitudinal branch 72(2) that divides the second flow passage from the next adjacent first flow passage 40, the first and second branches 72(1), 72(2) being interconnected at the inlet header end of the base plate 24 by the U-shaped connecting portion 72(3) of the rib. The U-shaped connecting portion 72(3) forming a closed, second end for each of the second fluid flow passages 42, the U-shaped connecting portion 72(3) acting as a fluid barrier, enclosing or separating the second end 52 of the second fluid flow passages 42 from the inlet header region 47. Accordingly, the flow dividers 72 have an overall height that is greater than the depth or overall height of the each of the first and second sets of fluid flow passages 40, 42 so as to generally lie in the same plane as the peripheral edge 37 that surrounds the base plate 24, the peripheral edge 37 and the flow dividers 72 providing contact and/or sealing surfaces against which the cover plate 26 can seal against the base plate 24 enclosing the first and second fluid flow passages 40, 42 therebetween.

Figure 27:
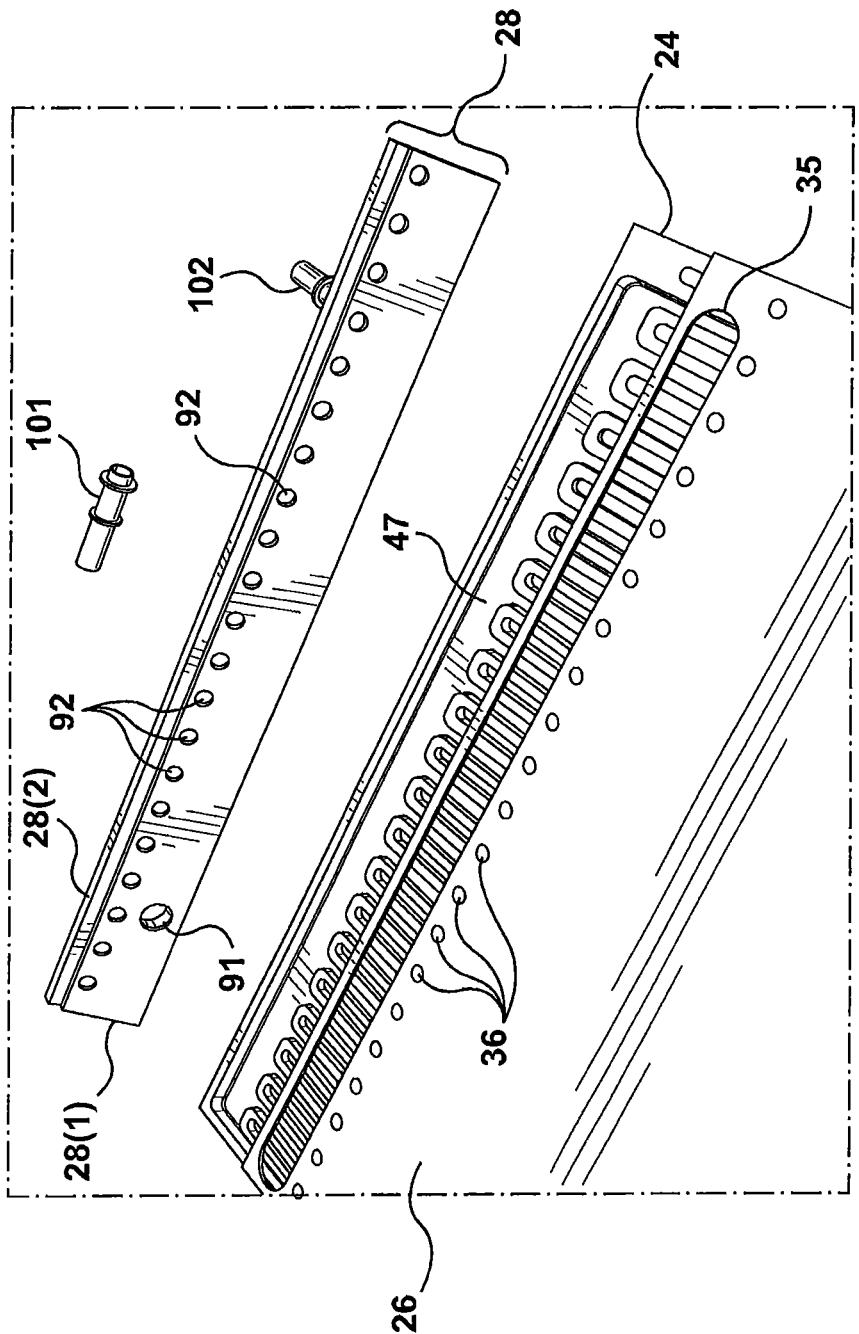
FIG. 27 is a top, perspective, partially disassembled view of the heat exchanger of FIG. 24 with the cover plate moved to reveal the base plate below.
Figure 28:
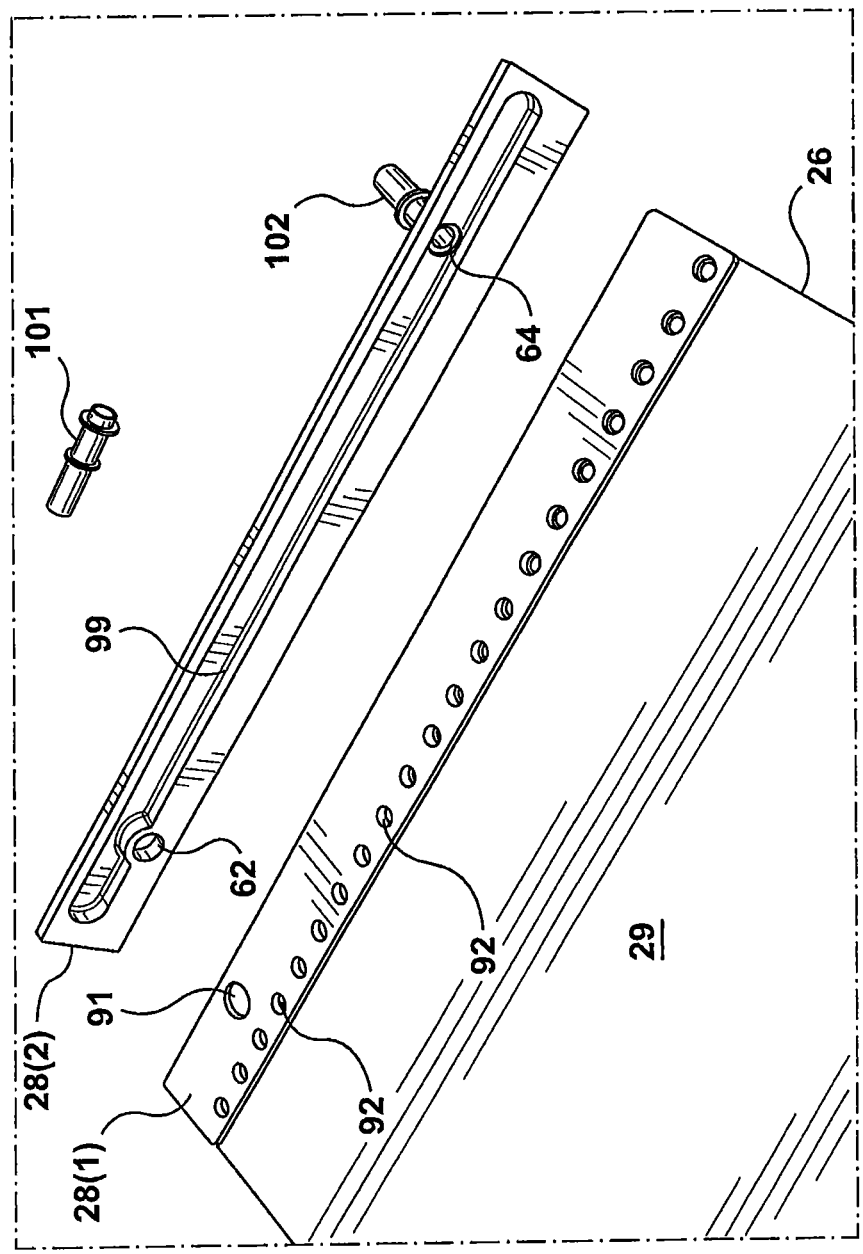
FIG. 28 is a top, perspective view of the heat exchanger of FIG. 24 with the manifold cover in a disassembled state.
Figure 29:
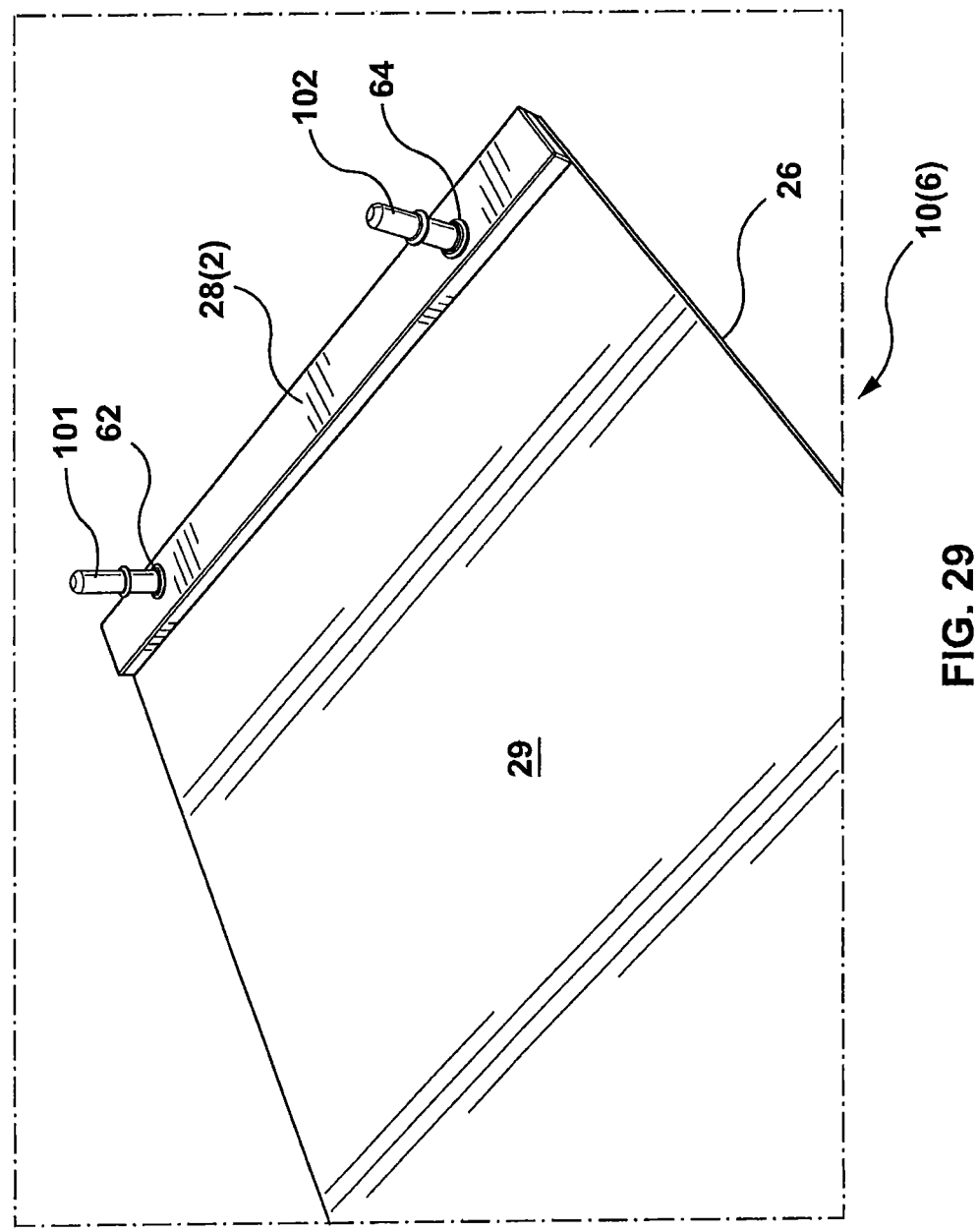
FIG. 29 is a partial top, perspective view of the heat exchanger of FIG. 24 in its fully assembled state.

In the subject embodiment, rather than providing a camelback style manifold plate or manifold cover 28, a manifold plate or manifold cover 28 similar in structure to that shown in FIG. 9C is provided wherein the manifold cover 28 has a two-piece structure made up of a manifold base plate 28(1) and a manifold cover 28(2) as shown most clearly in FIGS. 27 and 28. As shown, the manifold base plate 28(1) is a thin generally flat plate having a fluid inlet port 91 formed at one end thereof so as to generally be arranged over top of or in line with the fluid routing slot 35 formed in the cover plate 26 when the components are assembled to form the heat exchanger 10(6). A row of fluid ports 92 is formed slightly inset from the fluid inlet port 91 and arranged so as to generally correspond to the location of the fluid openings 36 formed in the cover plate 26. The manifold cover 28(2) is more of a solid structure having a fluid inlet opening 62 formed therein that extends through the manifold cover 28(2) and has a channel or trough region 99 formed in the bottom surface thereof and extends into the body of the manifold cover 28(2). The channel 99 is formed in the manifold cover 28(2) so as to generally correspond to and be in alignment with the row of fluid openings 36, 92 formed in the cover plate 26 and manifold base plate 28(1), respectively, when the three components are arranged together. A second fluid opening 64 is also formed in the manifold cover 28(2) and extends through the body thereof so as to be in fluid communication with channel 99, fluid openings 62 and 64 generally being arranged at opposed ends of the manifold cover 28(2) as shown in FIG. 29. Inlet and outlet fittings 101, 102 are arranged in communication with fluid openings 62, 64 for inletting and discharging the heat exchange fluid into and out of the heat exchanger 10(6).

In use, when the components are arranged together to form the heat exchanger 10(6), fluid enters the heat exchanger 10(6) through inlet fitting 101 where it is transmitted to the inlet header region 47 formed in base plate 24 via fluid openings 62 and 91 formed in the manifold cover 28 and fluid routing slot 35 formed in the cover plate 26. From the inlet header region 47, the fluid is distributed to each of the first fluid flow passages 40 formed in base plate 24. The fluid travels along the first fluid flow passages 40 along the length of the plate 24 before being turned 180 degrees through the U-shaped depressions or turn portions 45 where the fluid then enters the second fluid flow passages 42. The fluid travels along the second fluid flow passages 42 in counter flow or the direction opposite to the fluid flow in the first fluid flow passages 40 before exiting the heat exchanger 10(6) through the outlet fitting 102 via the openings 36 and 92 formed in the cover plate 26 and manifold base plate 28(1) and the channel 99 formed in the manifold cover 28(2). Accordingly, heat exchanger 10(6) provides a generally large surface area 29 that is free of surface interruptions for achieving surface-to-surface contact with the various battery cells and/or battery cell containers that may be arranged on the top thereof and provides for a more even surface temperature across the primary heat transfer surface 13 due to the alternating, counter flow arrangement of the first and second fluid flow passages.

While various embodiments of heat exchangers for battery thermal management applications have been described, it will be understood that certain adaptations and modifications of the described embodiments can be made. Therefore, the above discussed embodiments are considered to be illustrative and not restrictive.

What is claimed is:

1. A heat exchanger for thermal management of a battery unit having a plurality of battery cell containers each housing one or more battery cells, comprising:
   a main body portion having opposed ends and defining at least one primary heat transfer surface for surface-to-surface contact with a corresponding surface of at least one of said battery cell containers;
   a plurality of first fluid flow passages formed within said main body portion, each of said first fluid flow passages having a first end for inletting a fluid into said first fluid flow passages and a second end for discharging said fluid from said first fluid flow passages, said first and second ends defining a flow direction through said first fluid flow passages;
   a plurality of second fluid flow passages formed within said main body portion, each of said second fluid flow passages having a first end for inletting said fluid into said second fluid flow passages and a second end for discharging said fluid from said second fluid flow passages, said first and second ends defining a flow direction through said second fluid flow passages;
   wherein said first and second fluid flow passages are arranged so as to alternate through said main body portion and wherein the flow direction of said first fluid flow passages is opposite to the flow direction of said second fluid flow passages;
   wherein said first and second fluid flow passages are formed by U-shaped flow channels having a pair of elongate fluid branches that are interconnected at one end by a turn portion such that said second ends of said first fluid flow passages are in fluid communication with said first ends of said second fluid flow passages; and
   wherein said heat exchanger further comprises a first inlet manifold in fluid communication with said first ends of said first fluid flow passages; and
   a first outlet manifold in fluid communication with said second ends of said second fluid flow passages;
   wherein said first inlet and first outlet manifolds are arranged adjacent to each other at one end of the main body portion of the heat exchanger, one of said first inlet and first outlet manifolds being inwardly disposed with respect to the other one of said first inlet and first outlet manifold and offset with respect thereto.

2. The heat exchanger as claimed in claim 1, further comprising:
   a second inlet manifold in fluid communication with said first ends of said second fluid flow passages;
   a second outlet manifold in fluid communication with said second ends of said second fluid flow passages;
   wherein said second inlet manifold and said first outlet manifold are arranged adjacent to each other at the other, opposed end of said main body portion, one of said second inlet manifold and first outlet manifold being inwardly disposed with respect to the other one of said second inlet manifold and first outlet manifold.

3. The heat exchanger as claimed in claim 2, wherein said main body portion comprises:
   a base plate having a central planar portion surrounded by a peripheral flange, said plurality of alternating first and second fluid flow passages being formed within the central planar portion of said base plate;
   a cover plate arranged over top of and in sealing engagement with said base plate enclosing said plurality of first and second fluid flow passages therebetween, said cover plate having a central planar portion that defines said primary heat transfer surface;
   a pair of manifold covers, each manifold cover arranged at respective ends of said main body portion enclosing said first inlet manifold and said second outlet manifold and said second inlet manifold and said first outlet manifold;
   said first inlet manifold and said first outlet manifold each comprise a plurality of spaced apart fluid openings formed in said cover plate at respective ends thereof wherein the spaced apart fluid openings in said first inlet manifold are in fluid communication with said first ends of said first fluid flow passages and wherein the spaced apart fluid openings in said first outlet manifold are in fluid communication with said second ends of said first fluid flow passages; and
   said second inlet manifold and said second outlet manifold each comprise a plurality of spaced apart fluid openings formed in said cover plate at respective ends thereof wherein the spaced apart fluid openings in said second inlet manifold are in fluid communication with said first ends of said second fluid flow passages and wherein the spaced apart fluid openings in said second outlet manifold are in fluid communication with said second ends of said second fluid flow passages;
   wherein the second inlet and outlet manifolds extend generally parallel to said first inlet and outlet manifolds and are offset with respect thereto.

4. The heat exchanger as claimed in claim 1, wherein said main body portion comprises:
   a base plate having a central planar portion surrounded by a peripheral flange, said plurality of alternating first and second fluid flow passages being formed within the central planar portion of said base plate;
   a cover plate arranged over top of and in sealing engagement with said base plate enclosing said plurality of first and second fluid flow passages therebetween, said cover plate having a central planar portion that defines said primary heat transfer surface; and a manifold cover arranged over top said main body portion enclosing said inlet and outlet manifolds;

wherein said U-shaped flow channels forming said first and second fluid flow passages are formed by a plurality of U-shaped depressions formed in said central planar portion of said base plate, wherein one of said elongate fluid branches has a greater length than the other of said elongate fluid branches such that one of the first end of the first flow passages and the second end of the second fluid flow passages is longitudinally offset with respect to the other.

5. The heat exchanger as claimed in claim 4, wherein each of said elongate fluid branches terminates at a discrete, closed end corresponding respectively to one of said first ends of said first fluid flow passages and one of said second ends of said fluid flow passages; and wherein said inlet manifold and said outlet manifold each comprise a plurality of spaced apart fluid openings formed in said cover plate wherein the spaced apart fluid openings forming said inlet manifold are in fluid communication with said first ends of said first fluid flow passages and wherein the spaced apart fluid openings forming said outlet manifold are in fluid communication with said second ends of said second fluid flow passages.

6. The heat exchanger as claimed in claim 4, wherein one of said elongate fluid branches of each U-shaped depression terminates at an open free end, the open free ends of adjacent U-shaped depressions being interconnected by an inlet header region formed in the base plate the inlet header region being in fluid communication with said inlet manifold.

7. The heat exchanger as claimed in claim 6, wherein said inlet manifold comprises at least one elongate opening in the form of a slot formed in said cover plate in fluid communication with the inlet header region formed in said base plate; and wherein said outlet manifold comprises a row of a plurality of spaced apart fluid openings formed in said cover plate, the spaced apart fluid openings being in fluid communication with said second ends of said second fluid flow passages, said row of fluid openings being generally parallel to and inwardly disposed with respect to said slot.

8. The heat exchanger as claimed in claim 1, wherein said main body portion comprises:

a base plate having a central planar portion surrounded by a peripheral flange, said plurality of alternating first and second fluid flow passages being formed within the central planar portion of said base plate;

a cover plate arranged over top of and in sealing engagement with said base plate enclosing said plurality of first and second fluid flow passages therebetween, said cover plate having a central planar portion that defines said primary heat transfer surface; and a manifold cover arranged over top said main body portion enclosing said inlet and outlet manifolds;

wherein said first and second fluid flow passages are formed by a plurality of U-shaped embossments formed in said central planar portion of said base plate, said U-shaped embossments having two elongate branches that are interconnected at one end thereof by a U-shaped end portion, wherein said first fluid flow passages are formed between adjacent U-shaped embossments, said second fluid flow passages being formed between the two elongate branches of each of said U-shaped embossments.

9. The heat exchanger as claimed in claim 8, wherein said elongate branches of said U-shaped embossments are wavy thereby forming wavy first and second fluid flow passages.

10. A heat exchanger for thermal management of a battery unit having a plurality of battery cell containers each housing one or more battery cells, comprising:

a main body portion having opposed ends and defining at least one primary heat transfer surface for surface-to-surface contact with a corresponding surface of at least one of said battery cell containers;

a plurality of first fluid flow passages formed within said main body portion, each of said first fluid flow passages having a first end for inletting a fluid into said first fluid flow passages and a second end for discharging said fluid from said first fluid flow passages, said first and second ends defining a flow direction through said first fluid flow passages;

a plurality of second fluid flow passages formed within said main body portion, each of said second fluid flow passages having a first end for inletting said fluid into said second fluid flow passages and a second end for discharging said fluid from said second fluid flow passages, said first and second ends defining a flow direction through said second fluid flow passages;

wherein said first and second fluid flow passages are arranged so as to alternate through said main body portion and wherein the flow direction of said first fluid flow passages is opposite to the flow direction of said second fluid flow passages;

wherein said main body portion comprises a solid body having a first surface defining said at least one primary heat transfer surface, said first surface extending between opposed end surfaces, said main body portion having a plurality of tubular channels extending through said body from one end surface to the other end surface, said plurality of tubular channels forming said plurality of alternating first and second fluid flow passages, said heat exchanger further comprising:

a manifold section arranged in sealing engagement with one of said end surfaces of said main body portion, said manifold section comprising:

a plurality of alternating inlet and outlet flow channels formed within said manifold section extending from said end surface to a distance within said manifold section;

a first manifold comprising a slot formed in an upper surface of said manifold section and extending into said manifold section establishing fluid communication with one of said plurality of inlet flow channels or plurality of outlet flow channels; and a second manifold comprising a row of spaced apart fluid openings formed in said upper surface of said manifold section and extending into said manifold section establishing fluid communication with the other one of said plurality of inlet flow channels or plurality of outlet flow channels; and a second manifold section arranged at the opposed end of the main body portion, the second manifold section having an end surface in sealing engagement with the other one of said end surfaces of said main body portion, said second manifold section comprising:

a plurality of alternating inlet and outlet flow channels formed within said manifold section extending from said end surface to a distance within said manifold section;
a first manifold comprising a slot formed in an upper surface of said manifold section and extending into said manifold section establishing fluid communication with one of said plurality of inlet flow channels or plurality of outlet flow channels; and
an second manifold comprising a row of spaced apart fluid openings formed in said upper surface of said manifold section and extending into said manifold section establishing fluid communication with the other one of said plurality of inlet flow channels or plurality of outlet flow channels;
wherein said row of spaced apart fluid openings extends generally parallel to and is inwardly disposed with respect to said slot.

11. The heat exchanger as claimed in claim 10, further comprising:
an end cap arranged at the opposed end of the main body portion, the end cap having an end surface in sealing engagement with the other one of said end surfaces of said main body portion, said end section comprising:
a plurality of spaced apart generally U-shaped turn portions formed within said end cap, each of said turn portions having a first end and a second end formed in said end surface and a U-shaped flow channel extending into said end cap and interconnecting said first and second ends;
wherein said first ends of said turn portions are aligned with an in fluid communication with said first fluid flow passages formed in said main body portion and wherein said second ends are aligned with an in fluid communication with said second fluid flow passages in said main body portion, said main body portion and said end cap together forming U-shaped flow channels therein.

12. The heat exchanger as claimed in claim 1, wherein said main body portion comprises:
a series of alternating first and second tubular members arranged in juxtaposition and in surface-to-surface contact with one another, said first and second tubular members extending between respective first and second ends and defining, respectively, said plurality of alternating first and second fluid flow passages;
wherein each of said first and second tubular members have a first fluid opening for inletting a fluid into said tubular member and a second fluid opening for discharging said fluid from said tubular member, one of said first fluid openings and one of said second fluid openings being formed on an upper surface of said tubular member at one end thereof, the other being formed on a side surface at the opposed end thereof, the opening formed on the side surface of the first tubular members being aligned and in fluid communication with the corresponding opening on the adjacent second tubular member, wherein each pair of adjacent first and second tubular members forms a U-shaped flow channel.

13. The heat exchanger as claimed in claim 12, wherein the openings on the upper surface of said first tubular members form a row of fluid openings extending across said main body portion at one end thereof and wherein the openings in the upper surface of said second tubular members form a row of fluid openings extending across said heat exchanger at the same end thereof, one of said rows being inwardly disposed with respect to the other of said rows forming respective inlet and outlet manifolds, said heat exchanger further comprising:
a manifold cover arranged over top of and in surface-to-surface contact with said main body portion sealingly enclosing said rows of fluid openings forming said inlet and outlet manifolds.

14. The heat exchanger as claimed in claim 7, further comprising:
a second a base plate having a central planar portion surrounded by a peripheral flange, said plurality of alternating first and second fluid flow passages being formed within the central planar portion of said base plate;
a second cover plate arranged over top of and in sealing engagement with said base plate enclosing said plurality of first and second fluid flow passages therebetween, said cover plate having a central planar portion that defines said primary heat transfer surface; and
a second manifold cover arranged over top said main body portion enclosing said inlet and outlet manifolds;
wherein said second base plate, second cover plate and second manifold cover are identical to said base plate, cover plate and manifold cover and inverted 180 degrees about the longitudinal axis of said heat exchanger with respect said base plate, cover plate and manifold cover;
wherein each of said base plates further comprises:
a series of spaced apart fluid openings formed in said inlet hear region providing fluid communication between said first flow passages formed between said base plate and said cover plate and said first fluid flow passages formed between said second base plate and said second cover plate; and
a fluid opening formed in the second ends of said second fluid flow passages providing fluid communication between the second fluid flow passages formed between said base plate and said cover plate and said second fluid flow passages formed between said second base plate and said second cover plate; and
wherein said heat exchanger defines a first primary heat transfer surface on said cover plate and a second primary heat transfer surface on said second cover plate.

15. A battery unit comprising:
a plurality of battery cell containers each housing one or more battery cells, said plurality of battery cell containers being arranged in a stack; and
a heat exchanger comprising:
a main body portion having opposed ends and defining at least one primary heat transfer surface for surface-to-surface contact with a corresponding surface of at least one of said battery cell containers;
a plurality of first fluid flow passages formed within said main body portion, each of said first fluid flow passages having a first end for inletting a fluid into said first fluid flow passages and a second end for discharging said fluid from said first fluid flow passages, said first and second ends defining a flow direction through said first fluid flow passages;
a plurality of second fluid flow passages formed within said main body portion, each of said second fluid flow passages having a first end for inletting said fluid into said second fluid flow passages and a second end for discharging said fluid from said second fluid flow passages, said first and second ends defining a flow direction through said second fluid flow passages;

wherein said first and second fluid flow passages are arranged so as to alternate through said main body portion and wherein the flow direction of said first fluid flow passages is opposite to the flow direction of said second fluid flow passages; and an end cap arranged at the opposed end of the main body portion, the end cap having an end surface in sealing engagement with the other one of said end surfaces of said main body portion, said end section comprising:

a plurality of spaced apart generally U-shaped turn portions formed within said end cap, each of said turn portions having a first end and a second end formed in said end surface and a U-shaped flow channel extending into said end cap and interconnecting said first and second ends;

wherein said first ends of said turn portions are aligned with an in fluid communication with said first fluid flow passages formed in said main body portion and wherein said second ends are aligned with an in fluid communication with said second fluid flow passages in said main body portion, said main body portion and said end cap together forming U-shaped flow channels therein;

wherein said plurality of battery cell containers are arranged in a stack with each battery cell container being in surface-to-surface contact with the adjacent battery cell container, said stack of battery cell containers being arranged on top of and in thermal contact with said at least one primary heat transfer surface of said main body portion of said heat exchanger.

16. The heat exchanger as claimed in claim 3, wherein said manifold cover is a unitary structure comprising:
a flat plate;
a first embossment formed in and raised out of the plane of said generally flat plate; and
a second embossment formed in and raised out of the plate of said generally flat plate;
wherein said first and second embossments are arranged adjacent to each other with one of said embossments being offset with respect to the other in a direction generally perpendicular to a longitudinal axis of the heat exchanger.

17. The heat exchanger as claimed in claim 4, wherein said manifold cover comprises:
a manifold base plate having first and second fluid slots formed therein;
a manifold cover plate having first and second channels formed in a bottom surface thereof, said first and second channels being generally aligned with and in communication with said first and second fluid slots;
a fluid inlet opening formed in an upper surface of said manifold cover plate in fluid communication with one of said first and second fluid channels; and
a fluid outlet opening formed in the upper surface of said manifold cover plate in fluid communication with the other of said first and second fluid channels.

18. The heat exchanger as claimed in claim 1, wherein said main body portion comprises:
a base plate formed by two or more base plate portions, each base plate portion having a central planar portion surrounded by a peripheral flange, a portion of said plurality of alternating first and second fluid flow passages being formed within the central planar portion of each of said base plate portions, said base plate portions being arranged adjacent to each other and fixed together to form said base plate;

wherein said first and second fluid flow passages are formed by a plurality of U-shaped embossments formed in said central planar portion of each of said base plate portions, said U-shaped embossments having two elongate branches that terminate at discrete ends wherein said first fluid flow passages are formed between adjacent U-shaped embossments and said second fluid flow passages being formed between the two elongate branches of each of said U-shaped embossments, the second ends of said first fluid flow passages and said first ends of said second fluid flow passages being interconnected by a common fluid collector channel that extends along the width of each of said base plate portions, the first ends of said first fluid flow passages being interconnected by a common inlet header region that extends along the width of each of said base plate portions;

a cover plate arranged over top of and in sealing engagement with said base plate formed by said base plate portions enclosing said plurality of first and second fluid flow passages therebetween, said cover plate having a central planar portion that defines said primary heat transfer surface;

at least two fluid routing slots formed in said cover plate, each fluid routing slot being in communication with said inlet header region formed in each of said base plate portions;

a series of fluid openings formed in said cover plate inset from said fluid routing slots and extending along the width of the cover plate, each fluid opening being in communication with a corresponding second end of said second fluid flow passages; and a manifold cover arranged over top of said cover plate of said main body portion enclosing and forming respective inlet and outlet manifolds.

19. The heat exchanger as claimed in claim 18, wherein said series of fluid openings formed in said cover plate are of increasing size.

20. A method of making a heat exchanger for thermal management of battery units comprising the steps of:
providing a plurality of base plate portions, each base plate portion comprising:
a central planar portion surrounded by a peripheral flange, a portion of said plurality of alternating first and second fluid flow passages being formed within the central planar portion of each of said base plate portions, said base plate portions being arranged adjacent to each other and fixed together to form said base plate;

wherein said first and second fluid flow passages are formed by a plurality of U-shaped embossments formed in said central planar portion of each of said base plate portions, said U-shaped embossments having two elongate branches that terminate at discrete ends wherein said first fluid flow passages are formed between adjacent U-shaped embossments and said second fluid flow passages being formed between the two elongate branches of each of said U-shaped embossments, the second ends of said first fluid flow passages and said first ends of said second fluid flow passages being interconnected by a common fluid collector channel that extends along the width of each of said base plate portions, the first ends of said first fluid flow passages being interconnected by a common inlet header region that extends along the width of each of said base plate portions;

selecting a predetermined number of base plate portions for forming a heat exchanger having predetermined dimensions;

arranging said predetermined number of base plate portions in side-by-side arrangement and joining said base plate portions together for forming a base plate;

sealingly arranging a cover plate on top of said base plate for enclosing said first and second fluid flow passages, said cover plate comprising:
  a central planar portion that defines a primary heat transfer surface for contacting at least one battery cell or battery cell container;
  one or more fluid routing slots formed in said cover plate, each fluid routing slot being in communication with said inlet header region formed in each of said base plate portions; and
  a series of fluid openings formed in said cover plate inset from said fluid routing slots and extending along the width of the cover plate, each fluid opening being in communication with a corresponding second end of said second fluid flow passages formed in said base plate portions; and sealingly arranging a manifold cover on said cover plate enclosing said fluid routing slots and said series of fluid openings for forming respective inlet and outlet manifolds for inletting and discharging a heat exchange fluid into said heat exchanger.

* * * * *